US012783003B2

(12) United States Patent
DeSanti et al.

(10) Patent No.: US 12,783,003 B2
(45) Date of Patent: Nov. 3, 2026

(54) RACKED GPU SYSTEM

(71) Applicant: Dell Products L.P., Round Rock, TX (US)

(72) Inventors: Claudio DeSanti, Santa Cruz, CA (US); Joseph LaSalle White, San Jose, CA (US); David Piehler, Mountain View, CA (US)

(73) Assignee: Dell Products L.P., Round Rock, TX (US)

( * ) Notice: Subject to any disclaimer, the term of this patent is extended or adjusted under 35 U.S.C. 154(b) by 84 days.

(21) Appl. No.: 18/927,021

(22) Filed: Oct. 25, 2024

(65) Prior Publication Data

US 2026/0118907 A1 Apr. 30, 2026

(51) Int. Cl.
*G06F 13/00* (2006.01)
*G06F 1/16* (2006.01)
*G06F 13/40* (2006.01)
*G06T 1/20* (2006.01)

(52) U.S. Cl.
CPC ........ *G06F 1/1615* (2013.01); *G06F 13/4022* (2013.01); *G06T 1/20* (2013.01)

(58) Field of Classification Search
None
See application file for complete search history.

(56) References Cited

U.S. PATENT DOCUMENTS

2014/0185627 A1* 7/2014 Ditya .................... H04L 45/245 370/409
2025/0275079 A1* 8/2025 Mentovich ......... H05K 7/20727
2025/0338425 A1* 10/2025 James .................. H05K 7/1489

* cited by examiner

*Primary Examiner* — Henry Tsai
*Assistant Examiner* — Dean Phan
(74) *Attorney, Agent, or Firm* — Joseph Mencher

(57) ABSTRACT

A racked Graphics Processing Unit (GPU) system includes a rack system defining a plurality of device housings. A passive cable system is housed in the rack system adjacent the plurality of device housings. Each of a plurality of compute devices that each include a plurality of Graphics Processing Units (GPU) devices are housed in a respective one of the plurality of the device housings and connected to the passive cable system. Each of a plurality of switch devices that each include a plurality of networking processing devices are housed in the rack system opposite the passive cable system from the plurality of compute devices and the plurality of device housings, and connected to the passive cable system to communicatively couple each of the plurality of networking processing devices in that switch system to each of the plurality of GPU devices in each of the plurality of compute devices.

20 Claims, 64 Drawing Sheets

600

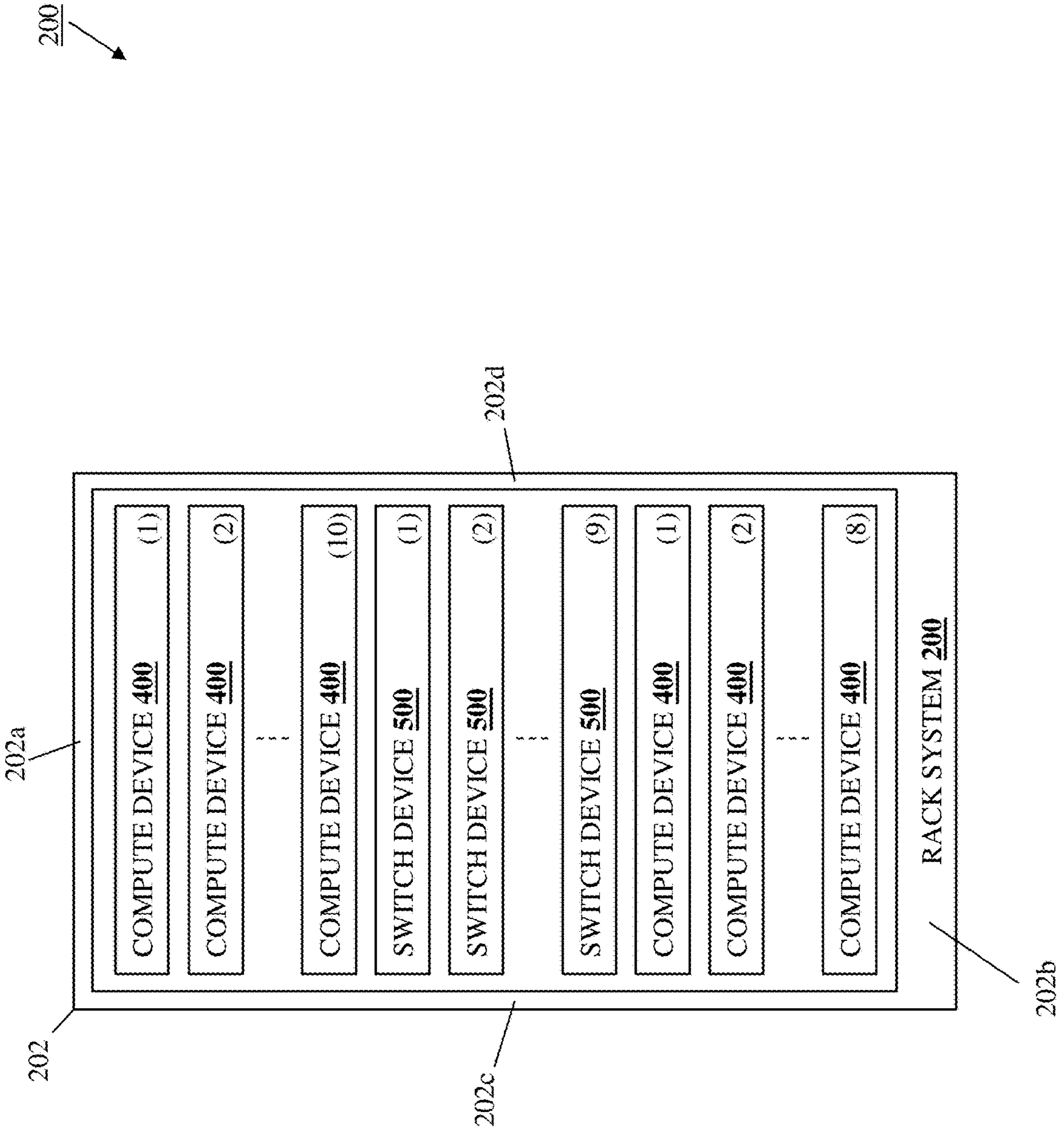
(PRIOR ART)

RACKED GPU SYSTEM

BACKGROUND

The present disclosure relates generally to information handling systems, and more particularly to racked GPU systems that are provided using information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, switch devices and compute devices including a plurality of Graphics Processing Units (GPUs), may be provided in a rack system and coupled together in order to provide a racked GPU system for use in Artificial Intelligence (AI) applications and/or other racked GPU system applications known in the art. However, the inventors of the present disclosure have recognized issues in the configuration of such conventional racked GPU systems that limit the GPU density of such racked GPU systems. In particular, conventional racked GPU systems house the compute devices and switch devices in respective rack units defined by a rack system, and provide a passive cable cartridge in the rack system to which each of the compute devices and switch devices connect to for both mechanical support and in order to communicatively couple to each other.

To provide a specific example, "NVL72" racked GPU systems available from NVIDIA® Corporation of Santa Rosa, California, United States, discussed in further detail below, may include up to 18 compute devices (also called "compute sleds") that each include four GPUs (e.g., "Blackwell" GPUs available from NVIDIA®), and use 9 switch devices (e.g., "NVSwitch" switch devices available from NVIDIA®, also referred to a "switch sleds") that each include two switch processors (e.g., "Quantum-3" switch Application-Specific Integrated Circuits (ASICs)) available from NVIDIA®), with each of the compute devices and switch devices provided in respective rack units in a rack system and connected to a passive cable cartridge provided at the back of the rack system.

While the conventional racked GPU systems discussed above are currently considered to have "high-GPU-density", increased GPU density is desirable, and such GPU density increases will continue to be desirable into the future. However, as discussed in further detail below, the inventors of the present disclosure have recognized that each rack unit in a rack system that is used to house a switch device for the racked GPU system as described above could otherwise be used to house an additional compute device with additional GPUs, and thus the configuration of conventional racked GPU systems described above operates to limit their GPU density.

Accordingly, it would be desirable to provide a racked GPU system that addresses the issues discussed above.

SUMMARY

According to one embodiment, an Information Handling System (IHS) includes a rack system defining a plurality of device housings; a passive cable system housed in the rack system adjacent the plurality of device housings; a plurality of compute devices that each include a plurality of Graphics Processing Units (GPU) devices, wherein each of the plurality of compute devices is housed in a respective one of the plurality of the device housings and connected to the passive cable system; and a plurality of switch devices that each include a plurality of networking processing devices, wherein each of the plurality of switch devices is housed in the rack system opposite the passive cable system from the plurality of compute devices and the plurality of device housings, and connected to the passive cable system, wherein each of the plurality of GPU devices in the plurality of compute devices communicates via the passive cable system and at least one of the plurality of switch devices with at least one of the others of the plurality of GPU devices in the plurality of compute devices.

BRIEF DESCRIPTION OF THE DRAWINGS

FIG. 6B is a schematic view illustrating an embodiment of the conventional racked GPU system of FIG. 6A.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
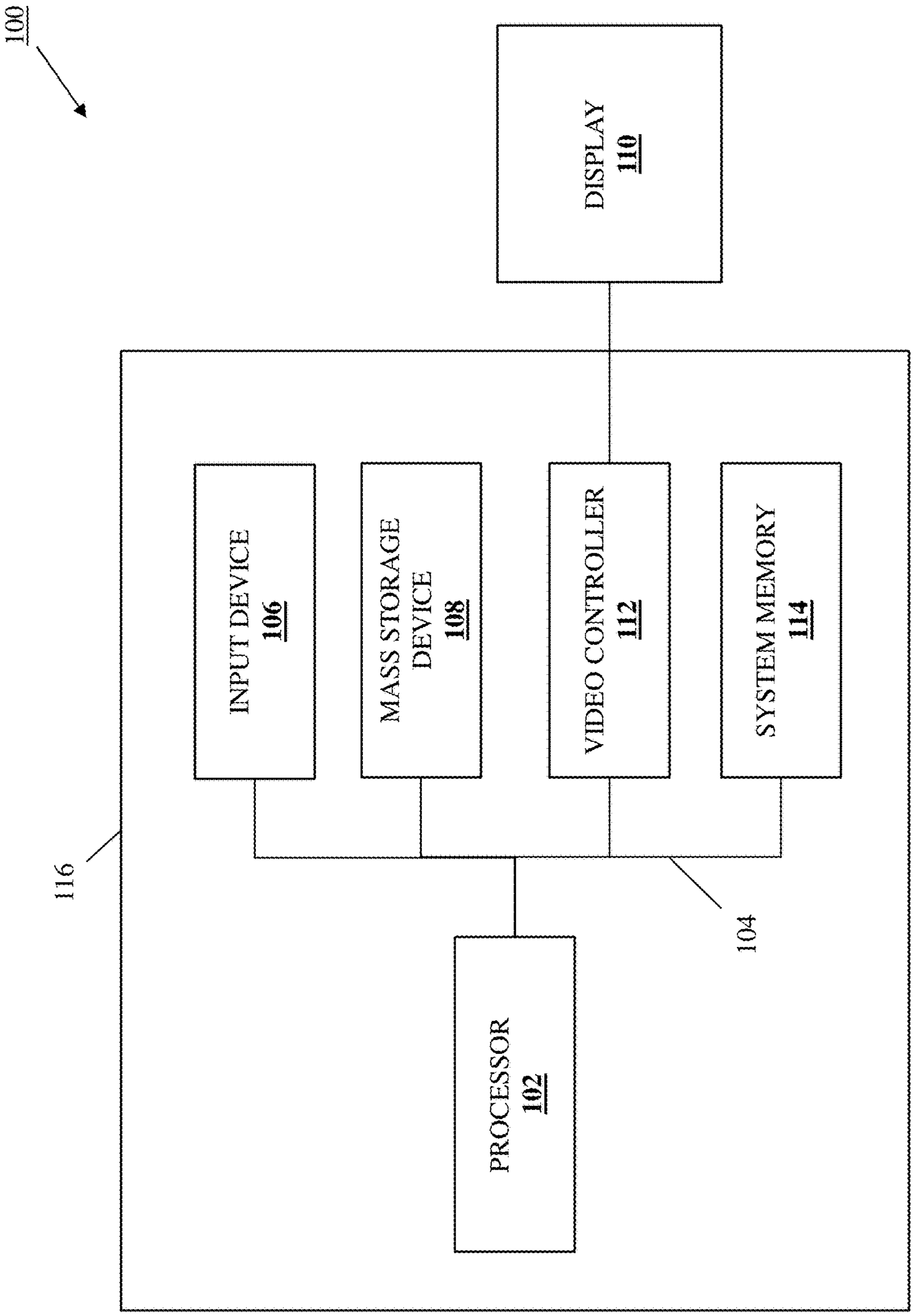
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

A conventional racked GPU system will now be described for purposes of comparison to the racked GPU system of the present disclosure, and one of skill in the art in possession of the present disclosure will appreciate that the details of the conventional racked GPU system illustrated and described below are specific to "NVL72" racked GPU systems available from NVIDIA® Corporation of Santa Rosa, California, United States. However, one of skill in the art in possession of the present disclosure will also appreciate how other conventional racked GPU systems such as those that utilize the "Falcon Shores" GPUs available from INTEL® Corporation of Santa Clara, California, United States, those that use the "MI400" GPUs available from AMD® Corporation of Santa Clara, California, United States, and/or other conventional racked GPU systems known in the art, include similar configurations and thus suffer from the same issues.

Figure 2:
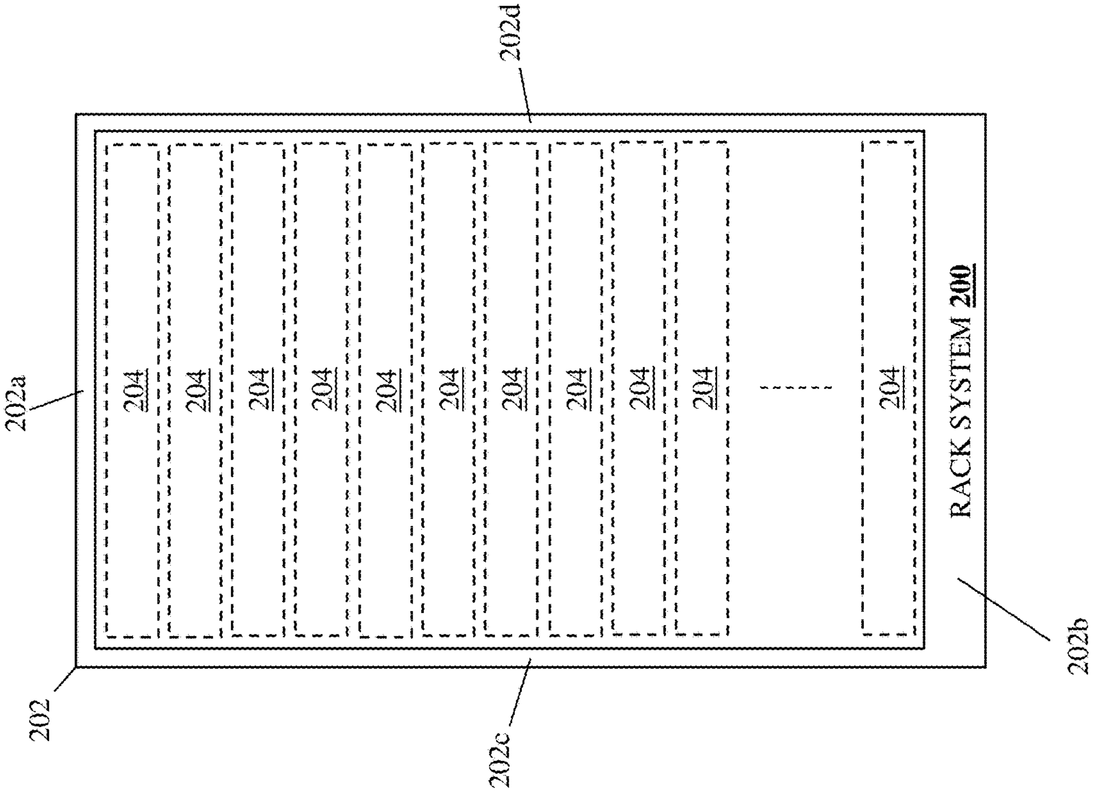
FIG. 2 (PRIOR ART)
FIG. 2 is a schematic view illustrating an embodiment of a conventional rack system.

Referring now to FIG. 2, an embodiment of a conventional rack system 200 utilized in conventional racked GPU systems is illustrated. In the illustrated embodiment, the conventional rack system 200 includes a rack chassis 202 having a top wall 202*a*, a bottom wall 202*b* that is located opposite the rack chassis 202 from the top wall 202*a*, and a pair of opposing side walls 202*c* and 202*d* that are located opposite the rack chassis 202 from each other and that extend between the top wall 202*a* and the bottom wall 202*b*. A rack housing is defined between the top wall 202*a*, the bottom wall 202*b*, and the side walls 202*c* and 202*d*, and in the illustrated embodiment includes a plurality of device housings 204 that may also be referred to as "rack units".

While not illustrated, one of skill in the art in possession of the present disclosure will appreciate how the conventional rack system 200 may include device coupling/securing features (e.g., READYRAIL® systems available from DELL® Inc. of Round Rock, Texas, United States) that are mounted to the rack chassis 202 adjacent each device housing 204 and that are configured to couple devices to the rack chassis 202 and secure those devices in each of the device housings 204. Furthermore, while a specific conventional rack system 200 is illustrated and described, one of skill in the art in possession of the present disclosure will appreciate how conventional rack systems may include a variety of components and/or component configurations while remaining within the scope of the present disclosure as well.

Figure 3:
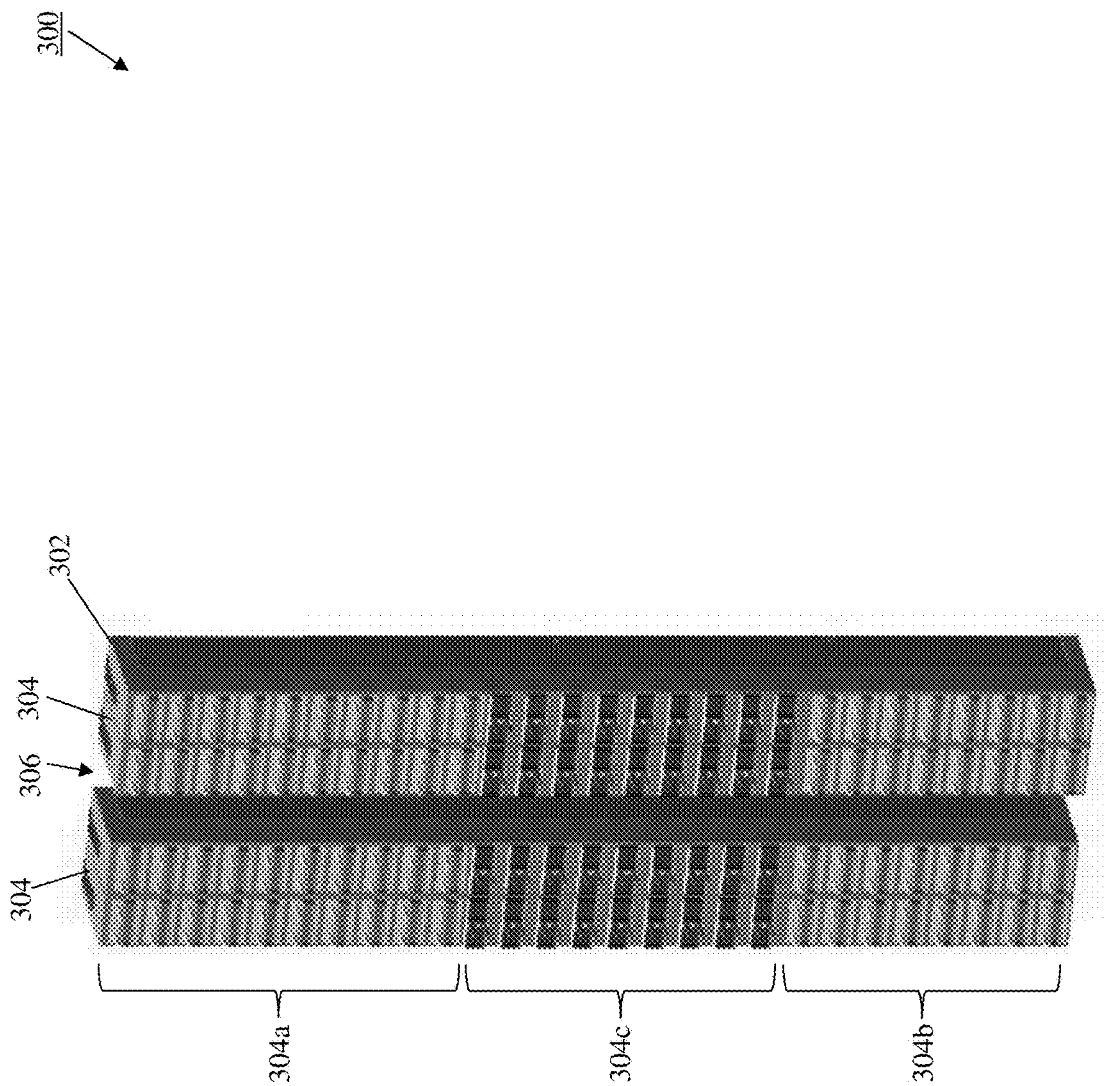
(PRIOR ART) FIG. 3
FIG. 3 is a perspective view illustrating an embodiment of a conventional passive cable cartridge.

Referring now to FIG. 3, an embodiment of a conventional passive cable cartridge system 300 utilized in conventional racked GPU systems is illustrated. In the illustrated embodiment, the conventional passive cable cartridge system 300 includes a cable cartridge chassis 302 providing a pair of cable cartridge "towers" 304 that are separated by spacing 306 that, as discussed below, is used to allow the conventional passive cable cartridge system 300 to be positioned in the rack system 200 discussed above with reference to FIG. 2 without interfering with a rack power system. In the specific example provided in FIG. 3, the cable cartridge towers 304 include a pair of compute device connector groups 304*a* and 304*b* separated by a plurality of switch device connector groups 304*c*.

Continuing with the example of the "NVL72" racked GPU systems discussed above, the cable cartridge towers 304 may provide 10 compute device connector groups 304*a* each having 4 compute device connectors positioned in the same horizontal plane, 9 switch device connector groups each having 4 switch device connectors 304*c* positioned in the same horizontal plane, and 8 compute device connector groups 304*b* each having 4 compute device connectors positioned in the same horizontal plane. While not illustrated or described in detail, the cable cartridge towers 304 in the conventional passive cable cartridge system 300 house a plurality of cables connecting the compute device connectors in the compute device connector groups 304*a* and 304*b* to the switch device connectors in the switch device connector groups 304*c* (e.g., conventional passive cable cartridges used in the "NVL72" racked GPU systems discussed above include 5184 copper twin-axial cables).

Figure 4:
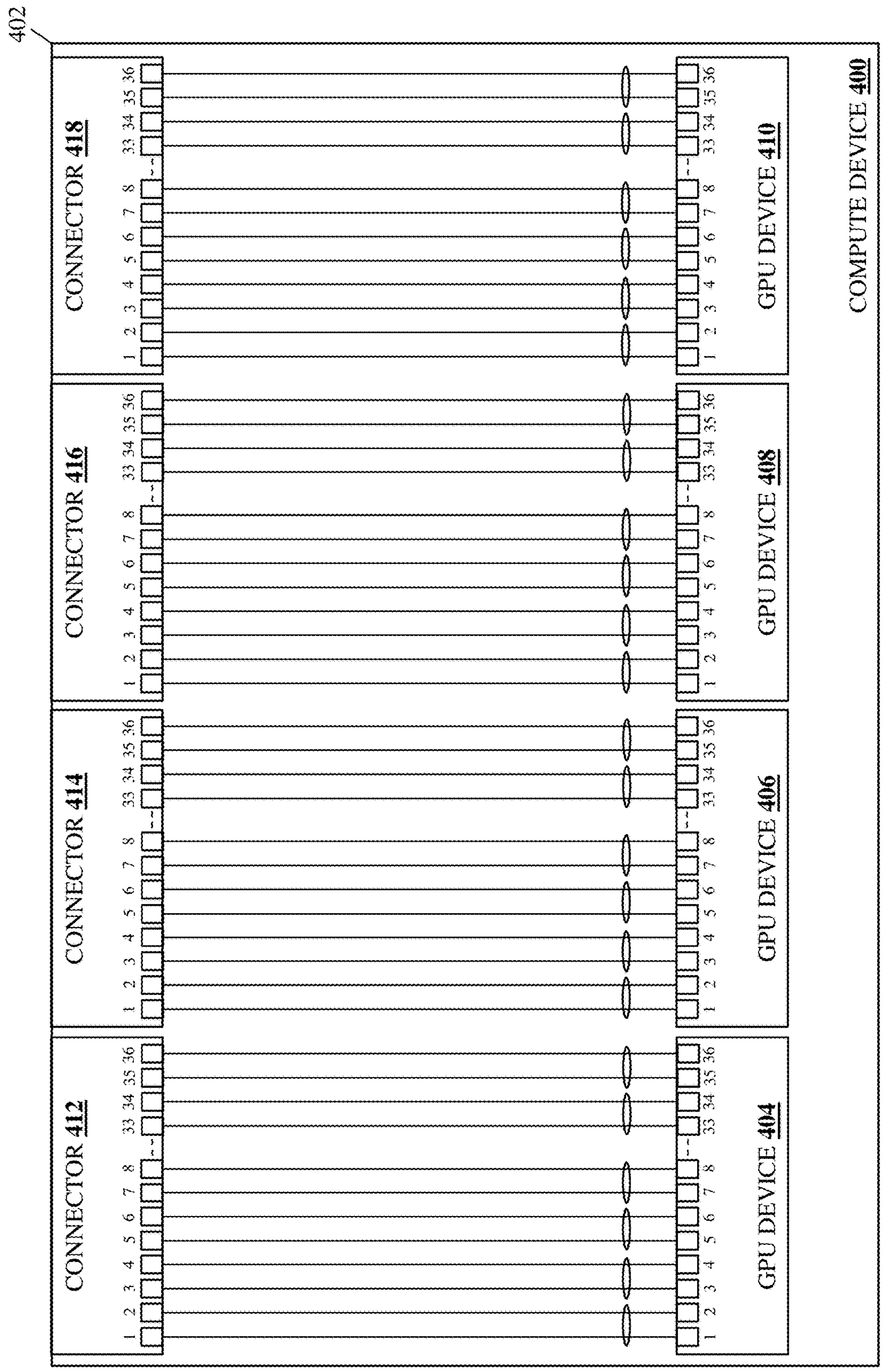
FIG. 4 (PRIOR ART)
FIG. 4 is a schematic view illustrating an embodiment of a conventional compute device.

Referring now to FIG. 4, an embodiment of a conventional compute device 400 utilized in conventional racked GPU systems is illustrated. The conventional compute device 400 includes a chassis 402 that houses the components of the conventional compute device 400, only some of which are illustrated and described below. In the illustrated example, the chassis 402 houses four GPU devices 404, 406, 408, and 410 (e.g., four "Blackwell" GPU devices in compute devices used in the "NVL72" racked GPU systems discussed above), with each GPU device including 36 GPU interfaces (e.g., 36 bidirectional GPU interfaces in the examples provided herein). While not illustrated or described in detail, one of skill in the art in possession of the present disclosure will appreciate how the compute device 400 may include other processing systems (e.g., two "Grace" processors in compute devices used in the "NVL72" racked GPU systems discussed above) while remaining within the scope of the present disclosure as well.

The chassis 402 also includes four connectors 412, 414, 416, and 418, with each connector including 36 connector interfaces. Continuing with the example of the "NVL72" racked GPU systems discussed above, the GPU devices 404-410 and the connectors 412-418 are coupled to each other, with each of the 36 GPU interfaces on the GPU device 404 connected to the 36 respective connector interfaces on the connector 412 (i.e., with the "1" GPU interface on the GPU device 404 connected to the "1" connector interface on the connector 412, the "2" GPU interface on the GPU device 404 connected to the "2" connector interface on the connector 412, and so on), each of the 36 GPU interfaces on the GPU device 406 connected to the 36 respective connector interfaces on the connector 414 (i.e., with the "1" GPU interface on the GPU device 406 connected to the "1" connector interface on the connector 414, the "2" GPU interface on the GPU device 406 connected to the "2" connector interface on the connector 414, and so on), each of the 36 GPU interfaces on the GPU device 408 connected to the 36 respective connector interfaces on the connector 416 (i.e., with the "1" GPU interface on the GPU device 408 connected to the "1" connector interface on the connector 416, the "2" GPU interface on the GPU device 408 connected to the "2" connector interface on the connector 416, and so on), and each of the 36 GPU interfaces on the GPU device 410 connected to the 36 respective connector interfaces on the connector 418 (i.e., with the "1" GPU interface on the GPU device 410 connected to the "1" connector interface on the connector 418, the "2" GPU interface on the GPU device 410 connected to the "2" connector interface on the connector 418, and so on).

As will be appreciated by one of skill in the art in possession of the present disclosure, pairs of serial links that are each provided by a respective connected GPU interface/connector interface pair on the GPU devices 404-410 and connectors 412-418 are used to provide 18 communication paths for each GPU device (e.g., a first communication path using a serial link pair provided by the connected GPU/connector interfaces 1/1 and 2/2, a second communication path using a serial link pair provided by the connected GPU connector interfaces 3/3 and 4/4, etc.). Furthermore, one of skill in the art in possession of the present disclosure will appreciate how each GPU device may communication with each of the 18 networking processing devices provided in the conventional racked GPU system described below via a respective one of those 18 communication paths.

Figure 5A:
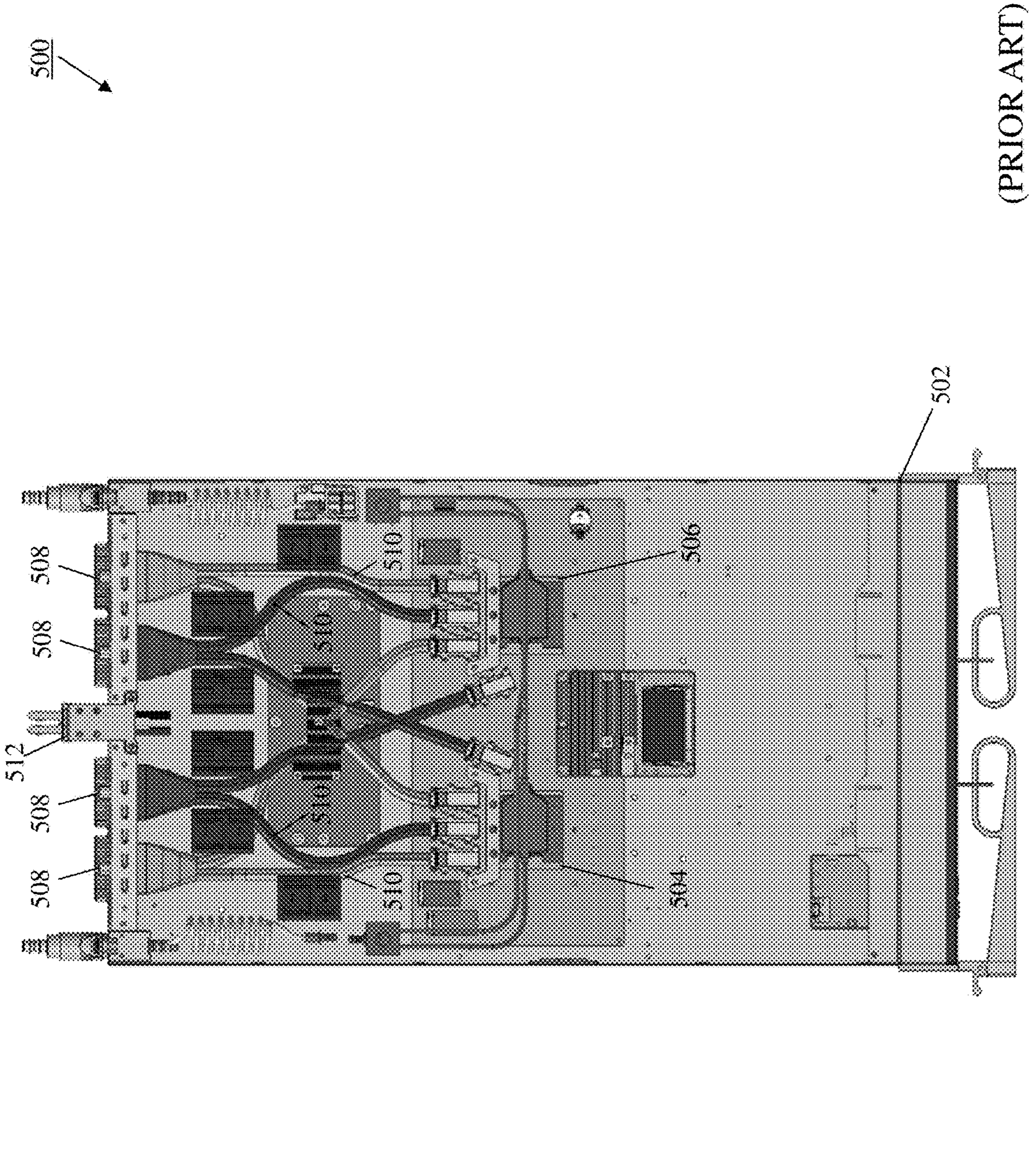
(PRIOR ART) FIG. 5A
FIG. 5A is a top view illustrating an embodiment of a conventional switch device.
Figure 5B:
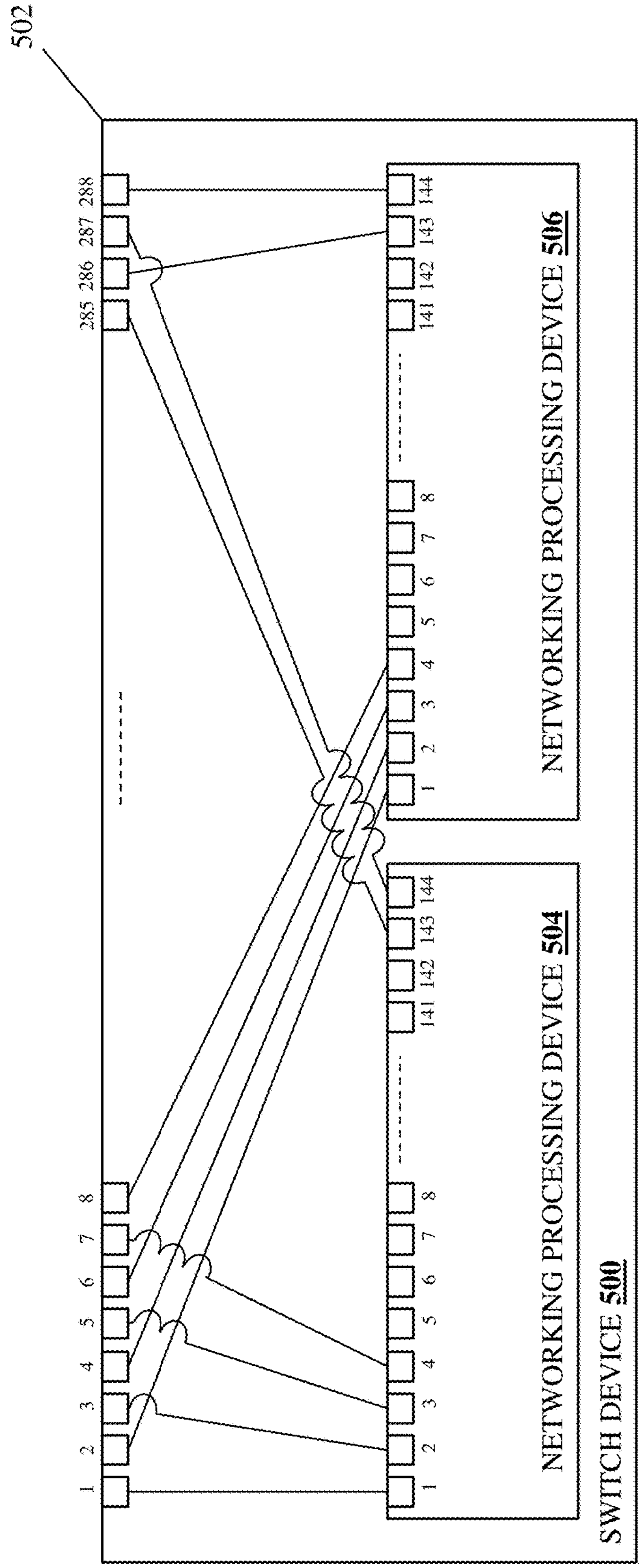
(PRIOR ART) FIG. 5B
FIG. 5B is a schematic view illustrating an embodiment of the conventional switch device of FIG. 5A.

Referring now to FIGS. 5A and 5B, an embodiment of a conventional switch device 500 utilized in conventional racked GPU systems is illustrated. The conventional switch device 500 includes a chassis 502 that houses the components of the conventional switch device 500, only some of which are illustrated and described below. In the illustrated example, the chassis 502 houses two networking processing devices 504 and 506 (e.g., two "Quantum-3" switching ASICs in switch devices used in the "NVL72" racked GPU systems discussed above), with each networking processing device including 144 networking processing device interfaces.

The chassis 502 also includes four connectors 508 providing 288 connector interfaces (shown in FIG. 5B). Continuing with the example of the "NVL72" racked GPU systems discussed above, the networking processing devices 504 and 506 and the connectors 508 are coupled to each other, with each of the 144 networking processing device interfaces on the networking processing device 504 connected to the "odd" connector interfaces provided by the connectors 508 (i.e., with the "1" networking processing device interface on the networking processing device 504 connected to the "1" connector interface provided by the connectors 508, the "2" networking processing device interface on the networking processing device 504 connected to the "3" connector interface provided by the connectors 508, and so on), and each of the 144 networking processing device interfaces on the networking processing device 506 connected to the "even" connector interfaces provided by the connectors 508 (i.e., with the "1" networking processing device interface on the networking processing device 506 connected to the "2" connector interface provided by the connectors 508, the "2" networking processing device interface on the networking processing device 506 connected to the "4" connector interface provided by the connectors 508, and so on).

As illustrated in FIG. 5A, the coupling of the networking processing devices 504 and 506 to the connectors 508 may be provided by cabling. Continuing with the example of the "NVL72" racked GPU systems discussed above, four "Y" cables 510 may be provided, with each "Y" cable 510 connected to a respective one of the connectors 508, and to both of the networking processing devices 504 and 506. Furthermore, a power coupling 512 may be located between pairs of the connectors 508. Finally, while not identified with element numbers, one of skill in the art in possession of the present disclosure will recognize the cooling system that is provided for the networking processing devices 504 and 506 and that is illustrated in FIG. 5A.

Figure 6A:
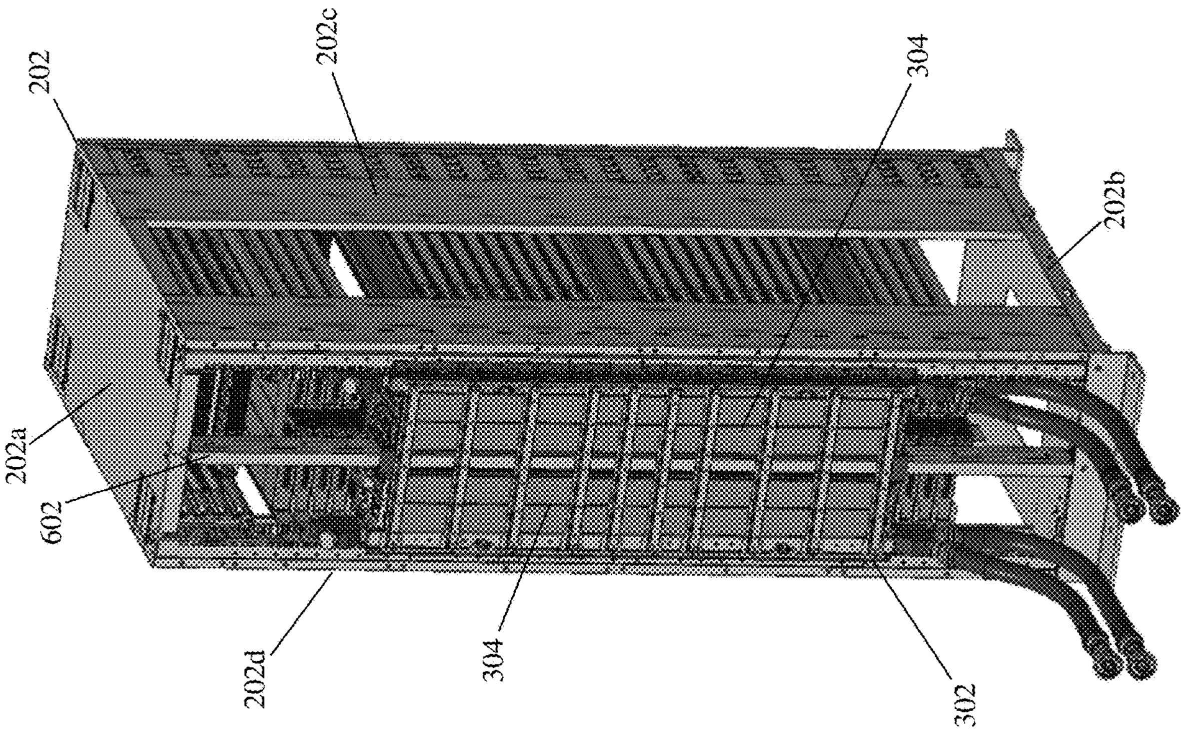
(PRIOR ART) FIG. 6A
FIG. 6A is a rear perspective view illustrating an embodiment of a conventional racked GPU system provided by the conventional rack system of FIG. 2 including the conventional passive cable cartridge of FIG. 3 and housing a plurality of the conventional compute devices of FIG. 4 and a plurality of the conventional switch devices of FIGS. 5A and 5B.
Figure 6C:
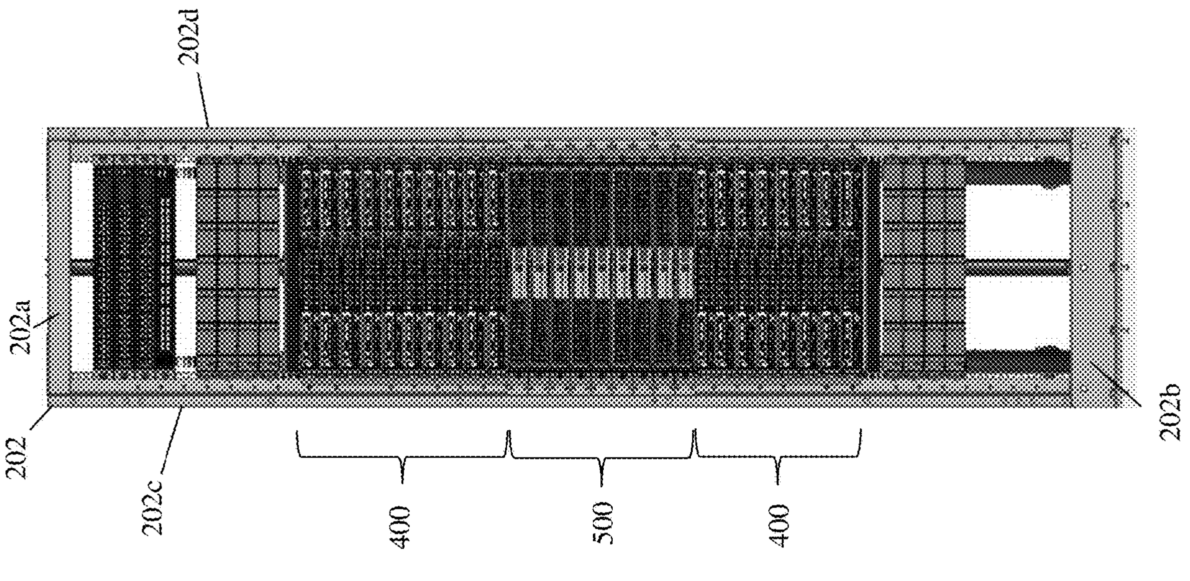
FIG. 6C (PRIOR ART)
FIG. 6C is a front view illustrating an embodiment of the conventional racked GPU system of FIGS. 6A and 6B.

With reference to FIGS. 6A, 6B, and 6C, a conventional racked GPU system 600 is illustrated. As can be seen in FIG. 6A, the conventional racked GPU system 600 illustrates how the rack chassis 202 on the rack system 200 may include a rack power system 602 that is located at the rear of the rack chassis 202, with the conventional passive cable cartridge 300 mounted to the rack chassis 202 such that rack power system 602 is located in the spacing 306 defined between the cable cartridge towers 304, and the compute device connectors 304*a* and 304*b* and the switch device connectors 304*c* face the device housings 204 defined by the rack chassis 202.

As can be seen in FIGS. 6B and 6C, the conventional racked GPU system 600 is provided by positioning a plurality of the conventional compute devices 400 in the device housings 204 defined by the rack chassis 202 in the rack system 200 to connect them to the compute device connectors 304*a* and 304*b* provided by the conventional passive cable cartridge 300, and positioning a plurality of the conventional switch devices 500 in the device housings 204 defined by the rack chassis 202 in the rack system 200 to connect them to the switch device connectors 304*c* provided by the conventional passive cable cartridge 300 (as well as to connect the power coupling 512 on each switch device 500 to the rack power system 602). As will be appreciated by one of skill in the art in possession of the present disclosure, the embodiment illustrated in FIGS. 6A-6C provides an example of the "NVL72" racked GPU systems discussed above, with ten of the conventional compute devices 400 positioned in respective device housings 204 in the rack chassis 202 and connected to the compute device connectors 304*a* on the conventional passive cable cartridge 300, nine of the conventional switch devices 500 positioned in respective device housings 204 in the rack chassis 202 and connected to the switch device connectors 304*c* on the conventional passive cable cartridge 300, and eight of the conventional compute devices 400 positioned in respective device housings 204 in the rack chassis 202 and connected to the compute device connectors 304*b* on the conventional passive cable cartridge 300.

Figure 7A:
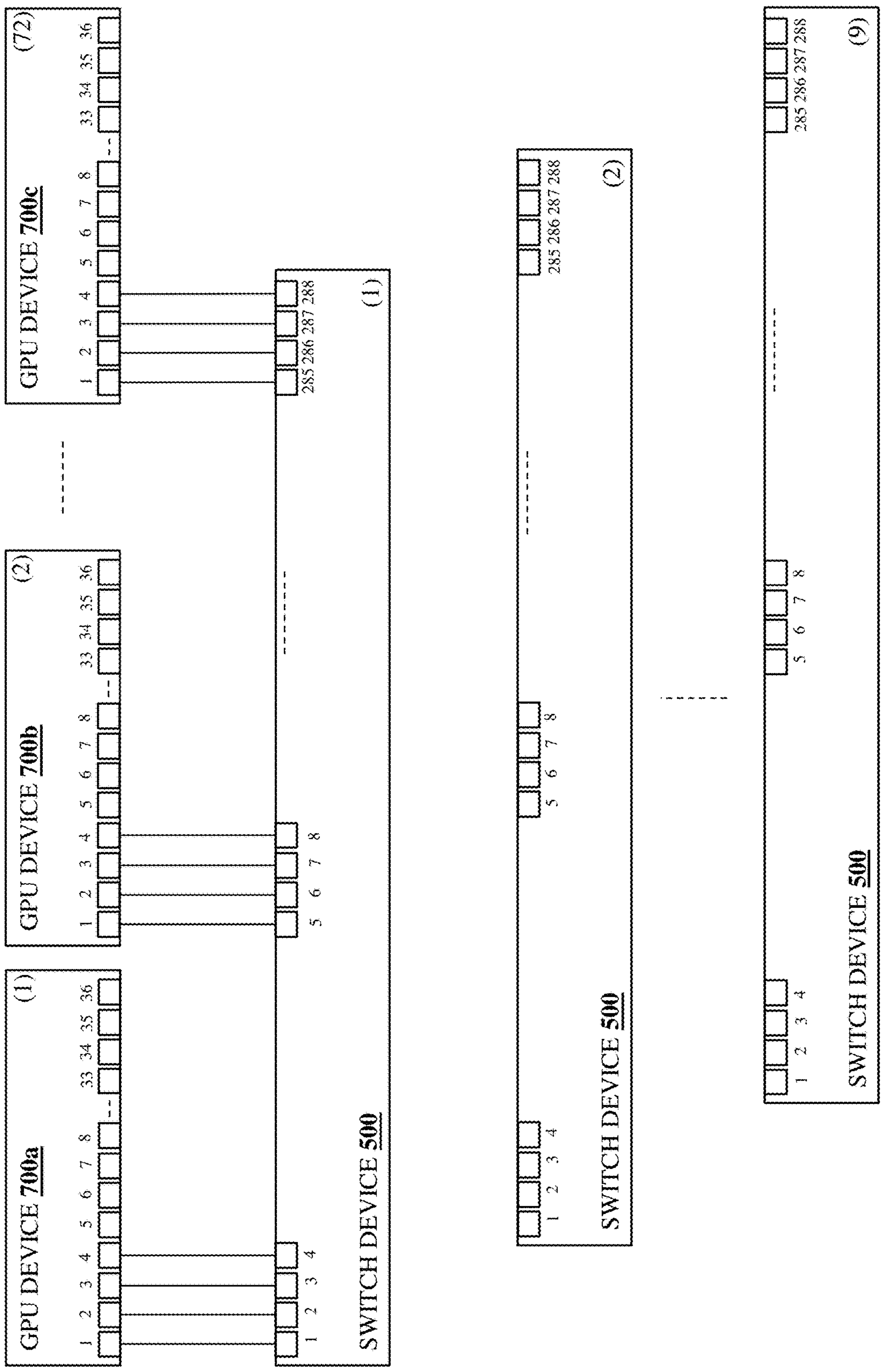
(PRIOR ART) FIG.7A
FIG. 7A is a schematic view illustrating some of the connections provided by the conventional passive cable cartridge in the conventional racked GPU system of FIGS. 6A-6C between the switch devices and the GPU devices in the compute devices.
Figure 7B:
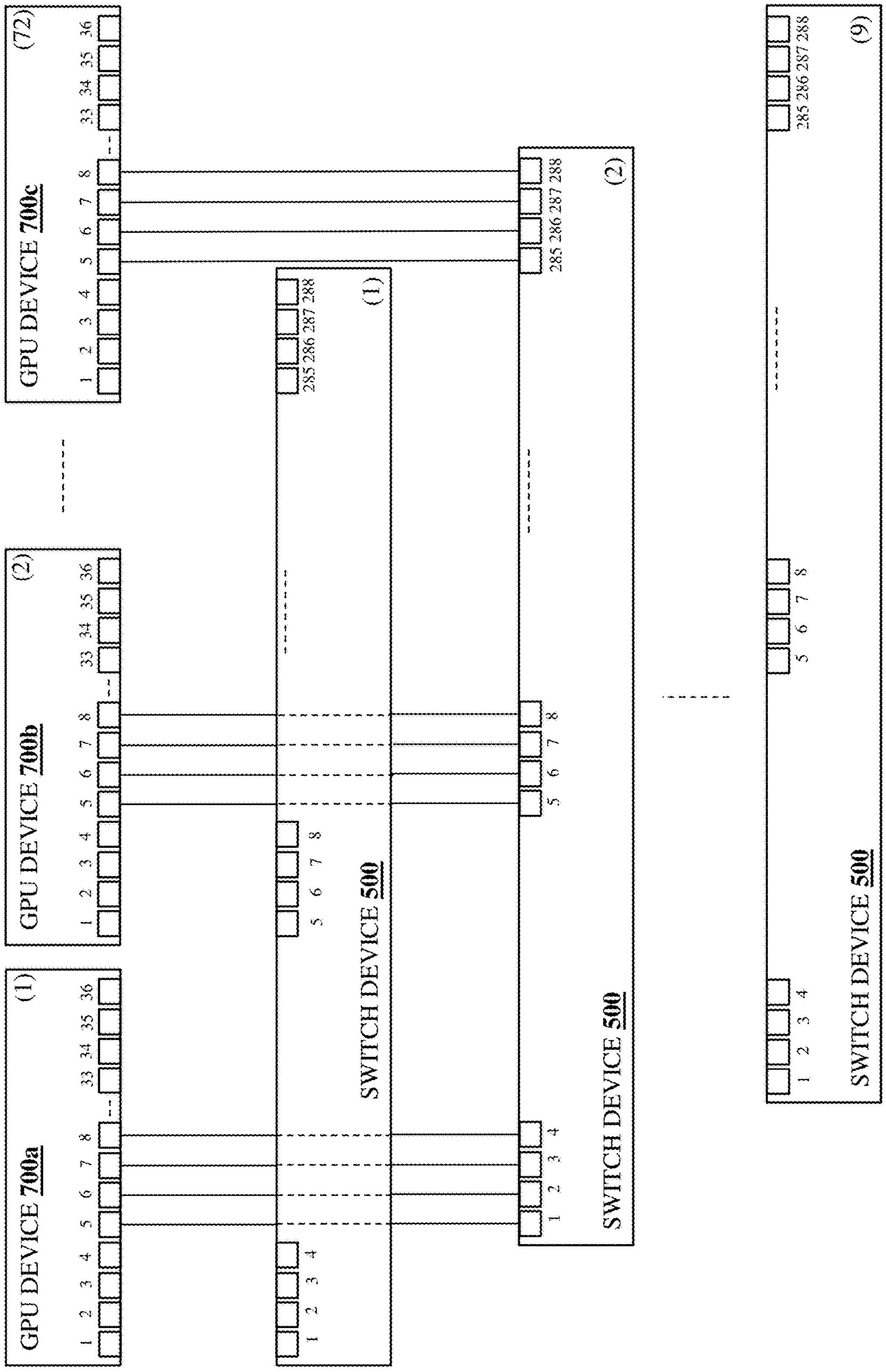
(PRIOR ART) FIG. 7B
FIG. 7B is a schematic view illustrating some of the connections provided by the conventional passive cable cartridge in the conventional racked GPU system of FIGS. 6A-6C between the switch devices and the GPU devices in the compute devices.
Figure 7C:
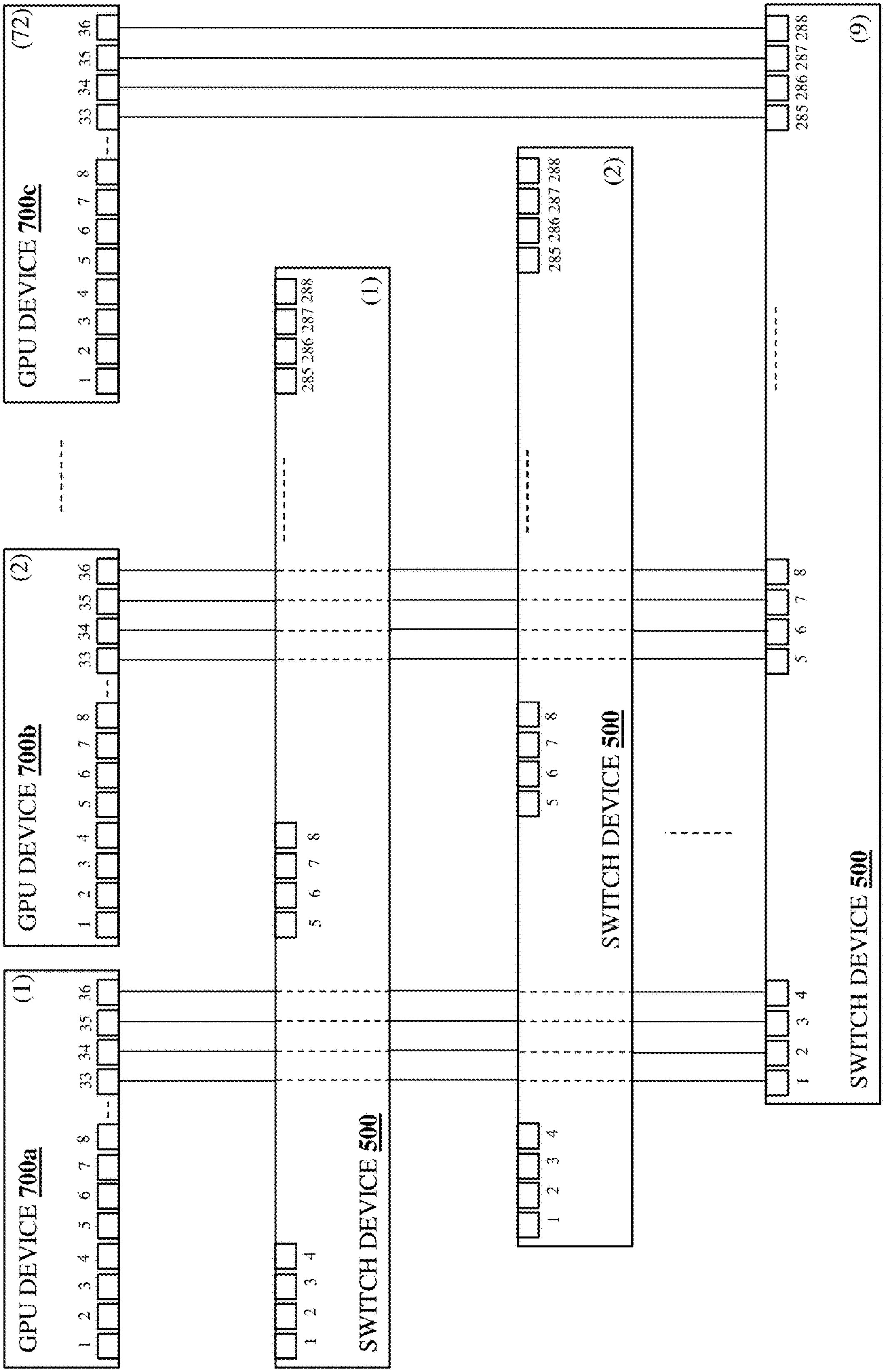
FIG. 7C (PRIOR ART)
FIG. 7C is a schematic view illustrating some of the connections provided by the conventional passive cable cartridge in the conventional racked GPU system of FIGS. 6A-6C between the switch devices and the GPU devices in the compute devices.

With reference to FIGS. 7A, 7B, and 7C, some of the connections provided between the GPU devices in the conventional compute devices 400 and the conventional switch devices 500 by the conventional passive cable cartridge 300 are illustrated, and one of skill in the art in possession of the present disclosure will recognize how the unillustrated connections are provided similarly as those illustrated and described below. In FIGS. 7A-7C, the GPU devices provided in the conventional compute devices 400 in the conventional racked GPU system 600 are renumbered to GPU devices 700*a*, 700*b*, and up to 700*c*, and in the examples of the "NVL72" racked GPU systems discussed above, the 18 conventional compute devices 400 provide 4 GPU devices each to provide (18*4=) 72 GPU devices that are coupled to the 9 conventional switch devices 500. FIG. 7A illustrates how the "1-4" GPU interfaces on the "first" GPU device 700*a* are connected to the respective "1-4" connector interfaces provided by the connectors 508 on the "first" switch device 500, the "1-4" GPU interfaces on the "second" GPU device 700*b* are connected to the respective "5-8" connector interfaces provided by the connectors 508 on the "first" switch device 500, and the "1-4" GPU interfaces on the "seventy-second" GPU device 700*c* are connected to the respective "285-288" connector interfaces provided by the connectors 508 on the "first" switch device 500.

Similarly, FIG. 7B illustrates how the "5-8" GPU interfaces on the "first" GPU device 700*a* are connected to the respective "1-4" connector interfaces provided by the connectors 508 on the "second" switch device 500, the "5-8" GPU interfaces on the "second" GPU device 700*b* are connected to the respective "5-8" connector interfaces provided by the connectors 508 on the "second" switch device 500, and the "5-8" GPU interfaces on the "seventy-second" GPU device 700*c* are connected to the respective "285-288" connector interfaces provided by the connectors 508 on the "second" switch device 500. Similarly as well, FIG. 7C illustrates how the "33-36" GPU interfaces on the "first" GPU device 700*a* are connected to the respective "1-4" connector interfaces provided by the connectors 508 on the "ninth" switch device 500, the "33-36" GPU interfaces on the "second" GPU device 700*b* are connected to the respective "5-8" connector interfaces provided by the connectors 508 on the "ninth" switch device 500, and the "33-36" GPU interfaces on the "seventy-second" GPU device 700*c* are connected to the respective "285-288" connector interfaces provided by the connectors 508 on the "ninth" switch device 500.

As discussed above, the inventors of the present disclosure have recognized that the configuration of the conventional racked GPU system 600 (and similar racked GPU systems) operates to limit its GPU density, as the device housings 204 in the rack chassis 202 of the conventional rack system 200 that are used to house the conventional switch devices 500 as described above could otherwise be used to house additional compute devices with additional GPUs.

The inventors of the present disclosure have developed a racked GPU system that addresses the GPU density issues of conventional racked GPU systems described above, and that is described in detail in U.S. patent application Ser. No. 18/926,790, filed Oct. 25, 2024, the disclosure of which is incorporated by reference herein in its entirety. As described in detail in that patent document, the GPU density issues with conventional racked GPU systems (as well as scalability issues with conventional racked GPU systems that are described in detail in that patent document as well) may be addressed by a racked GPU system in which all compute device housings defined by a rack system are used to house compute devices including GPU devices, with networking processing devices coupled to those GPU devices via an interposer device that is positioned between the compute devices/device housings and switch systems that are connected to the interposer device and that include those networking processing devices, and with the interposer device configurable to allow the number of switch systems required in the racked GPU system to be scaled based on the number of compute device/GPU devices being used.

However, the inventors of the present disclosure have recognized that the racked GPU system described in U.S. patent application Ser. No. 18/926,790, filed Oct. 25, 2024, can present issues. For example, unlike the passive cable cartridge used in the conventional racked GPU systems discussed above that have very low failure rates and do not need to be serviceable, the networking processing devices included in the switch systems described in U.S. patent application Ser. No. 18/926,790, filed Oct. 25, 2024, are subject to failures and/or other unavailability and must be serviceable. Furthermore, the passive cable cartridge used in the conventional racked GPU systems discussed above are not easily removable from the rack system due to the lack of need to service them, while the serviceability requirements for the switch systems described in U.S. patent application Ser. No. 18/926,790, filed Oct. 25, 2024, require they be easily removable from the rack system, and due to their size present mechanical tolerance issues with their connection and disconnection from the interposer device. Further still, the switch systems described in U.S. patent application Ser. No. 18/926,790, filed Oct. 25, 2024, require space in the rack system adjacent the device housings that house the compute devices, and the depth of many rack systems is limited and presents challenges in fitting those switch systems in the available space. As discussed below, the racked GPU system of the present disclosure addresses these issues while providing increased GPU density relative to conventional racked GPU systems.

As discussed below, the racked GPU system of the present disclosure addresses the issues with the racked GPU system described in U.S. patent application Ser. No. 18/926,790, filed Oct. 25, 2024, while providing increased GPU density relative to conventional racked GPU systems. In general, the racked GPU system of the present disclosure increases GPU density by taking advantage of the fact that the communication path for each GPU device to a networking processing device may be provided by a single serial link (e.g., a bidirectional serial link in the examples provided herein) in order to double the number of GPU devices that may be used in the racked GPU system (i.e., relative to the conventional GPU systems described above).

However, the doubling of the number of GPU devices requires a doubling of the number of networking processing devices in order to enable communications between all the GPU devices, and in order to fit the additional GPU devices and networking processing devices in a rack system, the switch devices are removed from the device housings in the rack system and replaced with compute devices that include the additional GPU devices, and those switch devices and their networking processing devices are housed in the rack system adjacent the device housings and connected to the compute devices via a passive cable system that is located between those compute devices and switch devices.

Figure 8:
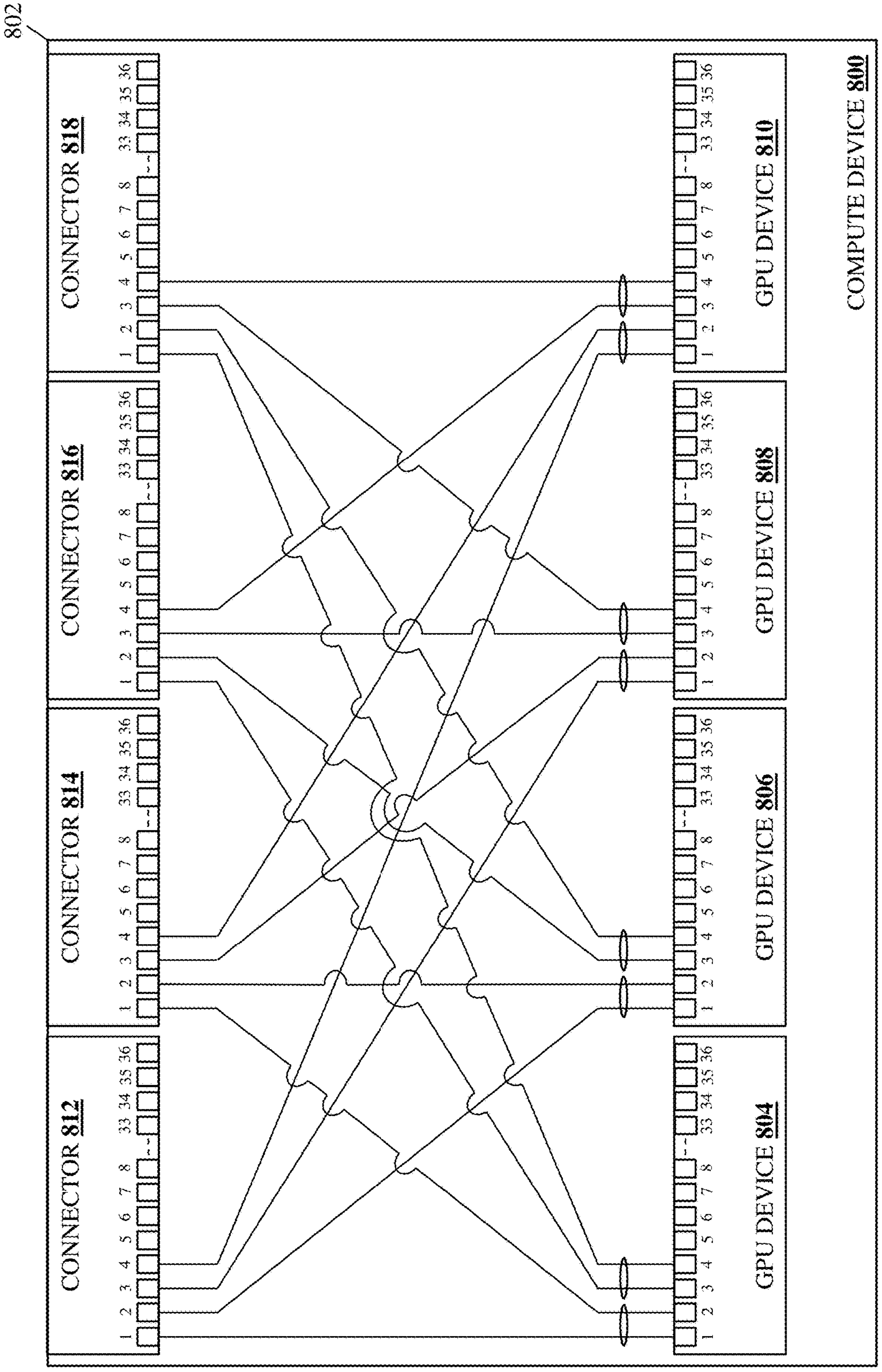
FIG. 8 is a schematic view illustrating an embodiment of a compute device that may be used in the racked GPU system of the present disclosure.

Referring now to FIG. 8, an embodiment of a compute device 800 that may be utilized in the racked GPU system of the present disclosure is illustrated. The compute device 800 includes a chassis 802 that houses the components of the compute device 800, only some of which are illustrated and described below. In the illustrated example, the chassis 802 houses four GPU devices 804, 806, 808 and 810, with each GPU device including 36 GPU interfaces (e.g. 36 GPU bidirectional interfaces in the examples provided herein). In a specific example, each of the GPU devices 804-810 may be provided by the "Blackwell" GPUs described above, although other GPU devices will fall within the scope of the present disclosure as well. While not illustrated or described in detail, one of skill in the art in possession of the present disclosure will appreciate how the compute device 800 may include other processing systems while remaining within the scope of the present disclosure as well.

The chassis 802 also includes four connectors 812, 814, 816, and 818, with each connector including 36 connector interfaces. The GPU devices 404-410 and the connectors 812-818 are coupled to each other, with only a subset of those connections illustrated in FIG. 8 for clarity. As can be seen, each of the "1-4" GPU interfaces on the GPU device 804 is connected to a "1" connector interface on a respective one of the connectors 812-818 (i.e., with the "1" GPU interface on the GPU device 804 connected to the "1" connector interface on the connector 812, the "2" GPU interface on the GPU device 804 connected to the "1" connector interface on the connector 814, the "3" GPU interface on the GPU device 804 connected to the "1" connector interface on the connector 816, and the "4" GPU interface on the GPU device 804 connected to the "1" connector interface on the connector 818).

Similarly, each of the "1-4" GPU interfaces on the GPU device 806 is connected to a "2" connector interface on a respective one of the connectors 812-818 (i.e., with the "1" GPU interface on the GPU device 806 connected to the "2" connector interface on the connector 812, the "2" GPU interface on the GPU device 806 connected to the "2" connector interface on the connector 814, the "3" GPU interface on the GPU device 806 connected to the "2" connector interface on the connector 816, and the "4" GPU interface on the GPU device 806 connected to the "2" connector interface on the connector 818). Similarly as well, each of the "1-4" GPU interfaces on the GPU device 808 is connected to a "3" connector interface on a respective one of the connectors 812-818 (i.e., with the "1" GPU interface on the GPU device 808 connected to the "3" connector interface on the connector 812, the "2" GPU interface on the GPU device 808 connected to the "3" connector interface on the connector 814, the "3" GPU interface on the GPU device 808 connected to the "3" connector interface on the connector 816, and the "4" GPU interface on the GPU device 808 connected to the "3" connector interface on the connector 818).

Similarly as well, each of the "1-4" GPU interfaces on the GPU device 810 is connected to a "4" connector interface on a respective one of the connectors 812-818 (i.e., with the "1" GPU interface on the GPU device 810 connected to the "4" connector interface on the connector 812, the "2" GPU interface on the GPU device 810 connected to the "4" connector interface on the connector 814, the "3" GPU interface on the GPU device 810 connected to the "4" connector interface on the connector 816, and the "4" GPU interface on the GPU device 810 connected to the "4" connector interface on the connector 818). Furthermore, while not illustrated or described in detail, one of skill in the art in possession of the present disclosure will recognize how the "5-36" GPU interfaces on the GPU devices 804-810 may be connected to the "5-36" connector interfaces on the connectors 812-818 similarly as described above.

As will be appreciated by one of skill in the art in possession of the present disclosure, each of the serial links (e.g., bidirectional serial links in the examples provided herein) that is provided by a respective connected GPU interface/connector interface pair on the GPU devices 804-810 and connectors 812-818 is used to provide 36 communication paths for each GPU device to (e.g., a first communication path for the GPU device 804 using each serial link provided by the connected GPU/connector interfaces 1/1, a second communication path for the GPU device 804 each serial link provided by the connected GPU connector interfaces 2/1, etc.). Furthermore, one of skill in the art in possession of the present disclosure will appreciate how each GPU device may communication with each of the 36 networking processing devices provided in the racked GPU system described below via a respective one of those 36 communication paths.

Figure 9A:
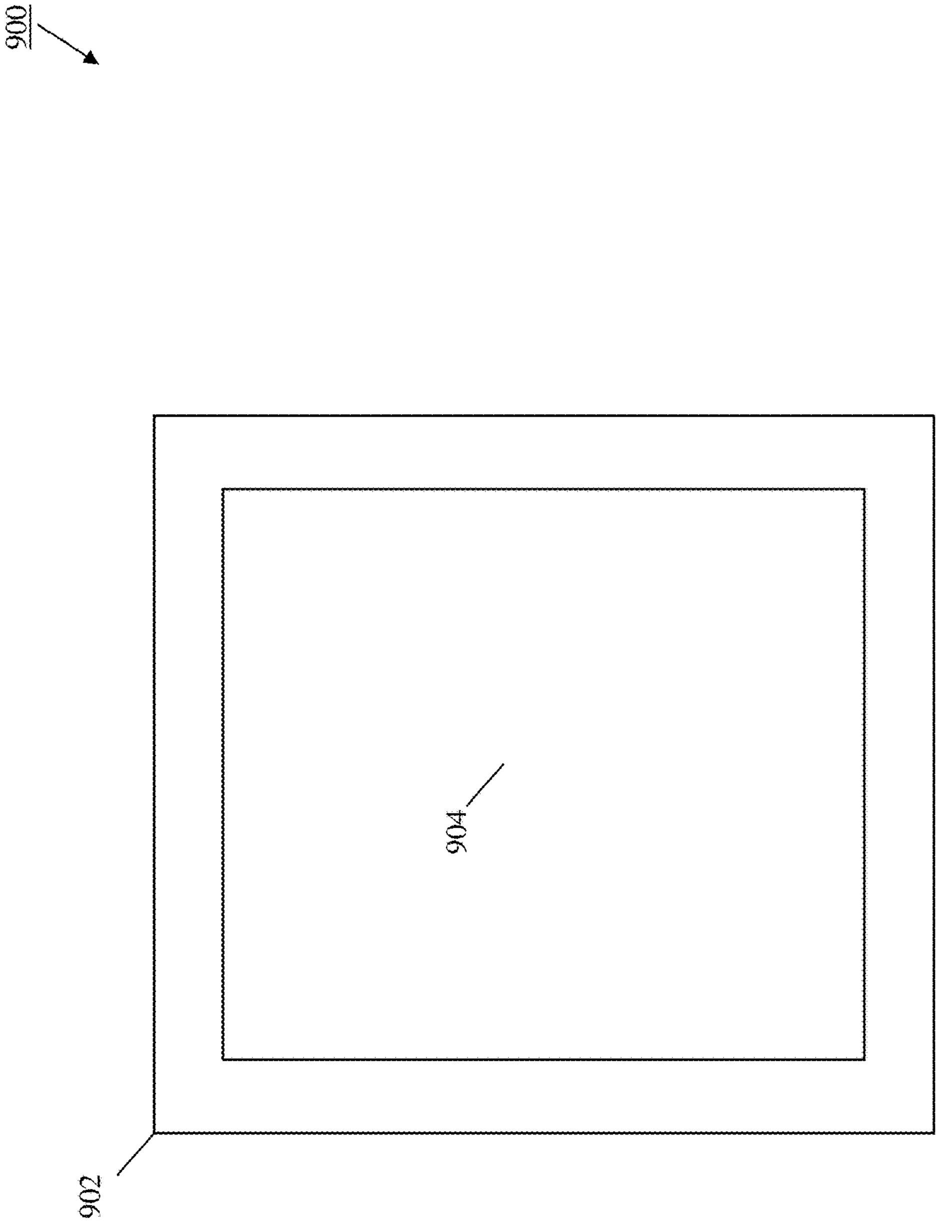
FIG. 9A is a top view illustrating an embodiment of a switch device that may be used in the racked GPU system of the present disclosure.
Figure 9B:
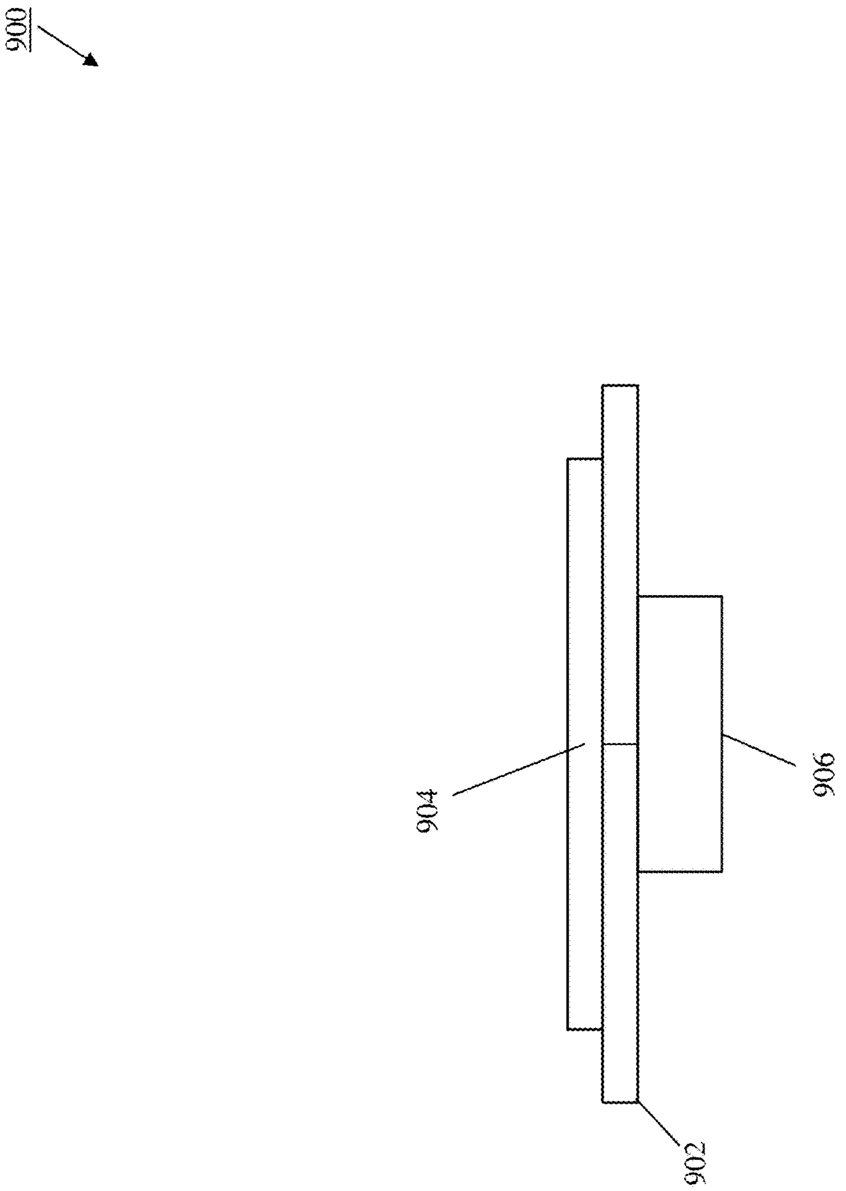
FIG. 9B is a side view illustrating an embodiment of the switch device of FIG. 9A.
Figure 9C:
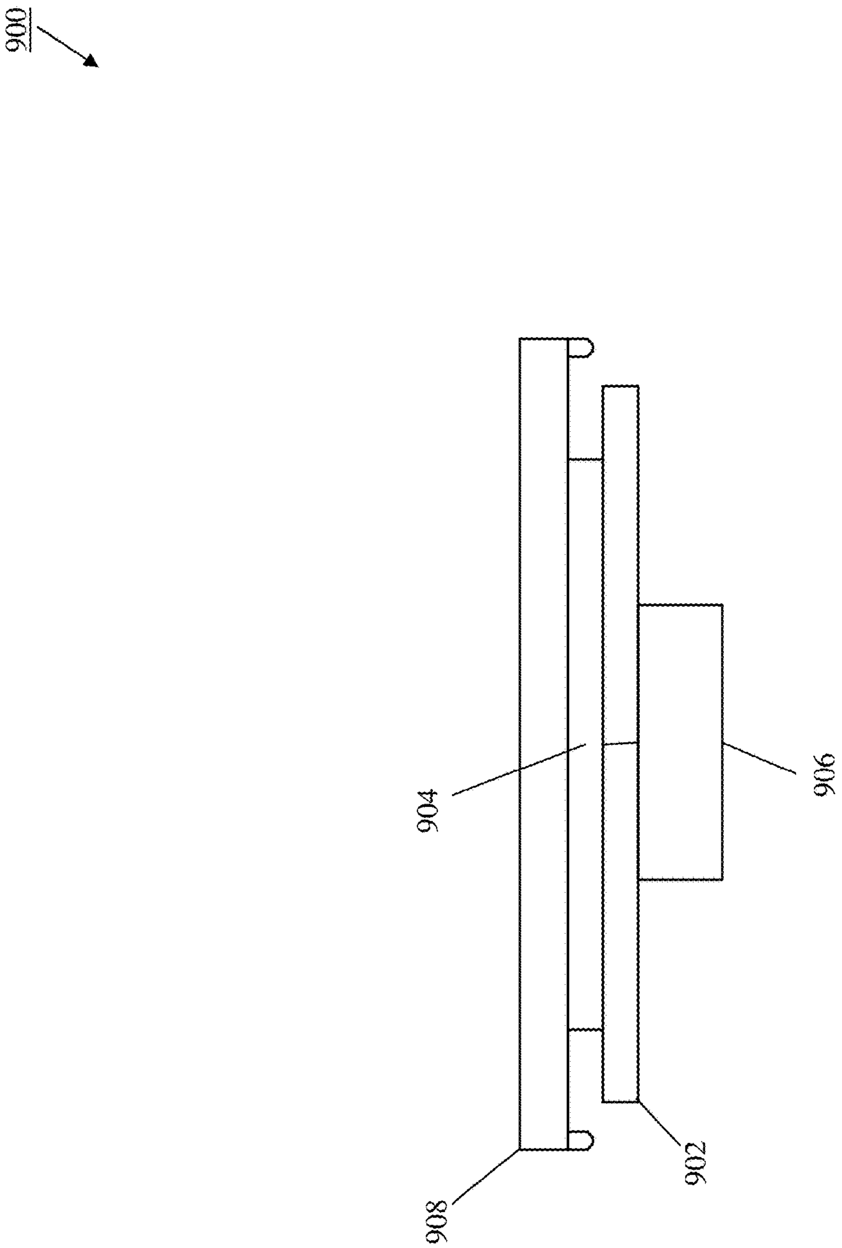
FIG. 9C is a schematic view illustrating an embodiment of a side view of the switch device of FIGS. 9A and 9B including a cooling device.

Referring now to FIGS. 9A, 9B, and 9C, an embodiment of a switch device 900 that may be utilized in the racked GPU system of the present disclosure is illustrated. As described below, the switch device 900 may be used in the rack GPU system of the present disclosure when that racked GPU system is populated with a plurality of the compute devices 800 described above with reference to FIG. 8. The switch device 900 includes a chassis 902 that supports the components of the switch device 900, only some of which are illustrated and described below. As described below, the chassis 902 may be provided by circuit board(s), sheet metal, and/or other chassis materials that one of skill in the art in possession of the present disclosure would recognize as providing the functionality described below. A networking processing device 904 is mounted to the chassis 902 and may be provided by a switching ASIC (e.g., the "Quantum-3" ASIC described above) and/or other networking processors that would be apparent to one of skill in the art in possession of the present disclosure. As will be appreciated by one of skill in the art in possession of the present disclosure, the networking processing device 904 also includes one hundred forty four bidirectional serial interfaces in the specific examples provided below.

As can be seen in FIGS. 9B and 9C, a passive cable system connector 906 is provided on the chassis 902 opposite the chassis 902 from the networking processing device 904 and is connected to that networking processing device 904, and one of skill in the art in possession of the present disclosure will appreciate how the illustrated placement of the networking processing device 904 and the passive cable system connector 906 may be provided to minimize circuit board signal losses. FIG. 9C illustrates how the switch device 900 may include a cooling device 908 that engages the networking processing device 904, and while not illustrated or described in detail blow, one of skill in the art in possession of the present disclosure will appreciate how the cooling device 908 may be coupled to cooling fluid supply and exhaust couplings in the racked GPU system described below.

Figure 10A:
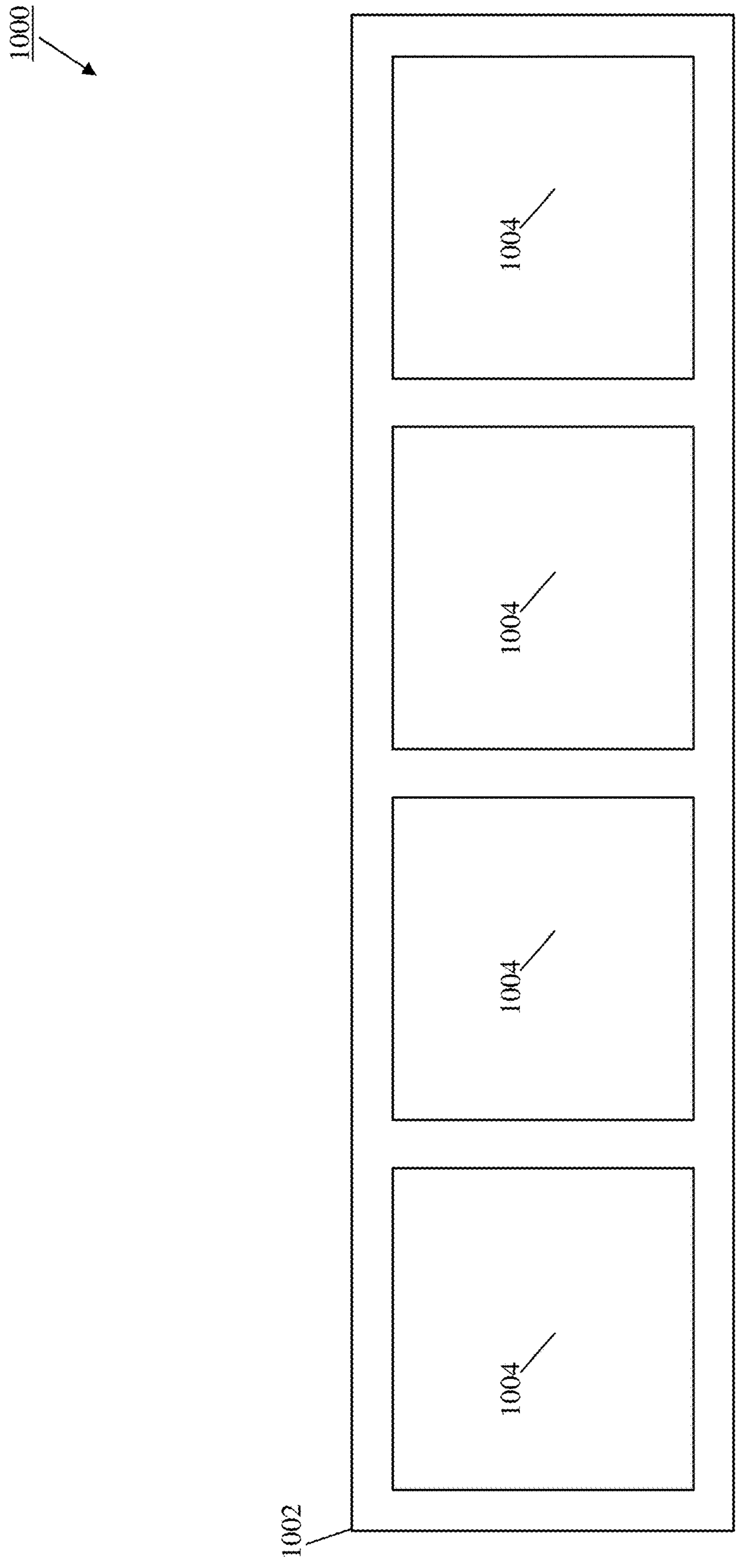
FIG. 10A is a top view illustrating an embodiment of a switch device group that may be used in the racked GPU system of the present disclosure.
Figure 10B:
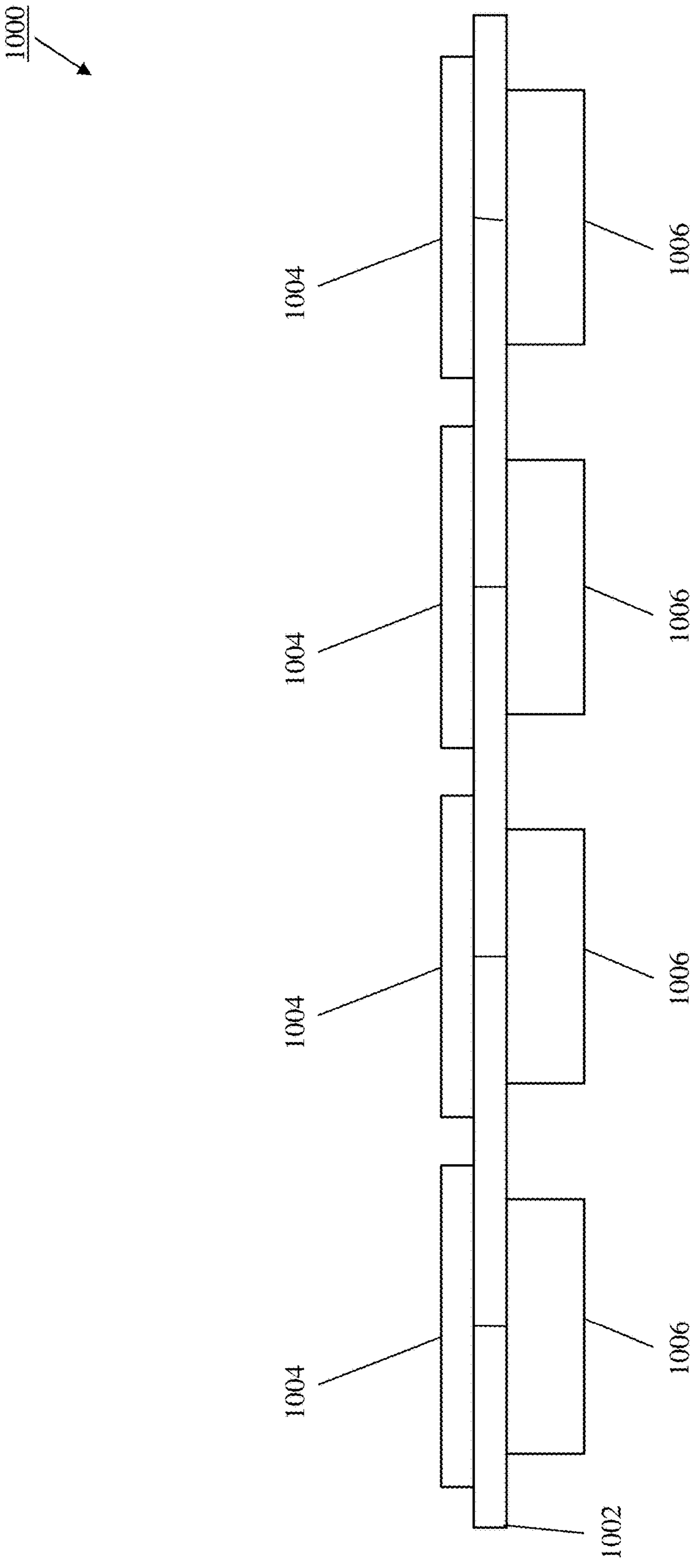
FIG. 10B is a side view illustrating an embodiment of the switch device group of FIG. 10A.
Figure 10C:
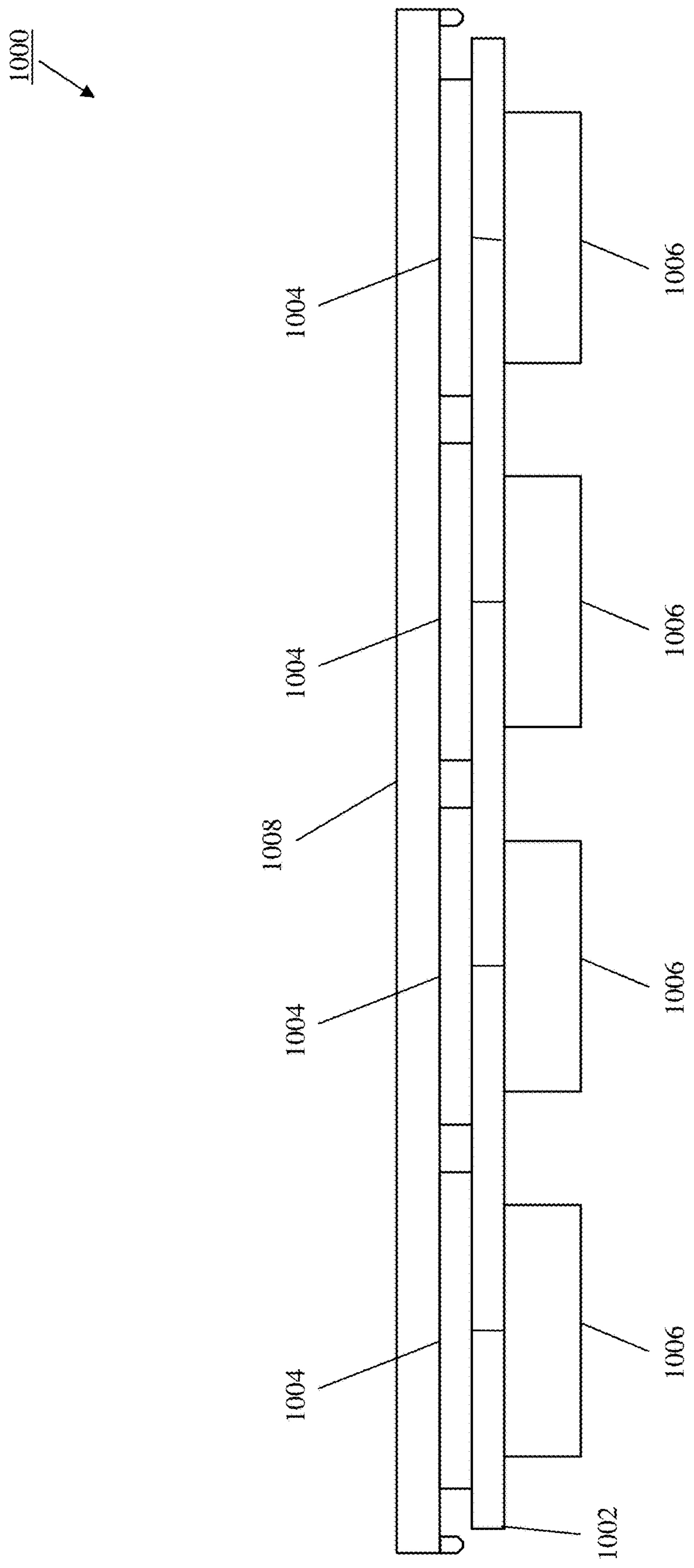
FIG. 10C is a schematic view illustrating an embodiment of a side view of the switch device group of FIGS. 10A and 10B including a cooling device.

Referring now to FIGS. 10A, 10B, and 10C, an embodiment of a switch device group 1000 utilized in the racked GPU system of the present disclosure is illustrated. As described below, the switch device group 1000 may be used in the rack GPU system of the present disclosure when that racked GPU system is populated with a plurality of the conventional compute devices 400 described above with reference to FIG. 4. The switch device group 1000 includes a chassis 1002 that supports the components of the switch device group 1000, only some of which are illustrated and described below. As described below, the chassis 1002 may be provided by circuit board(s), sheet metal, and/or other chassis materials that one of skill in the art in possession of the present disclosure would recognize as providing the functionality described below. The switch device group 1000 includes four switch devices provided by four networking processing devices 1004 that are mounted to the chassis 1002 and may each be provided by a switching ASIC (e.g., the "Quantum-3" ASIC described above) and/or other networking processors that would be apparent to one of skill in the art in possession of the present disclosure. As will be appreciated by one of skill in the art in possession of the present disclosure, each the networking processing devices 1004 also includes thirty-six networking processor connectors in the specific examples provided below.

As can be seen in FIGS. 10B and 10C, a respective passive cable system connector 1006 is provided on the chassis 1002 opposite the chassis 1002 from a respective one of the networking processing devices 1004 and is connected to that networking processing device 1004, and one of skill in the art in possession of the present disclosure will appreciate how the illustrated placement of each pair of networking processing device 1004/passive cable system connector 1006 may be provided to minimize circuit board signal losses. FIG. 10C illustrates how the switch device group 1000 may include a cooling device 1008 that engages each of the networking processing devices 1004, and while not illustrated or described in detail blow, one of skill in the art in possession of the present disclosure will appreciate how the cooling device 1008 may be coupled to cooling fluid supply and exhaust couplings in the racked GPU system described below.

Referring now to FIGS. 11A, 11B, 11C, and 11D, an embodiment of a switch device group 1100 utilized in the racked GPU system of the present disclosure is illustrated. As described below, the switch device 1100 may be used in the rack GPU system of the present disclosure when that racked GPU system is populated with a plurality of the conventional compute devices 400 described above with reference to FIG. 4 and utilizes the rack system 200 described above with reference to FIG. 2 that includes the rack power system 602 described above with reference to FIG. 6A. The switch device group 1100 includes a chassis 1102 that supports the components of the switch device group 1100, only some of which are illustrated and described below. As described below, the chassis 1102 may be provided by circuit board(s), sheet metal, and/or other chassis materials that one of skill in the art in possession of the present disclosure would recognize as providing the functionality described below. The switch device group 1100 includes four switch devices provided by four networking processing devices 1004 that are mounted to the chassis 1102 and may each be provided by a switching ASIC (e.g., the "Quantum-3" ASIC described above) and/or other networking processors that would be apparent to one of skill in the art in possession of the present disclosure. As will be appreciated by one of skill in the art in possession of the present disclosure, each the networking processing devices 1104 also includes thirty-six networking processor connectors in the specific examples provided below.

Figure 11A:
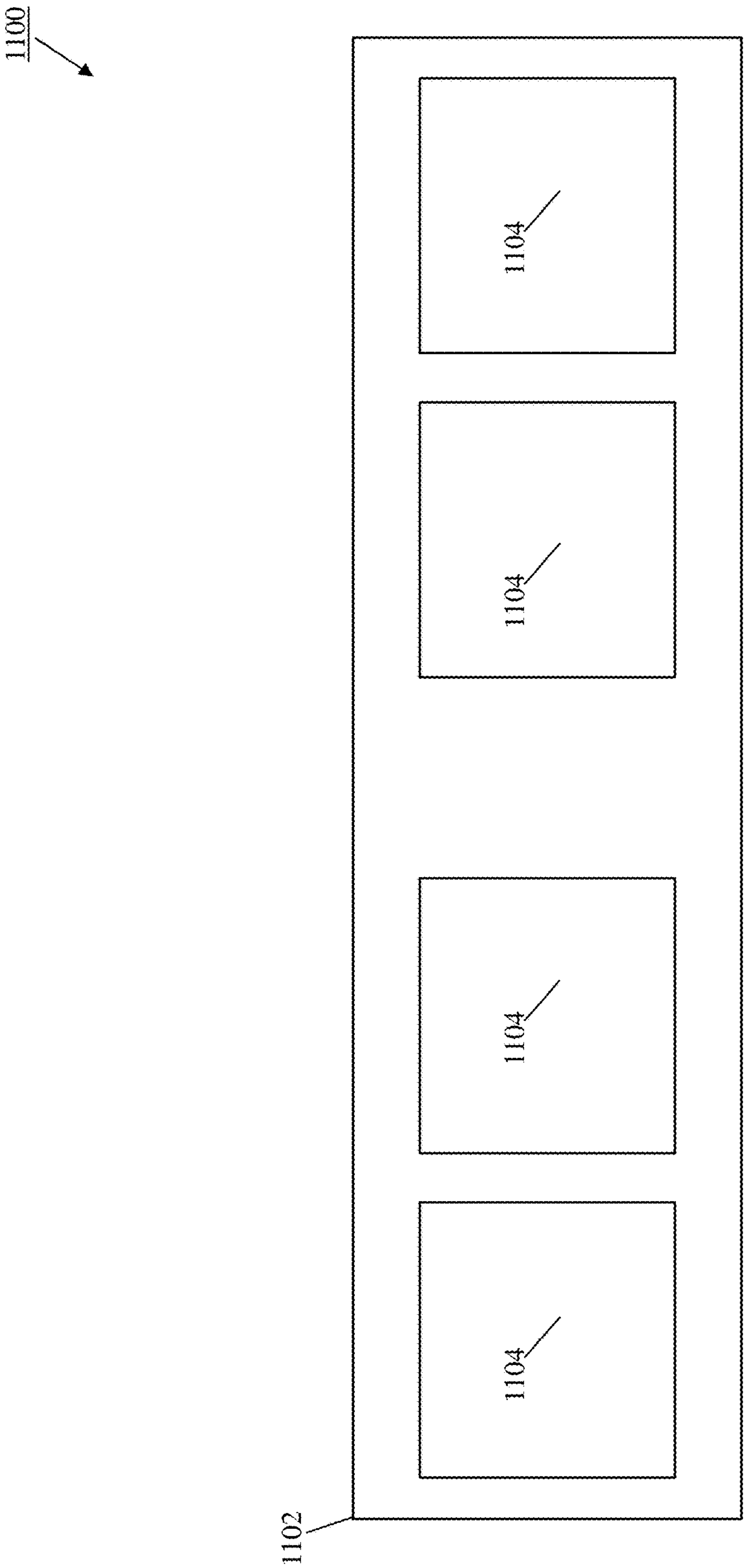
FIG. 11A is a top view illustrating an embodiment of a switch device group that may be used in the racked GPU system of the present disclosure.
Figure 11B:
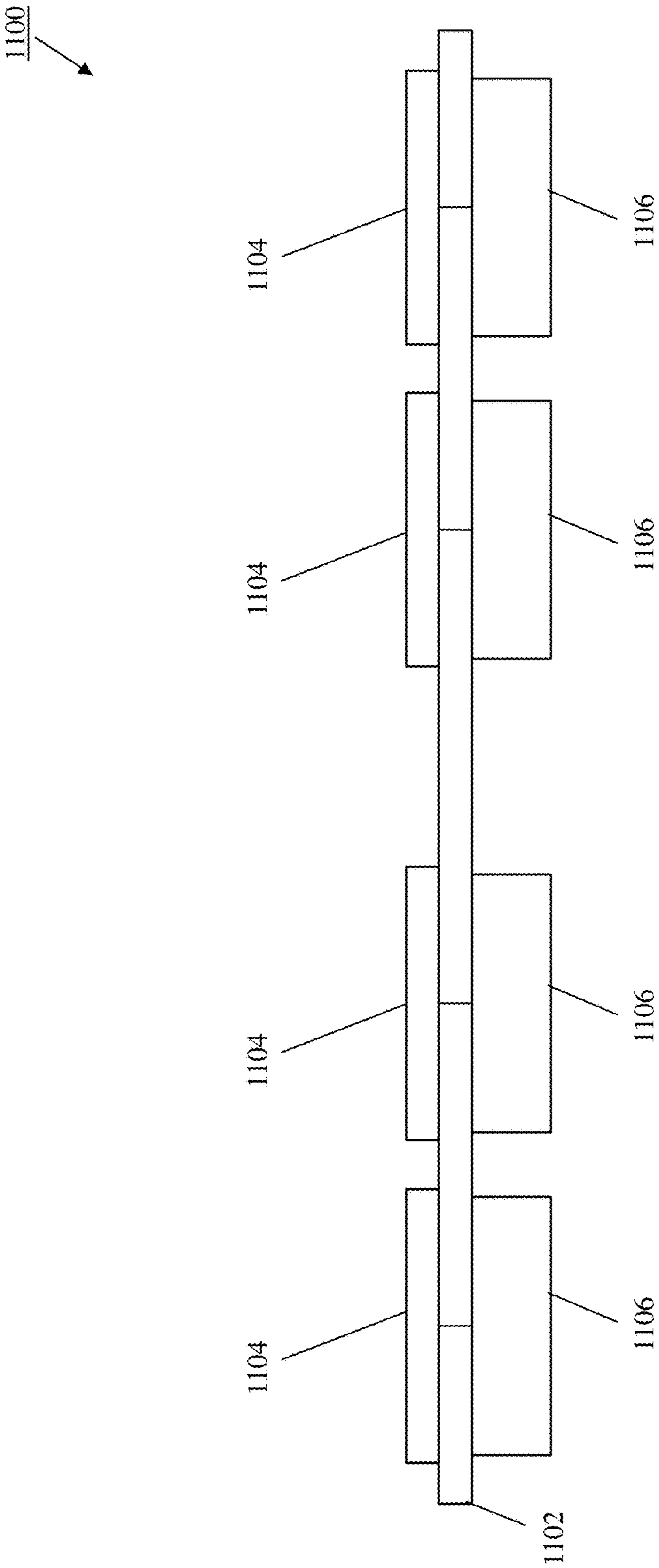
FIG. 11B is a side view illustrating an embodiment of the switch device group of FIG. 11A.
Figure 11C:
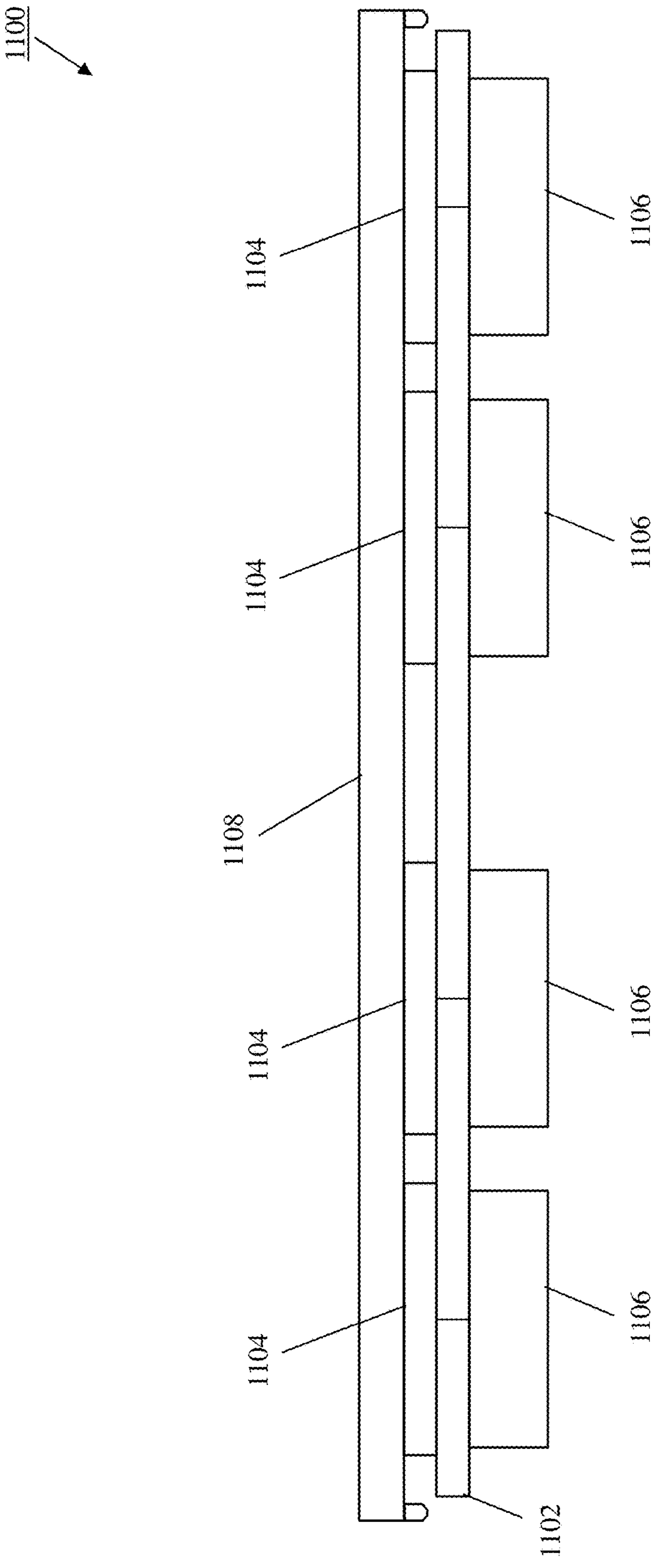
FIG. 11C is a schematic view illustrating an embodiment of a side view of the switch device group of FIGS. 11A and 11B including a cooling device.

As can be seen in FIGS. 11B and 11C, a respective passive cable system connector 1106 is provided on the chassis 1102 opposite the chassis 1102 from a respective one of the networking processing devices 1104 and is connected to that networking processing device 1104, and one of skill in the art in possession of the present disclosure will appreciate how the illustrated placement of each pair of networking processing device 1104/passive cable system connector 1106 may be provided to minimize circuit board signal losses. FIG. 11C illustrates how the switch device group 1100 may include a cooling device 1108 that engages each of the networking processing devices 1104, and while not illustrated or described in detail blow, one of skill in the art in possession of the present disclosure will appreciate how the cooling device 1108 may be coupled to cooling fluid supply and exhaust couplings in the racked GPU system described below.

As will be appreciated by one of skill in the art in possession of the present disclosure, in the racked GPU system of the present disclosure, all of the GPU devices will be connected to all of networking processing devices in order to operate as described below, which will require both "vertical" cross connections (i.e., connections between compute devices in the same column) and "horizontal" cross connections (i.e., connections between compute devices in the same row). Furthermore, one of skill in the art in possession of the present disclosure will appreciate how the passive cable systems of the present disclosure may provide the "vertical" cross connections. As will be appreciated by one of skill in the art in possession of the present disclosure, in some embodiments, each "horizontal" cross connection may be provided by the compute device 800 of the present disclosure. As will also be appreciated by one of skill in the art in possession of the present disclosure, in other embodiments, the compute device 400 does not provide "horizontal" cross connections, and the switch device groups 1000 and 1100 are used to provide the "horizontal" cross connections, as described in detail below. The remaining discussion below focuses on this case.

Figure 11D:
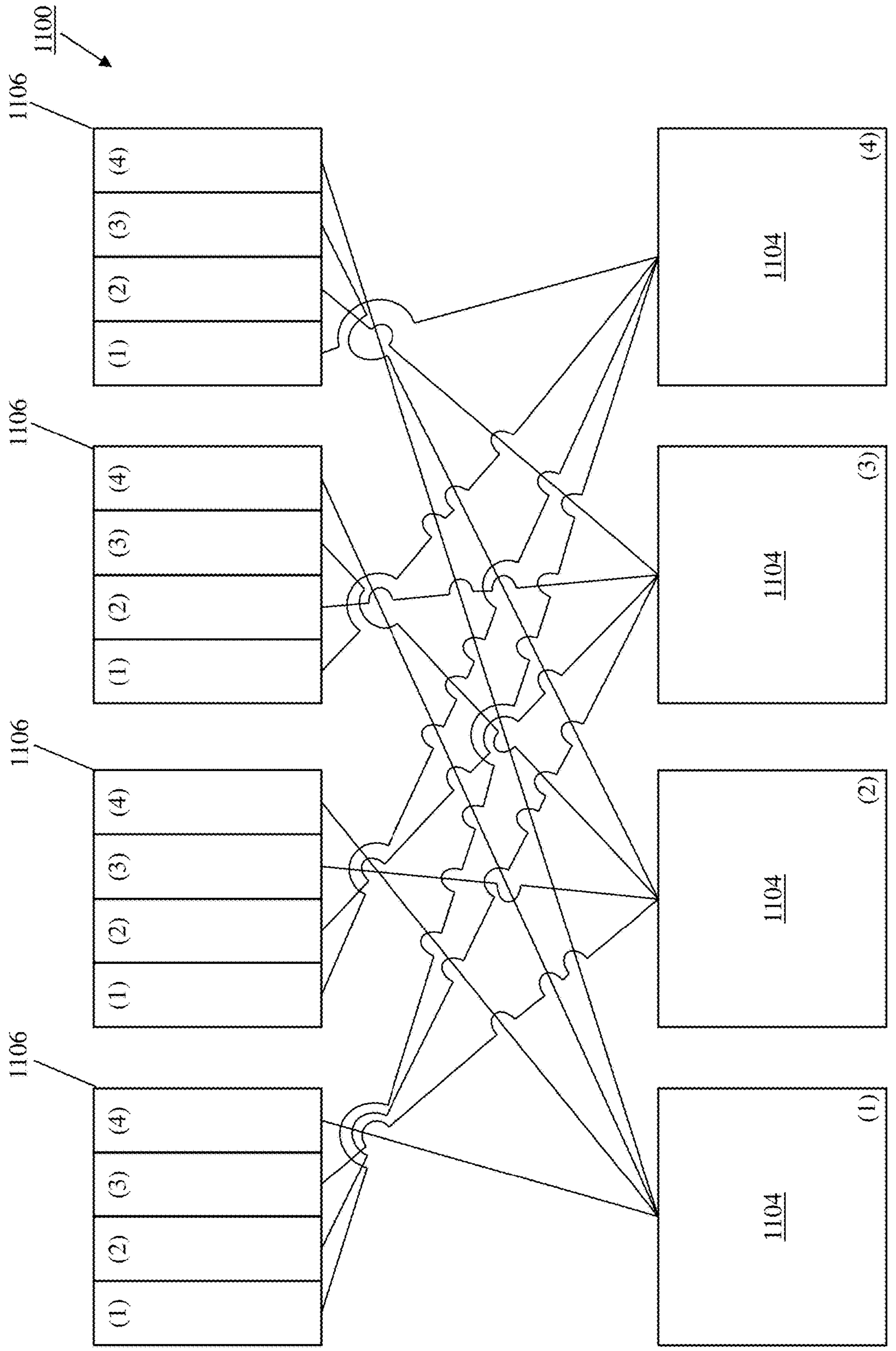
FIG. 11D is a schematic view illustrating an embodiment of connections between connectors and networking processing devices on the switch device group of FIGS. 11A-11C.

As discussed below, the passive cable system used with the switch device group 1100 requires "horizontal cross connections" to be provided by the switch device group (i.e., as opposed to the compute device 800 used with the switch devices 900 that provides those "horizontal cross connections", and passive cable system used with the switch device group 1000 that provides those "horizontal cross connections"), and FIG. 11D illustrates an embodiment of such "horizontal cross connections". In the embodiment illustrated in FIG. 11D, each of the connectors 1106 includes sub-connectors labeled "1", "2", "3", and "4", and each of the networking processing devices 1104 has been labeled "1", "2", "3", and "4". As can be seen in FIG. 11D, the "1" networking processing device 1104 is connected to the "4" sub-connector on each of the connectors 1106, the "2" networking processing device 1104 is connected to the "3" sub-connector on each of the connectors 1106, the "3" networking processing device 1104 is connected to the "2" sub-connector on each of the connectors 1106, and the "4" networking processing device 1104 is connected to the "1" sub-connector on each of the connectors 1106. As will be appreciated by one of skill in the art in possession of the present disclosure, each of the connections illustrated in FIG. 11D (or similar connections providing similar functionality) may be provided by traces or other circuit board connections, Y-connector flyover cables, and/or using any other connection techniques that would be apparent to one of skill in the art in possession of the present disclosure.

Figure 12A:
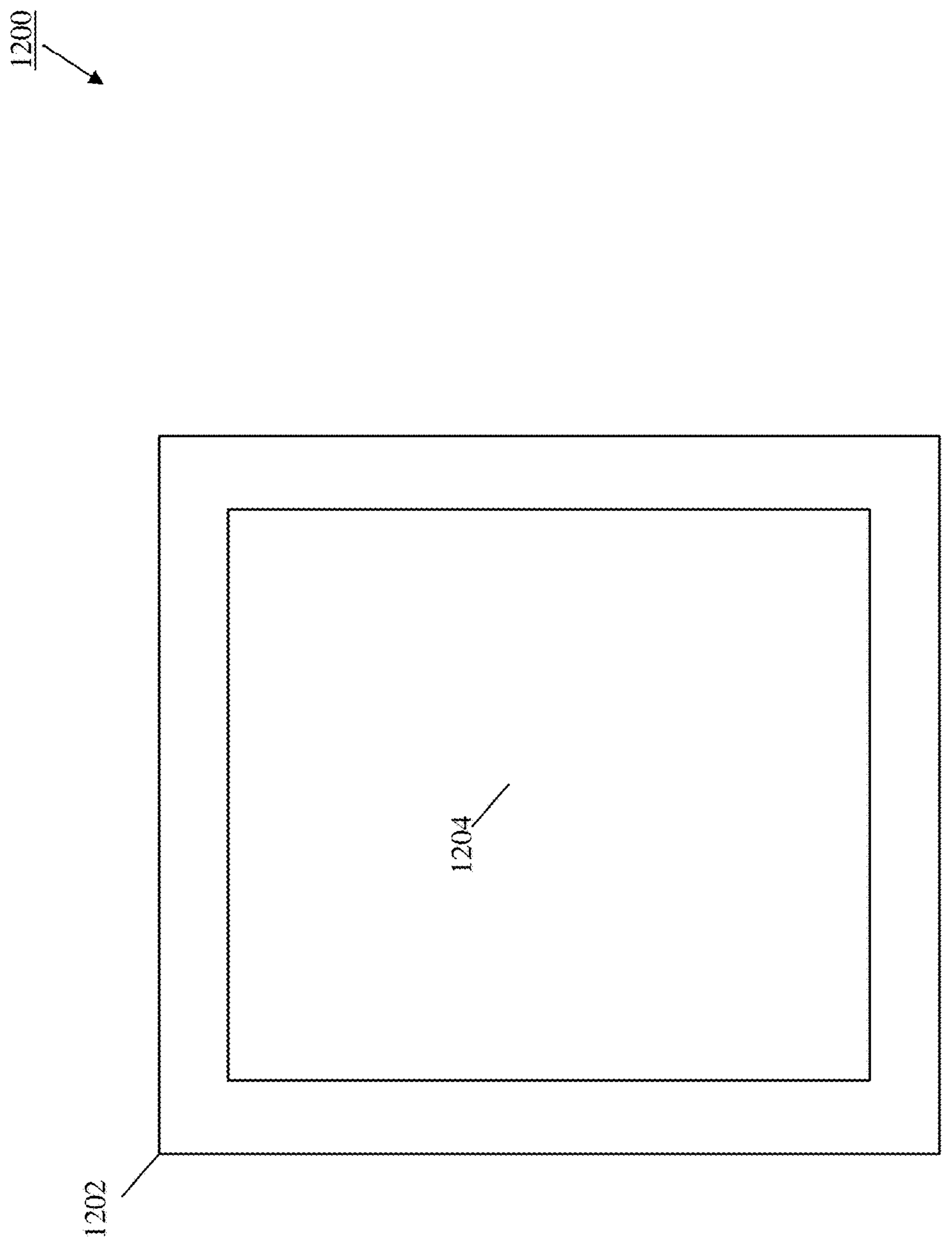
FIG. 12A is a top view illustrating an embodiment of a management device that may be used in the racked GPU system of the present disclosure.
Figure 12B:
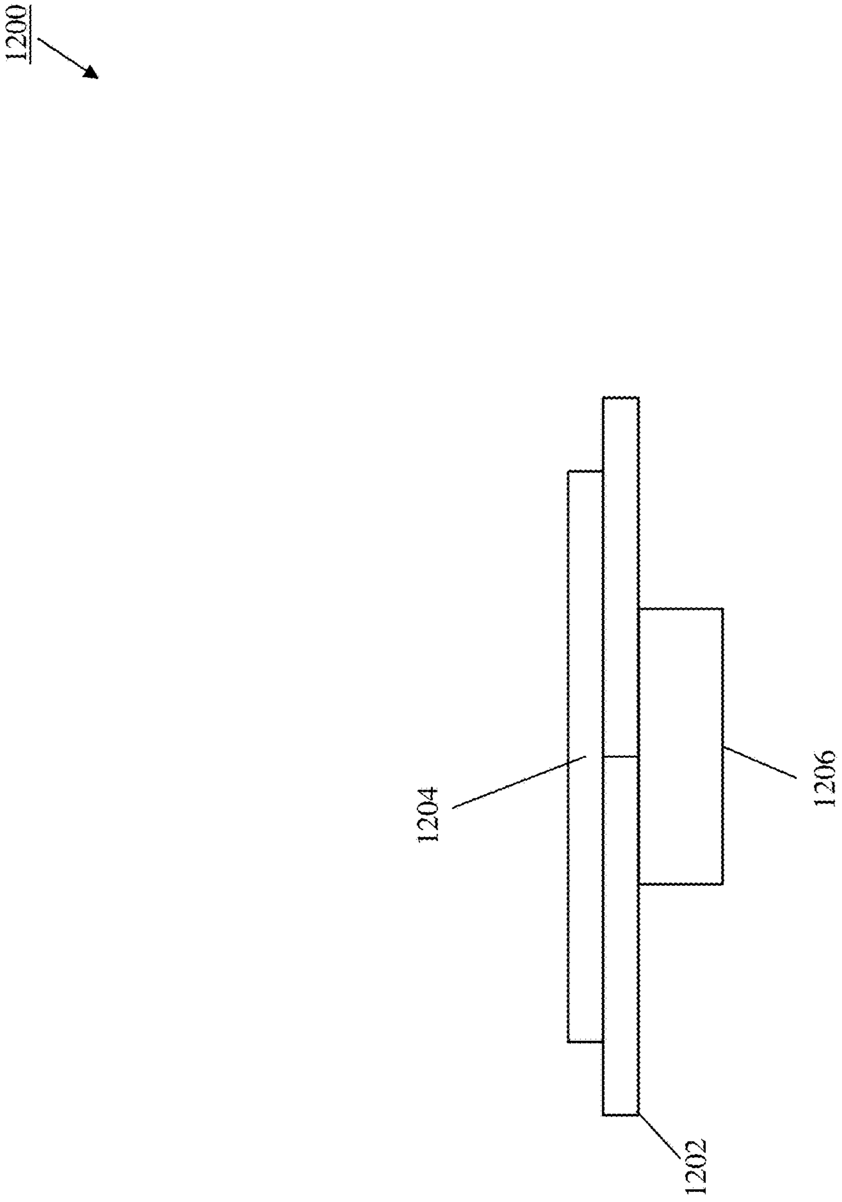
FIG. 12B is a side view illustrating an embodiment of the management device of FIG. 12A.

Referring now to FIGS. 12A and 12B, an embodiment of a management device 1200 that may be utilized in the racked GPU system of the present disclosure is illustrated. As described below, the management device 1200 may be used in the rack GPU system of the present disclosure to manage the switch devices 900 described above with reference to FIGS. 9A-9C. The management device 1200 includes a chassis 1202 that supports the components of the management device 1200, only some of which are illustrated and described below. As described below, the chassis 1202 may be provided by circuit board(s), sheet metal, and/or other chassis materials that one of skill in the art in possession of the present disclosure would recognize as providing the functionality described below. A management processing device 1204 is mounted to the chassis 1202 and may be provided by a Central Processing Unit (CPU) and/or other management processors that would be apparent to one of skill in the art in possession of the present disclosure. As can be seen in FIG. 12B, a passive cable system connector 1206 is provided on the chassis 1202 opposite the chassis 1202 from the management processing device 1204 and is connected to that management processing device 1204.

Figure 13A:
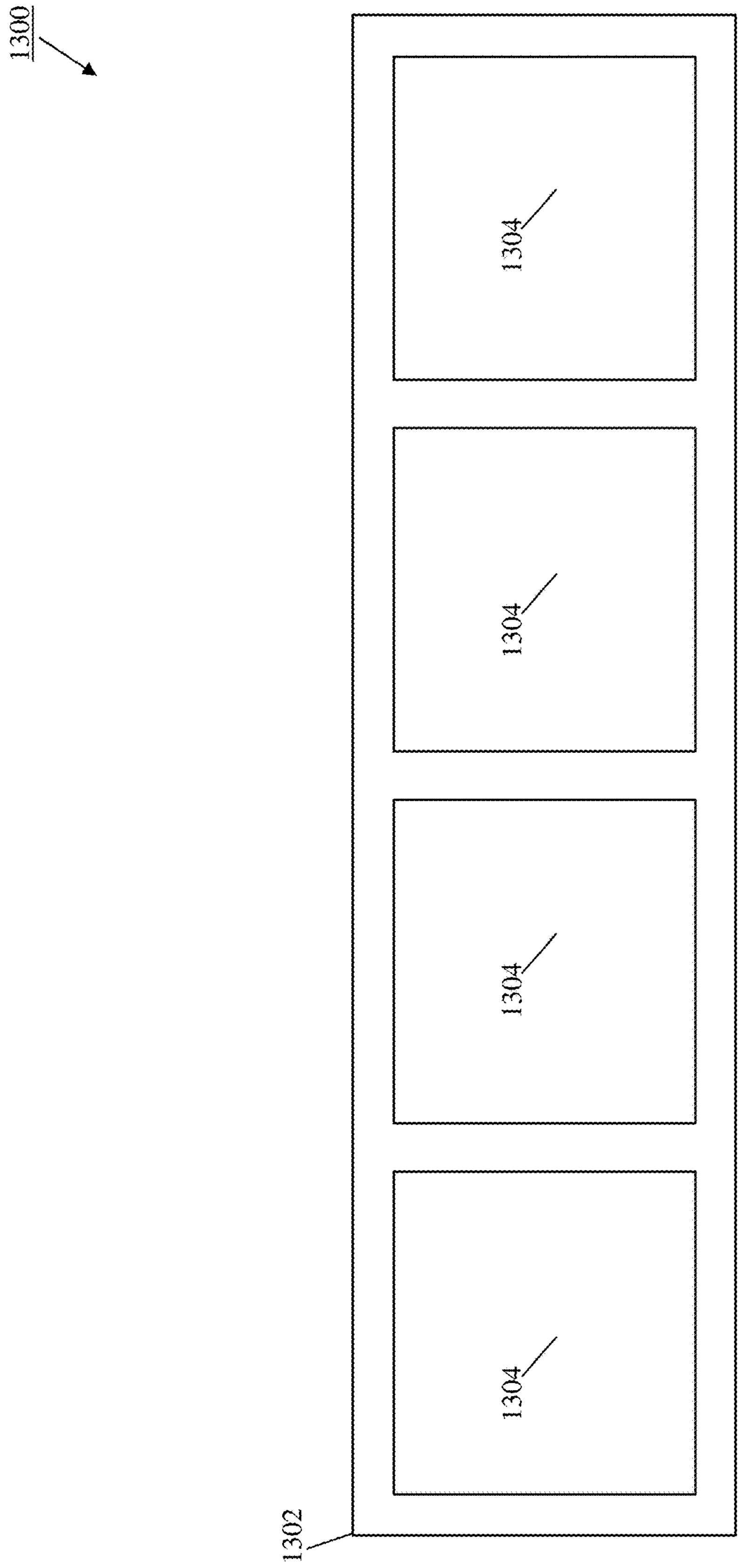
FIG. 13A is a top view illustrating an embodiment of a management device group that may be used in the racked GPU system of the present disclosure.
Figure 13B:
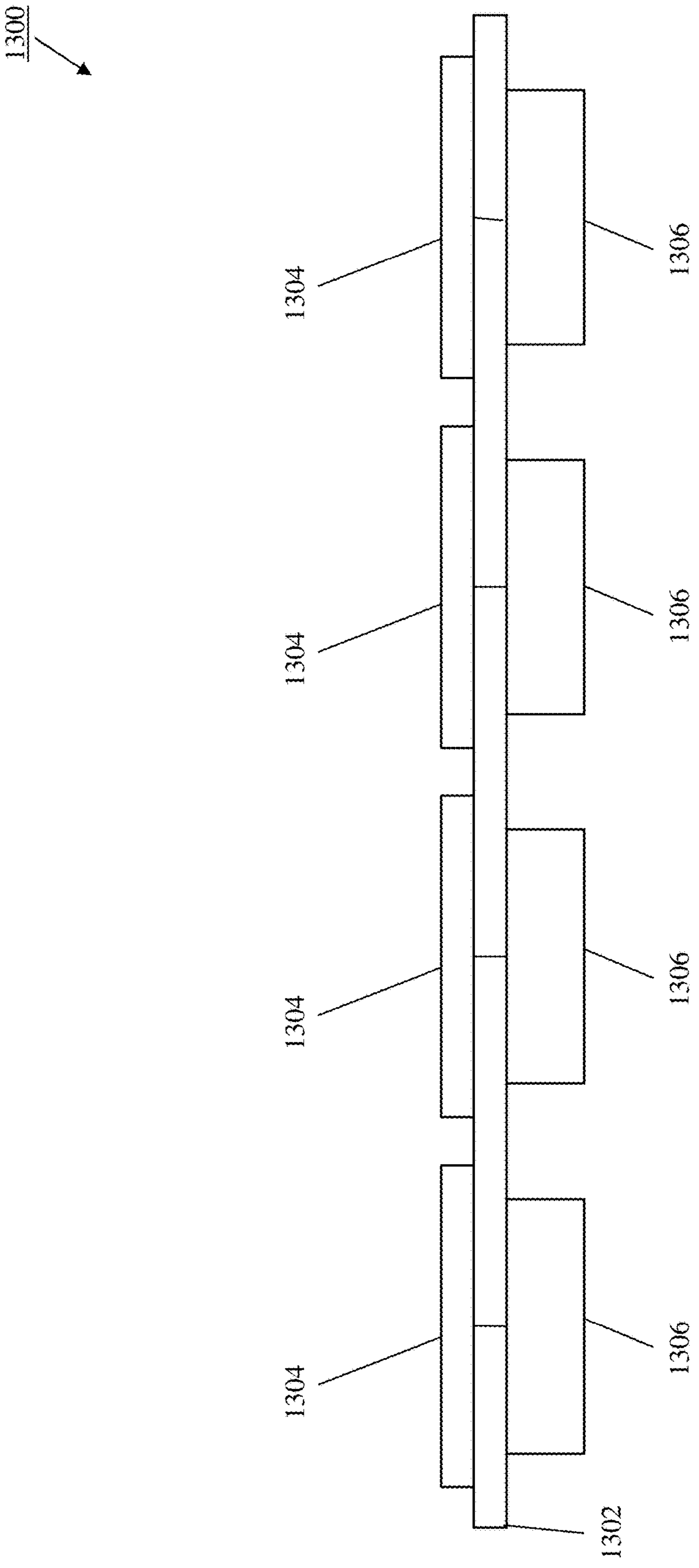
FIG. 13B is a side view illustrating an embodiment of the management device group of FIG. 13A.

Referring now to FIGS. 13A and 13B, an embodiment of a management device group 1300 utilized in the racked GPU system of the present disclosure is illustrated. As described below, the management device group 1300 may be used in the rack GPU system of the present disclosure to manage switch devices in the switch device groups 1000. The management device group 1300 includes a chassis 1302 that supports the components of the management device group 1300, only some of which are illustrated and described below. As described below, the chassis 1302 may be provided by circuit board(s), sheet metal, and/or other chassis materials that one of skill in the art in possession of the present disclosure would recognize as providing the functionality described below. The management device group 1300 includes four management devices provided by four management processing devices 1304 that are mounted to the chassis 1302 and may each be provided by a Central Processing Unit (CPU) and/or other management processors that would be apparent to one of skill in the art in possession of the present disclosure. As can be seen in FIG. 13B, a respective passive cable system connector 1306 is provided on the chassis 1302 opposite the chassis 1302 from a respective one of the management processing devices 1304 and is connected to that management processing device 1304.

Figure 14A:
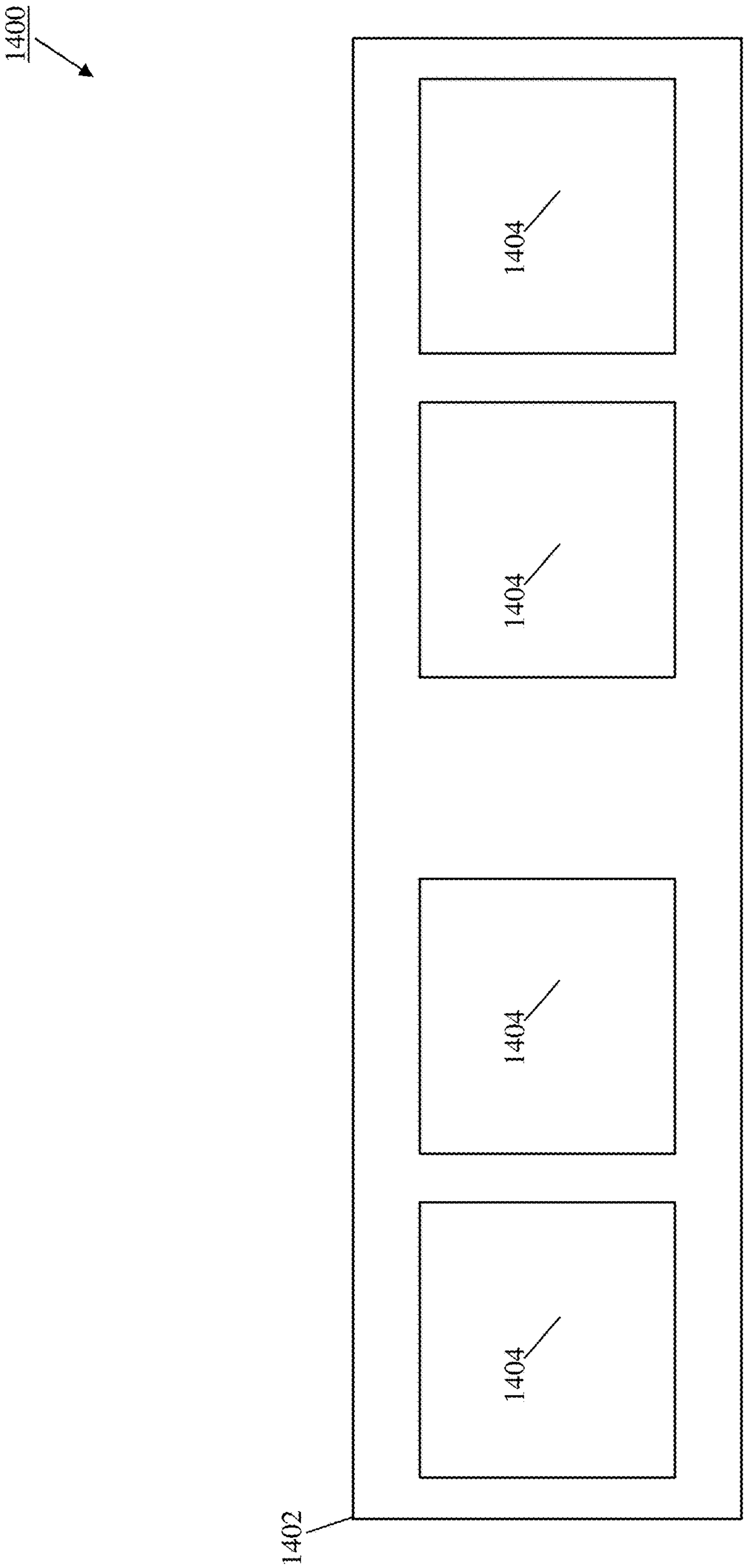
FIG. 14A is a top view illustrating an embodiment of a management device group that may be used in the racked GPU system of the present disclosure.
Figure 14B:
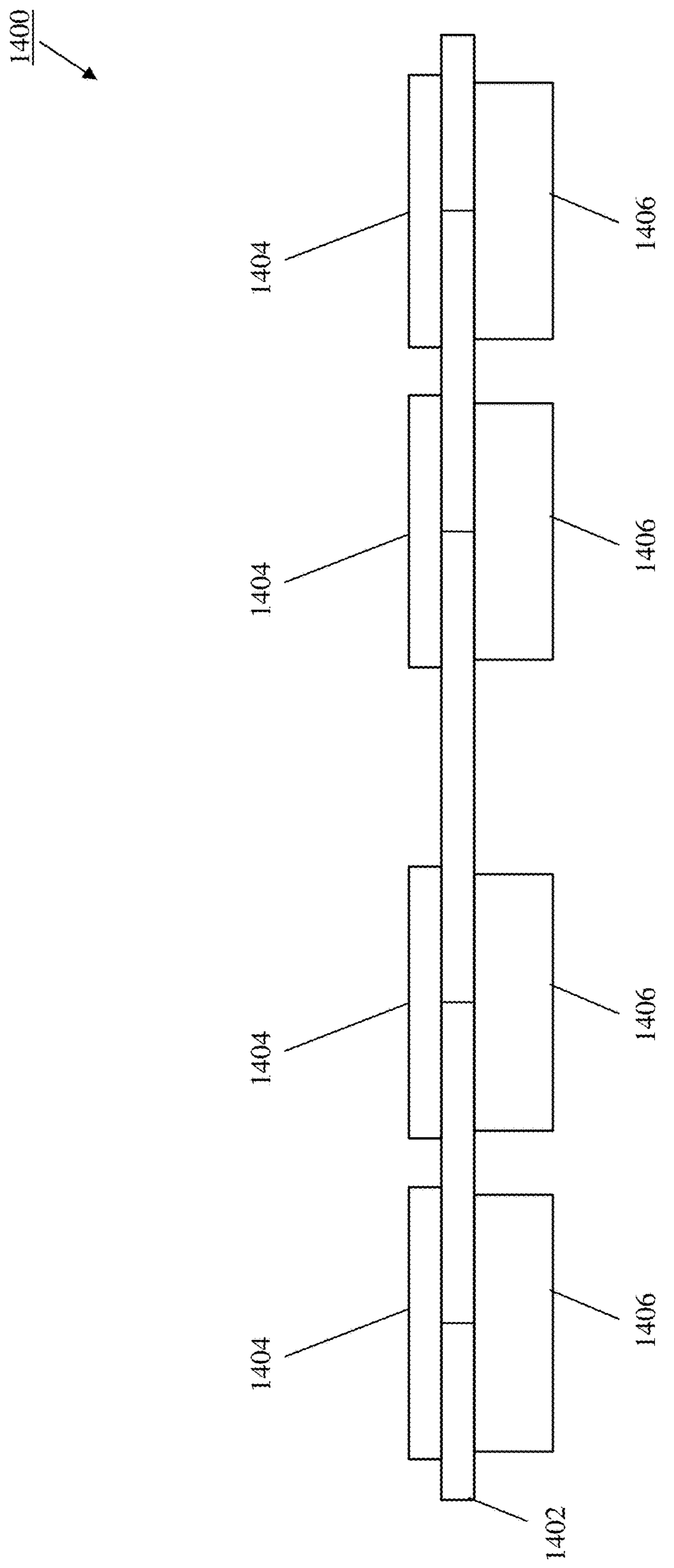
FIG. 14B is a side view illustrating an embodiment of the management device group of FIG. 14A.

Referring now to FIGS. 14A, 14B, and 14C, an embodiment of a management device group 1400 utilized in the racked GPU system of the present disclosure is illustrated. As described below, the management device group 1400 may be used in the rack GPU system of the present disclosure to manage switch devices in the switch device groups 1100. The management device group 1400 includes a chassis 1402 that supports the components of the management device group 1400, only some of which are illustrated and described below. As described below, the chassis 1402 may be provided by circuit board(s), sheet metal, and/or other chassis materials that one of skill in the art in possession of the present disclosure would recognize as providing the functionality described below. The management device group 1400 includes four management devices provided by four management processing devices 1404 that are mounted to the chassis 1402 and may each be provided by a Central Processing Unit (CPU) and/or other management processors that would be apparent to one of skill in the art in possession of the present disclosure. As can be seen in FIG. 14B, a respective passive cable system connector 1406 is provided on the chassis 1402 opposite the chassis 1402 from a respective one of the management processing devices 1404 and is connected to that management processing device 1404.

With reference to FIGS. 15A, 15B, 15C, and 15D, an embodiment of a passive cable subsystem 1500 is illustrated that may be included in the passive cable system in the racked GPU system of the present disclosure that uses four of the passive cable subsystems 1500. The passive cable subsystem 1500 includes a chassis 1502 that houses the components of the passive cable subsystem 1500, only some of which are illustrated and described below. In the illustrated example, the chassis 1502 includes a top surface 1502*a*, a bottom surface 1502*b* that is located opposite the chassis 1502 from the top surface 1502*a*, a pair of opposing side surface 1502*c* and 1502*d* that are located opposite the chassis 1502 from each other and that extend between the top surface 1502*a* and the bottom surface 1502*b*, a switch device connection surface 1502*e* that extends between the top surface 1502*a*, the bottom surface 1502*b*, and the side surfaced 1502*c* and 1502*d*, and a compute device connection surface 1502*f* that is located opposite the chassis 1502 from the switch system connection surface 1502*d* and that extends between the top surface 1502*a*, the bottom surface 1502*b*, and the side surfaces 1502*c* and 1502*d*.

In the illustrated example, a switch device connector group 1504 is provided on the switch device connection surface 1502*e* and includes nine switch device connectors provided in a vertically aligned orientation, while a management device connector 1506 is provided on the switch device connection surface 1502*e* between the switch device connector group 1504 and the bottom surface 1502*b* of the chassis 1502. As will be appreciated by one of skill in the art in possession of the present disclosure, each management device connector 1506 is coupled to the nine switch device connectors in its switch device connector group 1504, and may be provided by a different type of connector than those switch device connectors. Furthermore, thirty-six compute device connectors 1508 are provided on the compute device connection surface 1502*f* in a vertically aligned orientation.

Figure 15A:
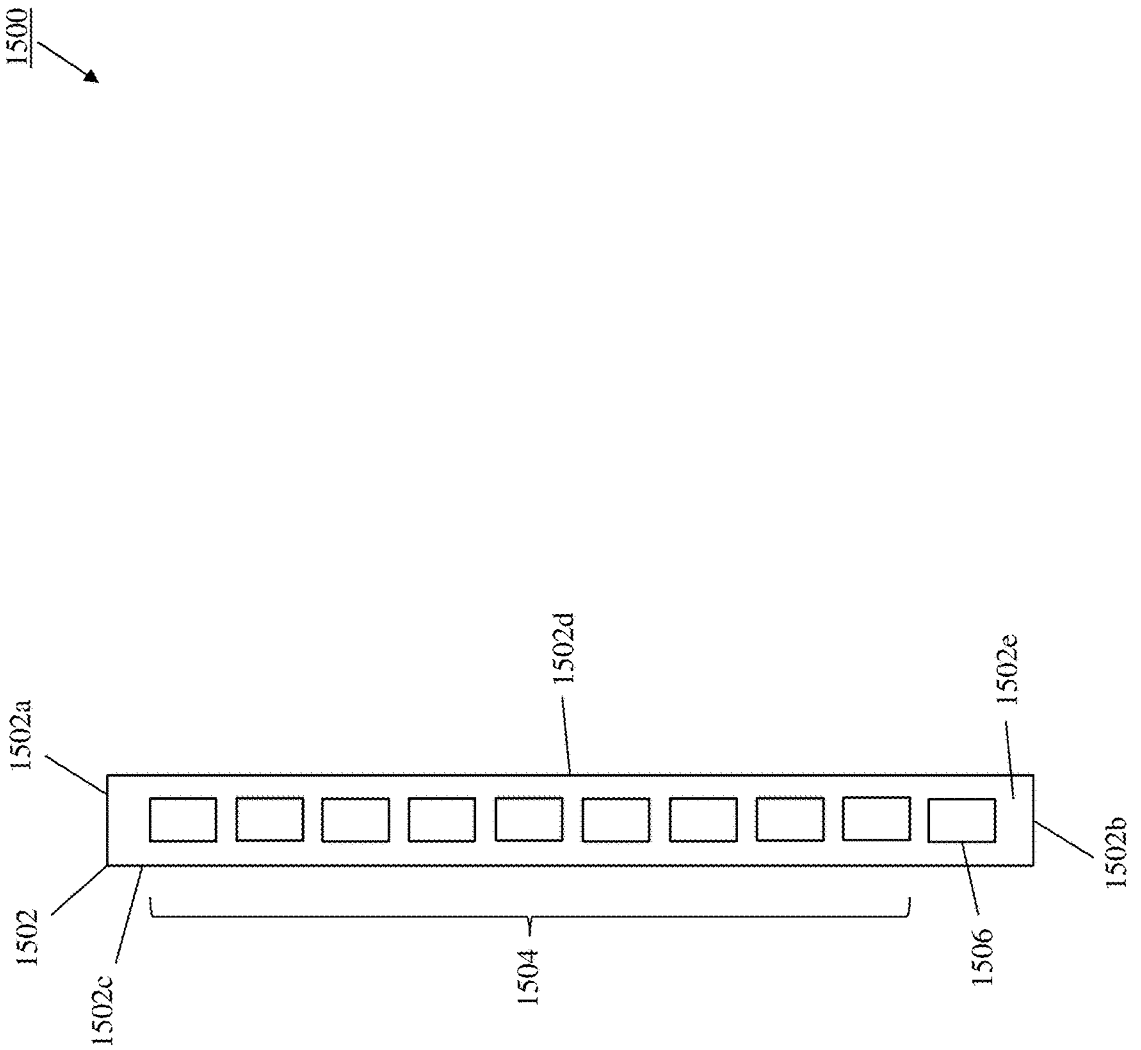
FIG. 15A is a front view illustrating an embodiment of a passive cable subsystem used in the racked GPU system of the present disclosure.
Figure 15B:
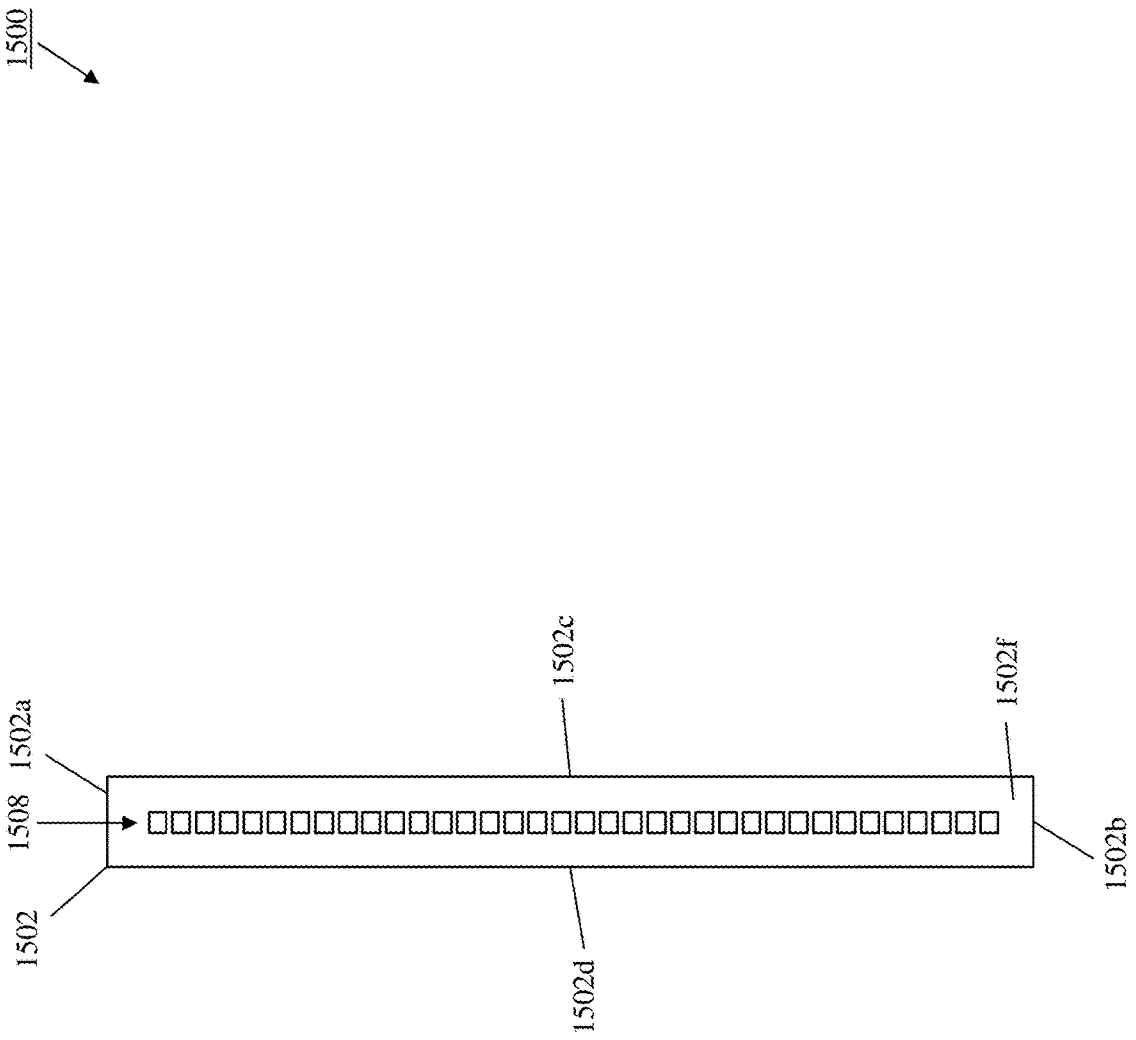
FIG. 15B is a rear view illustrating an embodiment of the passive cable subsystem of FIG. 15B.
Figure 15C:
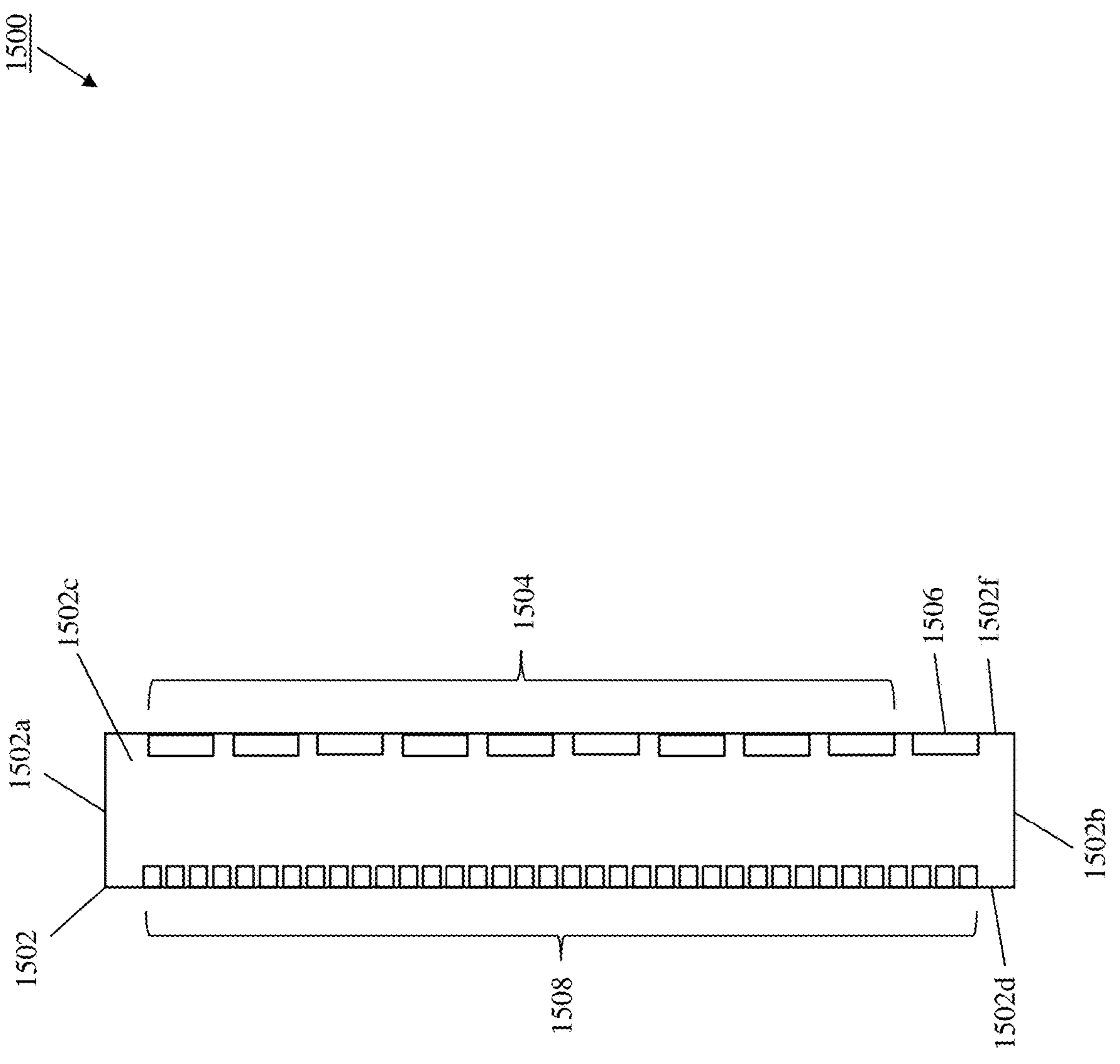
FIG. 15C is a cross-sectional view illustrating an embodiment of the passive cable subsystem of FIGS. 15A and 15B.
Figure 15D:
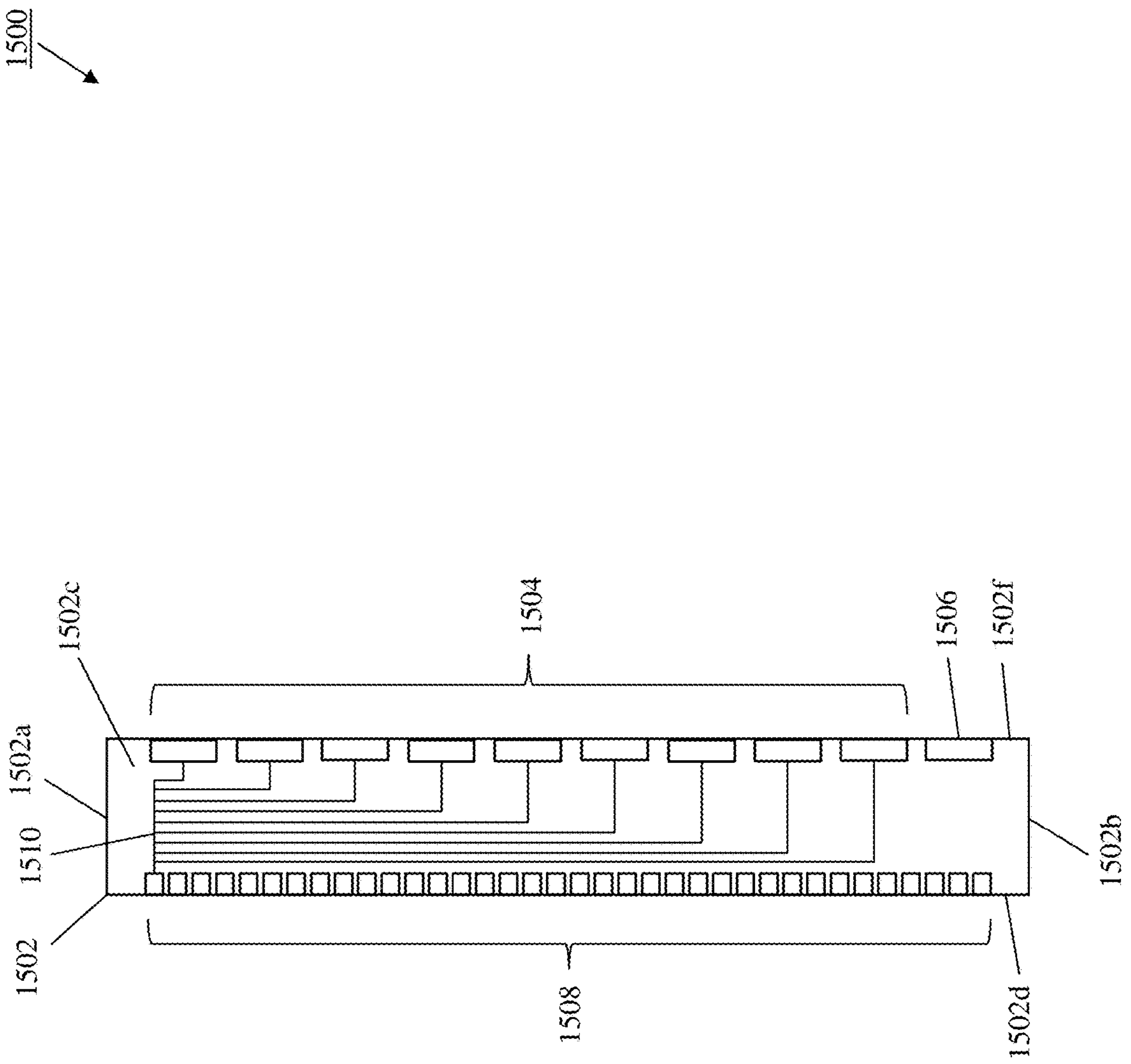
FIG. 15D is a schematic view illustrating connections provided in the passive cable subsystem of FIGS. 15A-15C.

With reference to FIG. 15D, an embodiment of a connection system 1510 that provides connections between a "first" compute device connector 1508 on the passive cable subsystem 1500 (i.e., the compute device connector 1508 adjacent the "top" of the passive cable subsystem 1500 in FIG. 15D) and each of the switch device connectors in the switch device connector group 1504 is illustrated. For example, the connection system 1510 may be provided by a breakout cable (e.g., a copper twin-axial breakout cable) that includes a primary connector connected to the "first" compute device connector 1508, as well as nine breakout connectors that extend from the primary connector via respective breakout sub-cables that are provided with respective lengths that allow each of those nine breakout connectors to connect to a respective one of the switch device connectors in the switch device connector group 1504. However, while a specific example utilizing copper twin-axial cabling (i.e., similar to the "NVL72" racked GPU systems described above), one of skill in the art in possession of the present disclosure will appreciate how the use of co-packaged optical cabling and/or other networking processing device/connector couplings will fall within the scope of the present disclosure as well.

As will be appreciated by one of skill in the art in possession of the present disclosure, a respective similar connection system may be provided to connect each of the remaining compute device connectors 1508 to each of the switch device connectors in the switch device connector group 1504, and in embodiments in which those connection systems are provided by a breakout cable as described above, 18 breakout cables with different breakout sub-cable lengths may be provided to connect pairs of the compute device connectors 1508 (e.g., the breakout cable used to connect the "first" switch system connector 1508 to each of the switch device connectors in the switch device connector group 1504 as described above will have the appropriate sub-cable lengths to connect the "last" compute connector 1508 (i.e., the compute device connector 1508 adjacent the "bottom" of the passive cable subsystem 1500 in FIG. 15D) to each of the switch device connectors in the switch device connector group 1504, the breakout cable used to connect the "second" compute device connector 1508 (i.e., the compute device connector 1508 immediately adjacent the "first" compute device connector 1508 in FIG. 15D) to each of the switch device connectors in the switch device connector group 1504 will have the appropriate sub-cable lengths to connect the "second-to-last" compute device connector 1508 (i.e., the compute device connector 1508 immediately adjacent the "last" compute device connector 15080 in FIG. 15D) to each of the switch device connectors in the switch device connector group 1504, and so on). As such, while not illustrated or described in detail, one of skill in the art in possession of the present disclosure will appreciate how the passive cable subsystem 1500 may include connections that connect each of its compute device connectors 1508 to all of its switch device connectors in its switch device connector group 1504.

With reference to FIGS. 16A, 16B, 16C, and 16D, an embodiment of a passive cable system 1600 is illustrated that may be used with the racked GPU system of the present disclosure. The passive cable system 1600 includes a chassis 1602 that houses the components of the passive cable system 1600, only some of which are illustrated and described below. In the illustrated example, the chassis 1602 includes a top surface 1602*a*, a bottom surface 1602*b* that is located opposite the chassis 1602 from the top surface 1602*a*, a pair of opposing side surface 1602*c* and 1602*d* that are located opposite the chassis 1602 from each other and that extend between the top surface 1602*a* and the bottom surface 1602*b*, a switch device connection surface 1602*e* that extends between the top surface 1602*a*, the bottom surface 1602*b*, and the side surfaced 1602*c* and 1602*d*, and a compute device connection surface 1602*f* that is located opposite the chassis 1602 from the switch system connection surface 1602*d* and that extends between the top surface 1602*a*, the bottom surface 1602*b*, and the side surfaces 1602*c* and 1602*d*.

In the illustrated example, four switch device connector groups 1604 are provided on the switch device connection surface 1602*e* and each include nine switch device connectors provided in a vertically aligned orientation, while a respective management device connector 1606 is provided on the switch device connection surface 1602*e* between each switch device connector group 1604 and the bottom surface 1602*b* of the chassis 1602. As will be appreciated by one of skill in the art in possession of the present disclosure, each management device connector 1606 is coupled to the nine switch device connectors in its switch device connector group 1604, and may be provided by a different type of connector than those switch device connectors. Furthermore, thirty-six compute device connector groups 1608 (with every other compute device connector group 1608 provided with an element number in FIGS. 16B and 16C for clarity) are provided on the compute device connection surface 1602*f*, with each compute device connector group 1508 including four compute device connectors provided in a horizontally aligned orientation.

As will be appreciated by one of skill in the art in possession of the present disclosure, the compute device connector groups 1608 are provided on the compute device connection surface 1502*f* such that each of the compute device connectors in those compute device connector groups are vertically aligned with corresponding compute device connectors in the other compute device connector groups (i.e., the "first" compute device connector in each of the compute device connector groups 1608 are vertically aligned, the "second" compute device connector in each of the compute device connector groups 1608 are vertically aligned, the "third" compute device connector in each of the compute device connector groups 1608 are vertically aligned, and the "fourth" compute device connector in each of the compute device connector groups 1608 are vertically aligned).

Figure 16A:
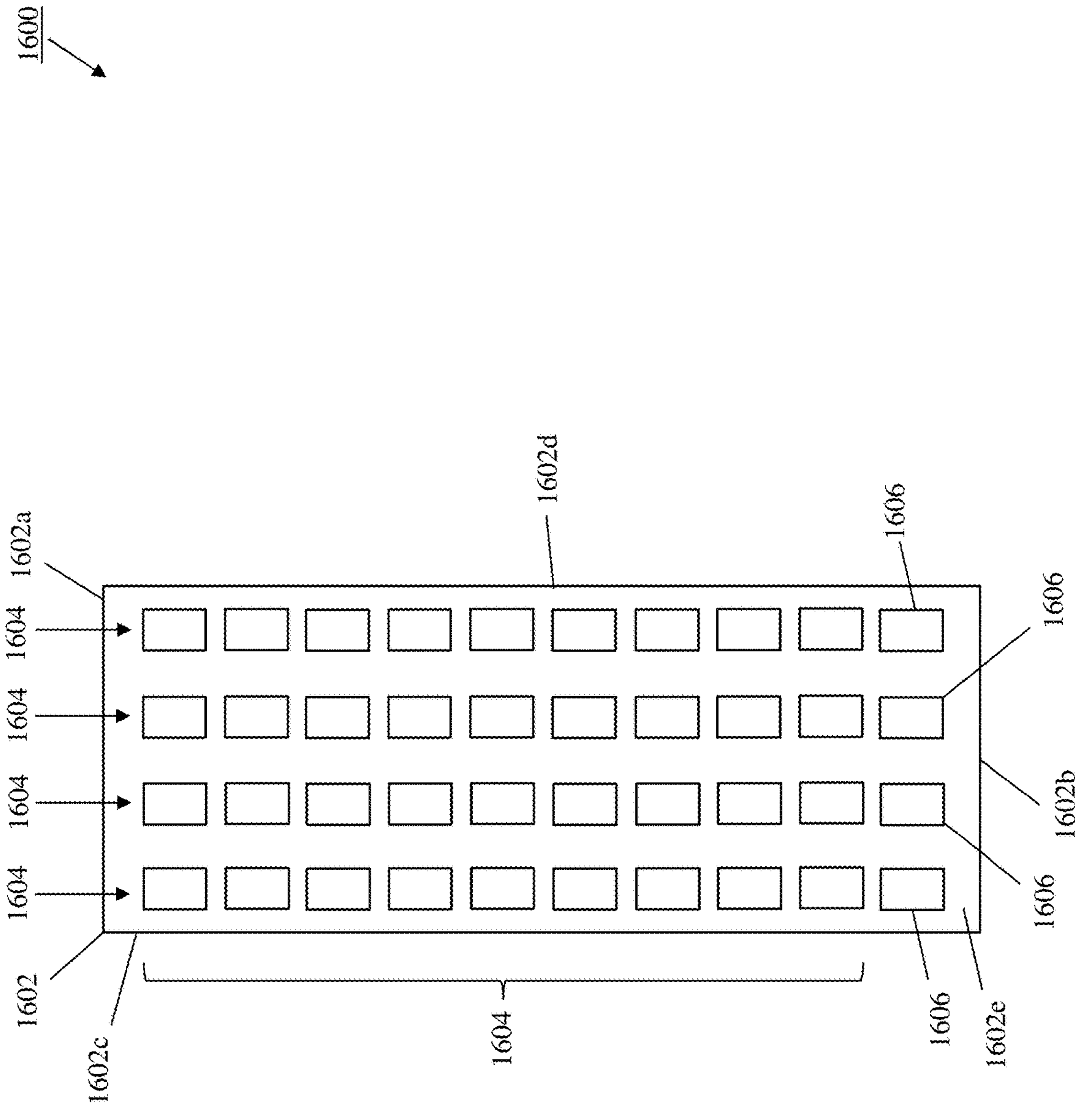
FIG. 16A is a front view illustrating an embodiment of a passive cable system used in the racked GPU system of the present disclosure.
Figure 16B:
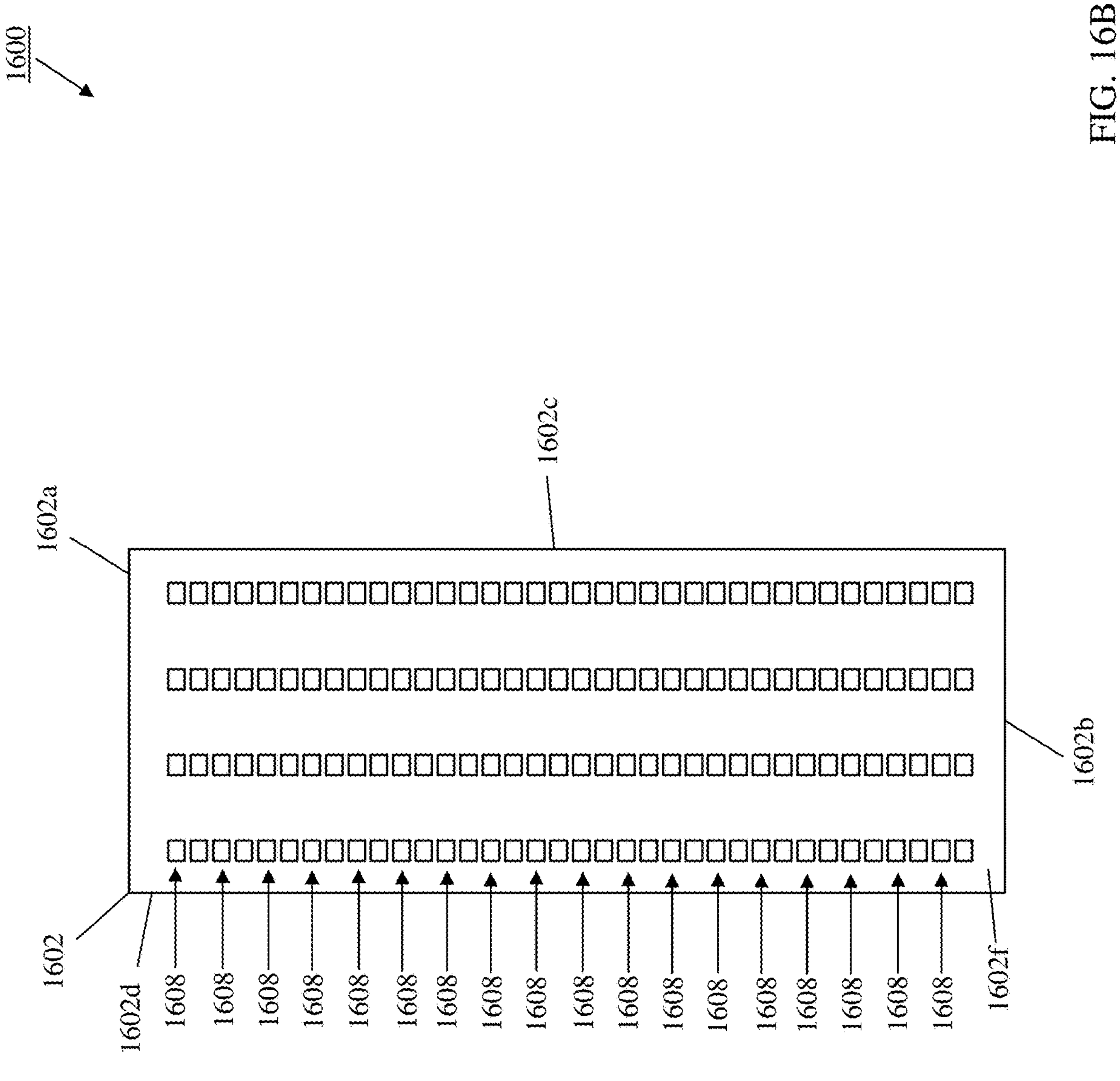
FIG. 16B is a rear view illustrating an embodiment of the passive cable system of FIG. 16B.
Figure 16C:
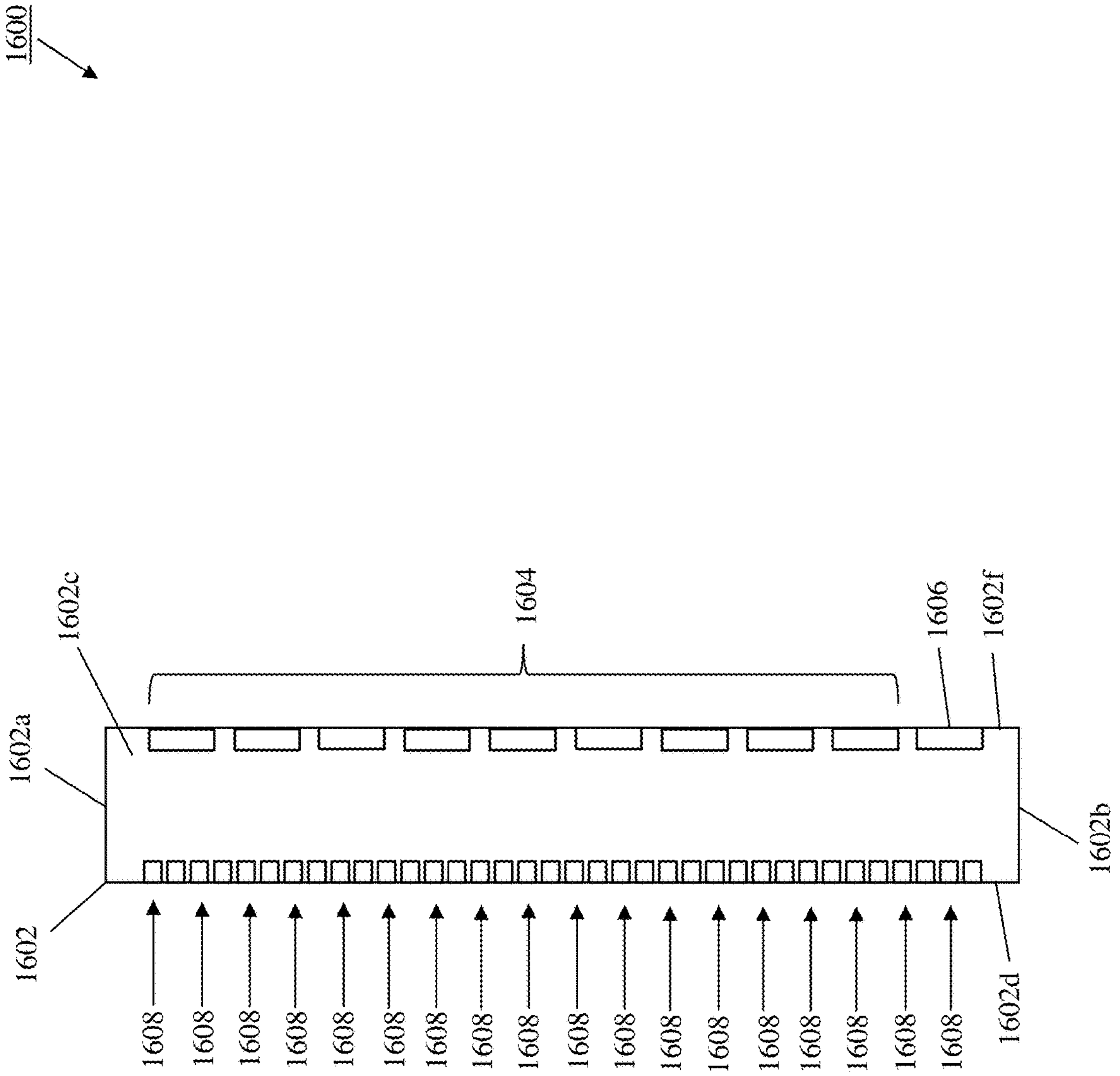
FIG. 16C is a cross-sectional view illustrating an embodiment of the passive cable system of FIGS. 16A and 16B.
Figure 16D:
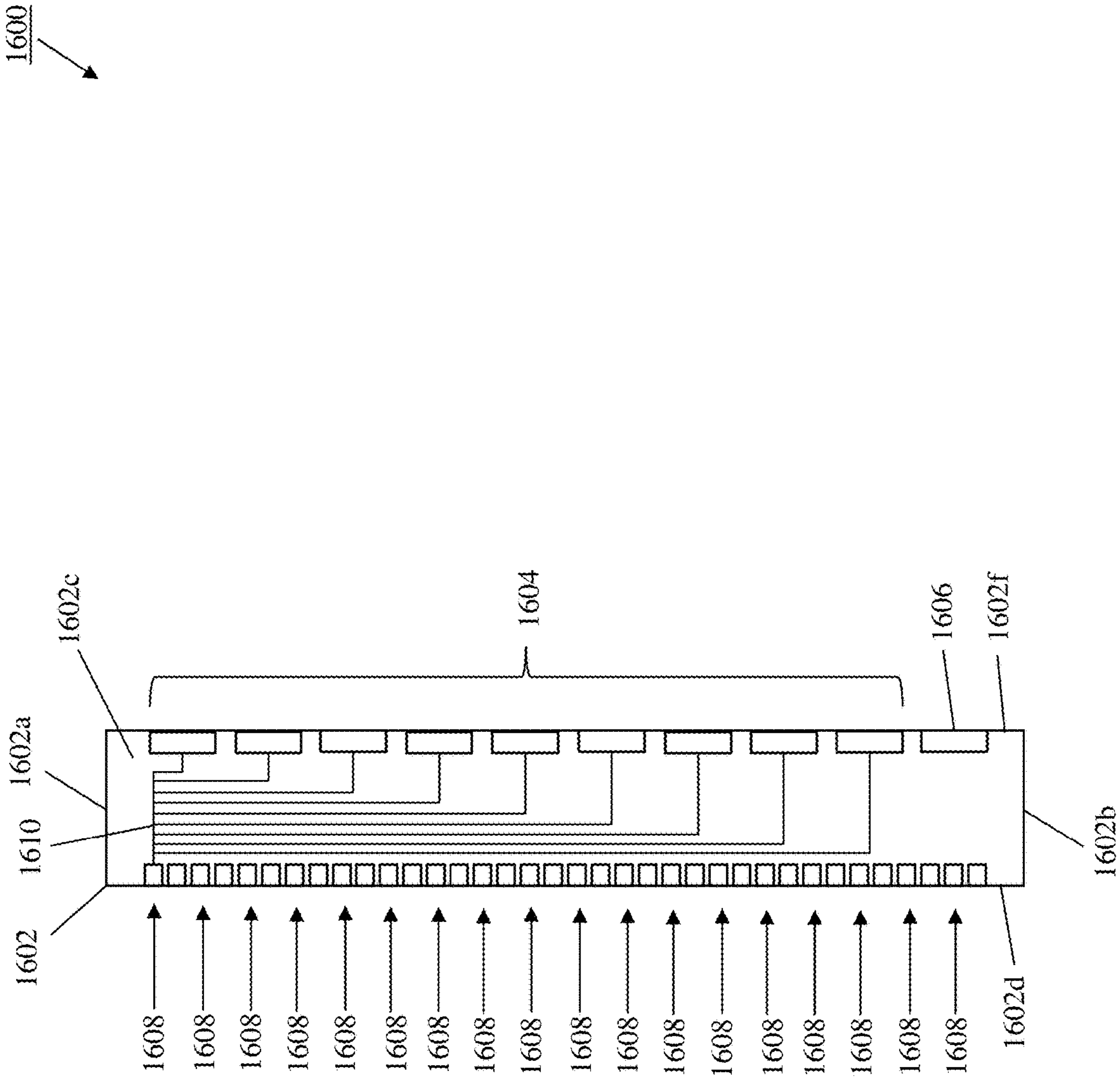
FIG. 16D is a schematic view illustrating connections provided in the passive cable system of FIGS. 16A-16C.

With reference to FIG. 16D, an embodiment of a connection system 1610 that provides connections between a compute device connector in the "top" computing device connector group 1608 on the passive cable system 1600 (i.e., one of the vertically aligned compute device connectors adjacent the "top" of the passive cable system 1600 in FIG. 16D) and each of the switch device connectors in the switch device connector group 1604 located immediately opposite those vertically aligned compute device connectors is illustrated. Similarly as discussed above with reference to the connection system 1510 of FIG. 15D, the connection system 1610 may be provided by a breakout cable, and a respective similar connection system may be provided to connect each of the remaining vertically aligned compute device connectors to each of the switch device connectors in that switch device connector group 1604. As such, while not illustrated or described in detail, one of skill in the art in possession of the present disclosure will appreciate how the passive cable subsystem 1600 may include connections that connect each of its vertically aligned compute device connectors to all of the switch device connectors in the switch device connector group 1604 that is located immediately opposite those vertically aligned compute device connectors.

As discussed below, the passive cable system 1600 may be used in the racked GPU system of the present disclosure with the compute devices 400 discussed above with reference to FIG. 4 when the switch device groups 1000 or 1100 provide the "horizontal" cross connections as described above. One of skill in the art in possession of the present disclosure will appreciate how the passive cable system 1600 may also provide "horizontal" cross-connections for four GPU devices connected to a compute device connector group 1608 similarly as illustrated in the compute device 800 discussed above with reference to FIG. 8, enabling the usage of switch device groups that do not provide those "horizontal" cross connections.

With reference to FIGS. 17A, 17B, 17C, and 17D, an embodiment of a passive cable subsystem 1700 is illustrated that may be included in the passive cable system in the racked GPU system of the present disclosure that uses two of the passive cable subsystems 1700. The passive cable subsystem 1700 includes a chassis 1702 that houses the components of the passive cable subsystem 1700, only some of which are illustrated and described below. In the illustrated example, the chassis 1702 includes a top surface 1702*a*, a bottom surface 1702*b* that is located opposite the chassis 1702 from the top surface 1702*a*, a pair of opposing side surface 1702*c* and 1702*d* that are located opposite the chassis 1702 from each other and that extend between the top surface 1702*a* and the bottom surface 1702*b*, a switch device connection surface 1702*e* that extends between the top surface 1702*a*, the bottom surface 1702*b*, and the side surfaced 1702*c* and 1702*d*, and a compute device connection surface 1702*f* that is located opposite the chassis 1702 from the switch system connection surface 1702*d* and that extends between the top surface 1702*a*, the bottom surface 1702*b*, and the side surfaces 1702*c* and 1702*d*.

In the illustrated example, two switch device connector groups 1704 are provided on the switch device connection surface 1702*e* and each include nine switch device connectors provided in a vertically aligned orientation, while a respective management device connector 1706 is provided on the switch device connection surface 1702*e* between each switch device connector group 1704 and the bottom surface 1702*b* of the chassis 1702. As will be appreciated by one of skill in the art in possession of the present disclosure, each management device connector 1706 is coupled to the nine switch device connectors in its switch device connector group 1704, and may be provided by a different type of connector than those switch device connectors. Furthermore, thirty-six compute device connectors 1708*a* are provided on the compute device connection surface 1702*f* in a vertically aligned orientation, and thirty-six compute device connectors 1708*b* are provided on the compute device connection surface 1702*f* in a vertically aligned orientation.

Figure 17A:
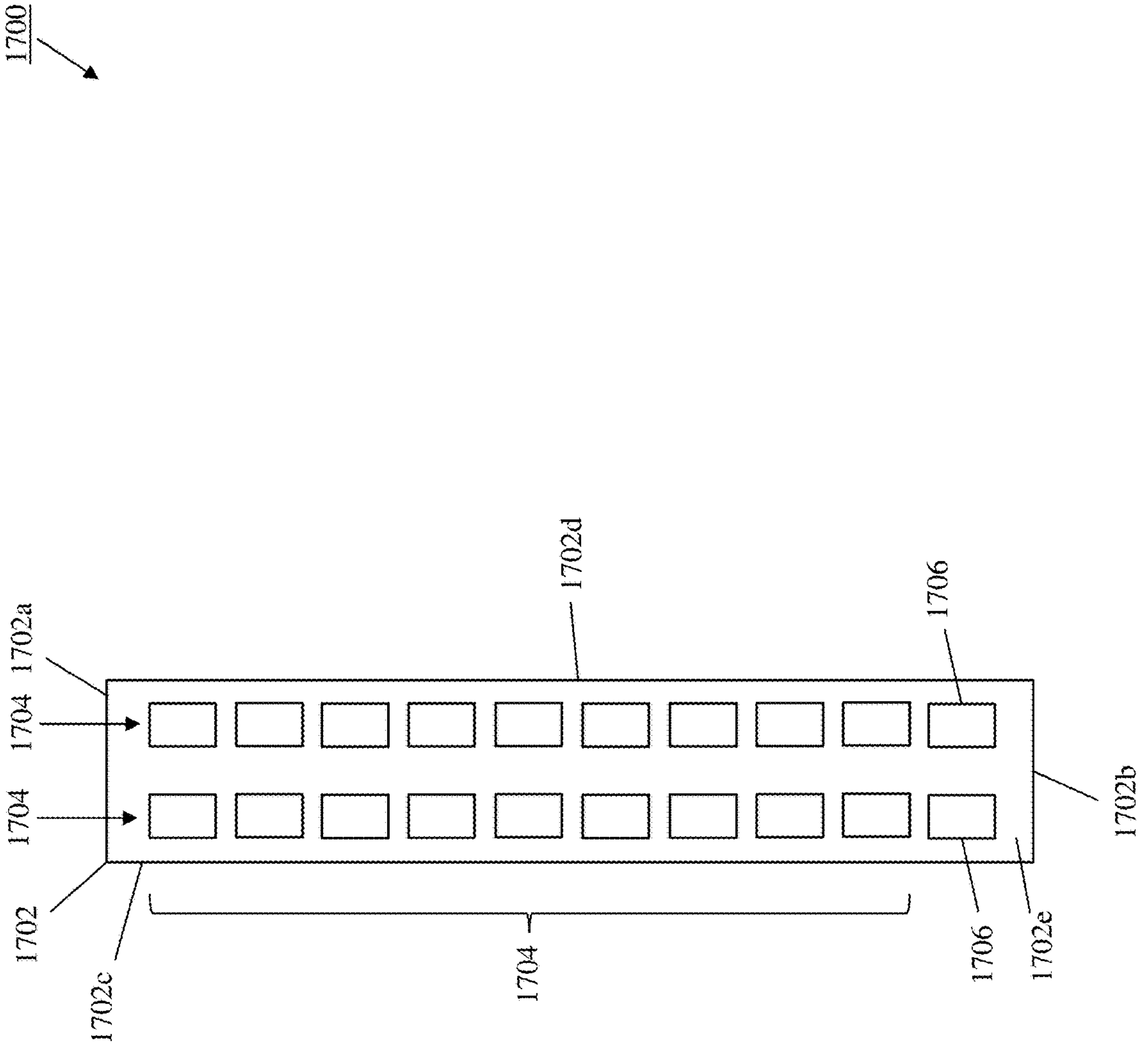
FIG. 17A is a front view illustrating an embodiment of a passive cable subsystem used in the racked GPU system of the present disclosure.
Figure 17B:
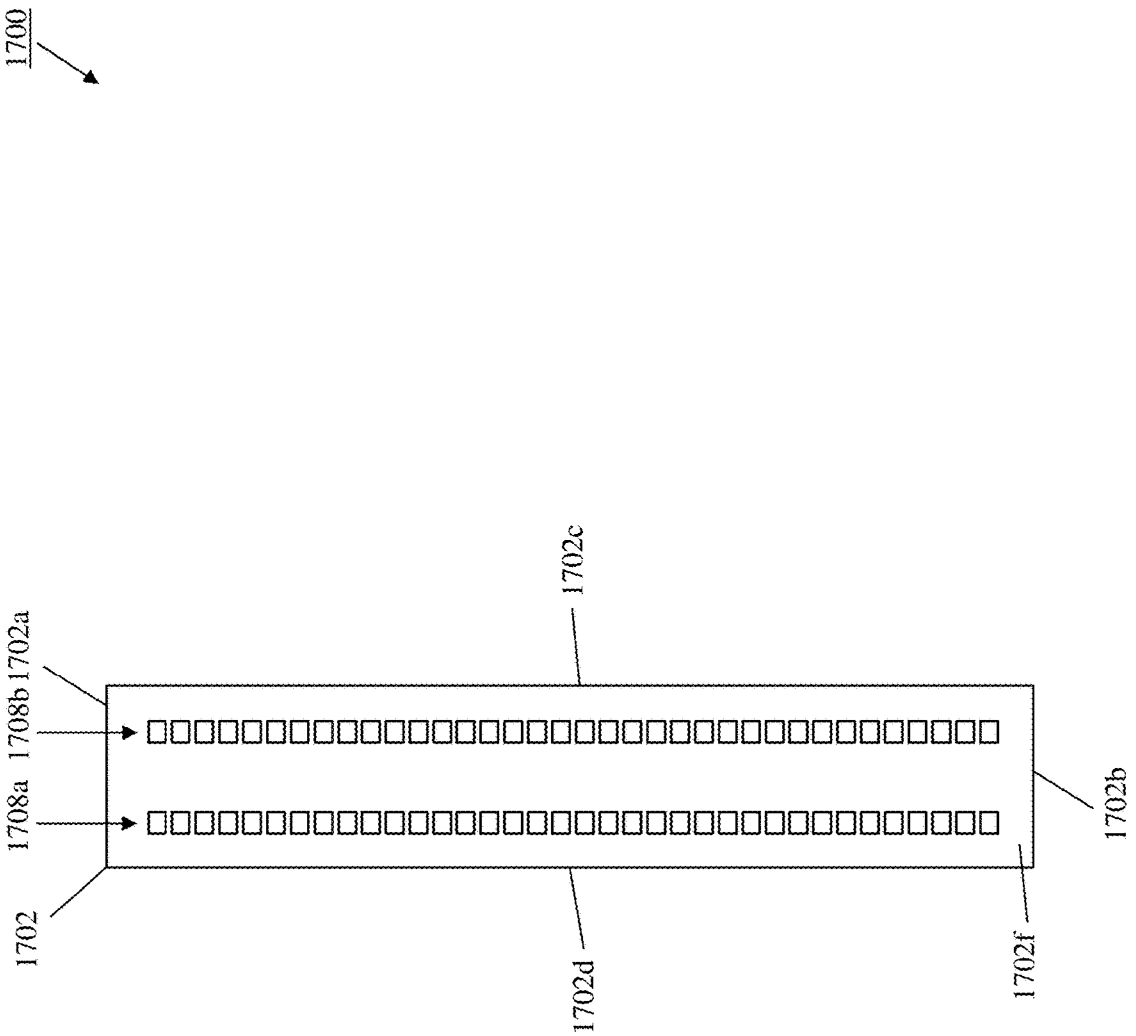
FIG. 17B is a rear view illustrating an embodiment of the passive cable subsystem of FIG. 17B.
Figure 17C:
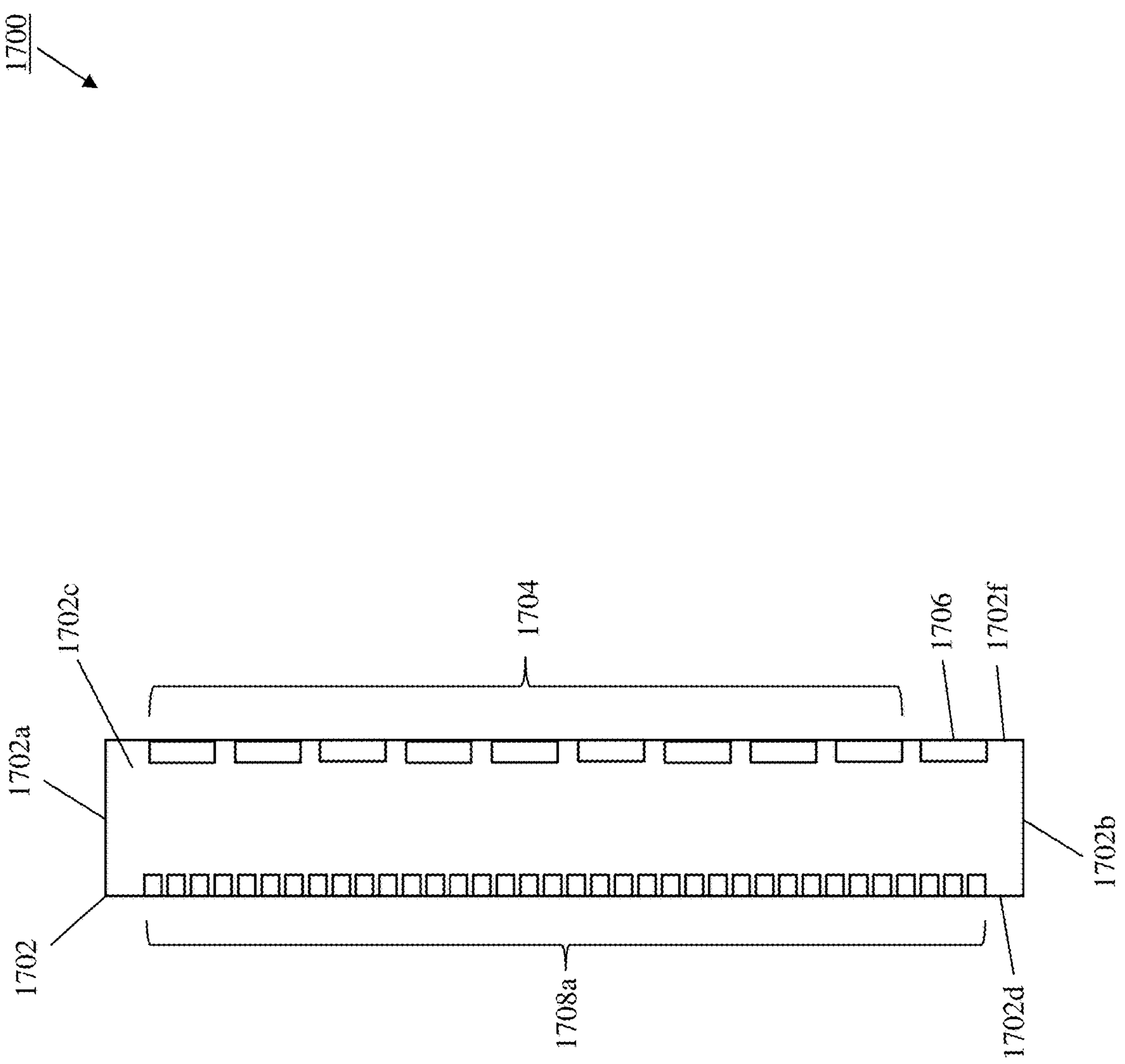
FIG. 17C is a cross-sectional view illustrating an embodiment of the passive cable subsystem of FIGS. 17A and 17B.
Figure 17D:
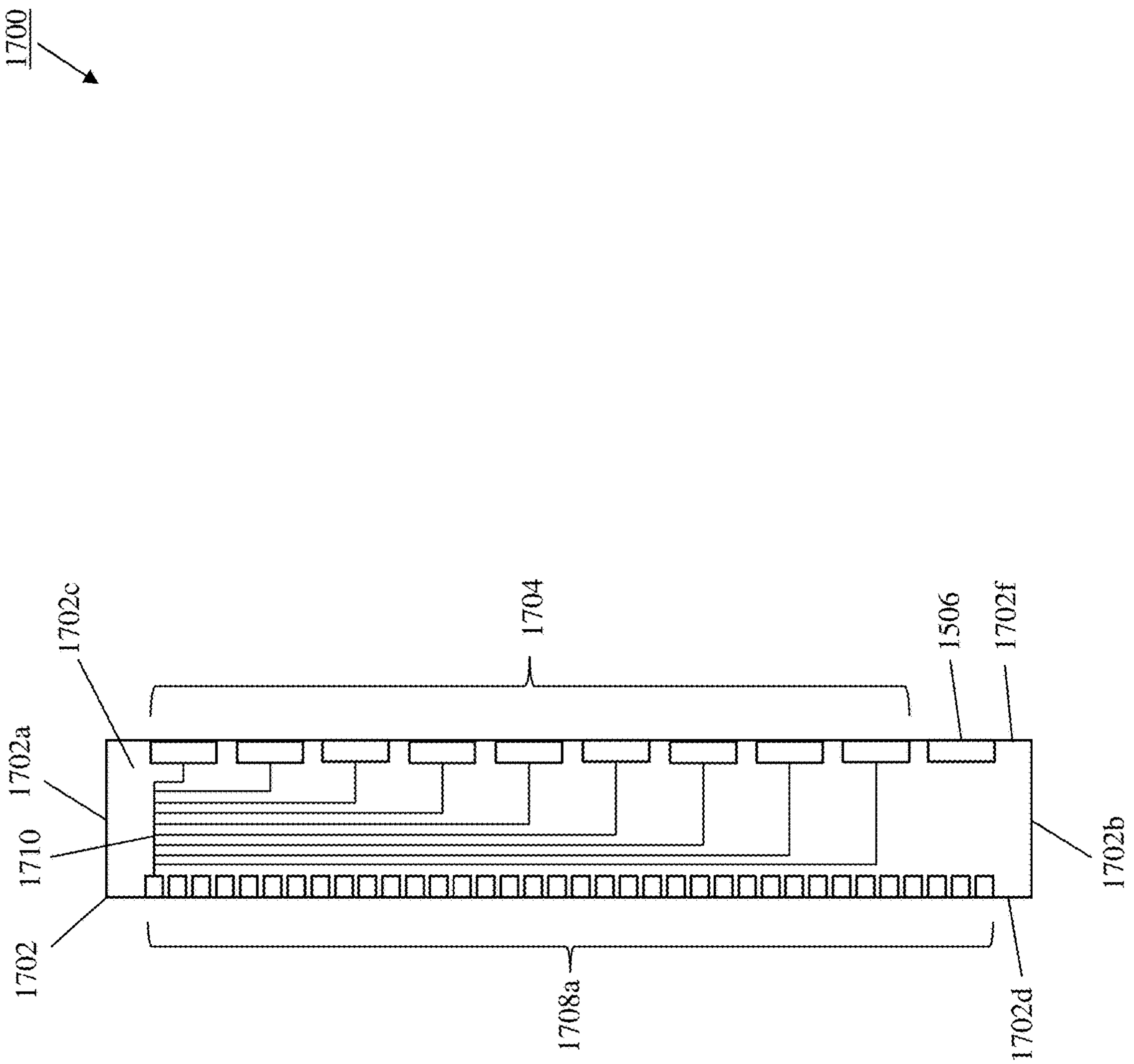
FIG. 17D is a schematic view illustrating connections provided in the passive cable subsystem of FIGS. 17A-17C.

With reference to FIG. 17D, an embodiment of a connection system 1710 that provides connections between a "first" compute device connector 1708*a* on the passive cable subsystem 1700 (i.e., the compute device connector 1708*a* adjacent the "top" of the passive cable subsystem 1700 in FIG. 17D) and each of the switch device connectors in the switch device connector group 1704 located opposite the chassis 1702 from those compute device connectors 1708*a* is illustrated. Similarly as discussed above with reference to the connection system 1510 of FIG. 15D, the connection system 1710 may be provided by a breakout cable, and a respective similar connection system may be provided to connect each of the compute device connectors 1708*a* to each of the switch device connectors in the switch device connector group 1704 opposite the chassis 1702 from those compute device connectors 1708*a*. As such, while not illustrated or described in detail, one of skill in the art in possession of the present disclosure will appreciate how the passive cable subsystem 1700 may include connections that connect each of its compute device connectors in the compute device connector group 1708*a* to all of the switch device connectors in the switch device connector group 1604 that is located immediately opposite that compute device connector group 1708*a*, and that connect each of its compute device connectors in the compute device connector group 1708*b* to all of the switch device connectors in the switch device connector group 1604 that is located immediately opposite that compute device connector group 1708*b*.

Figure 18:
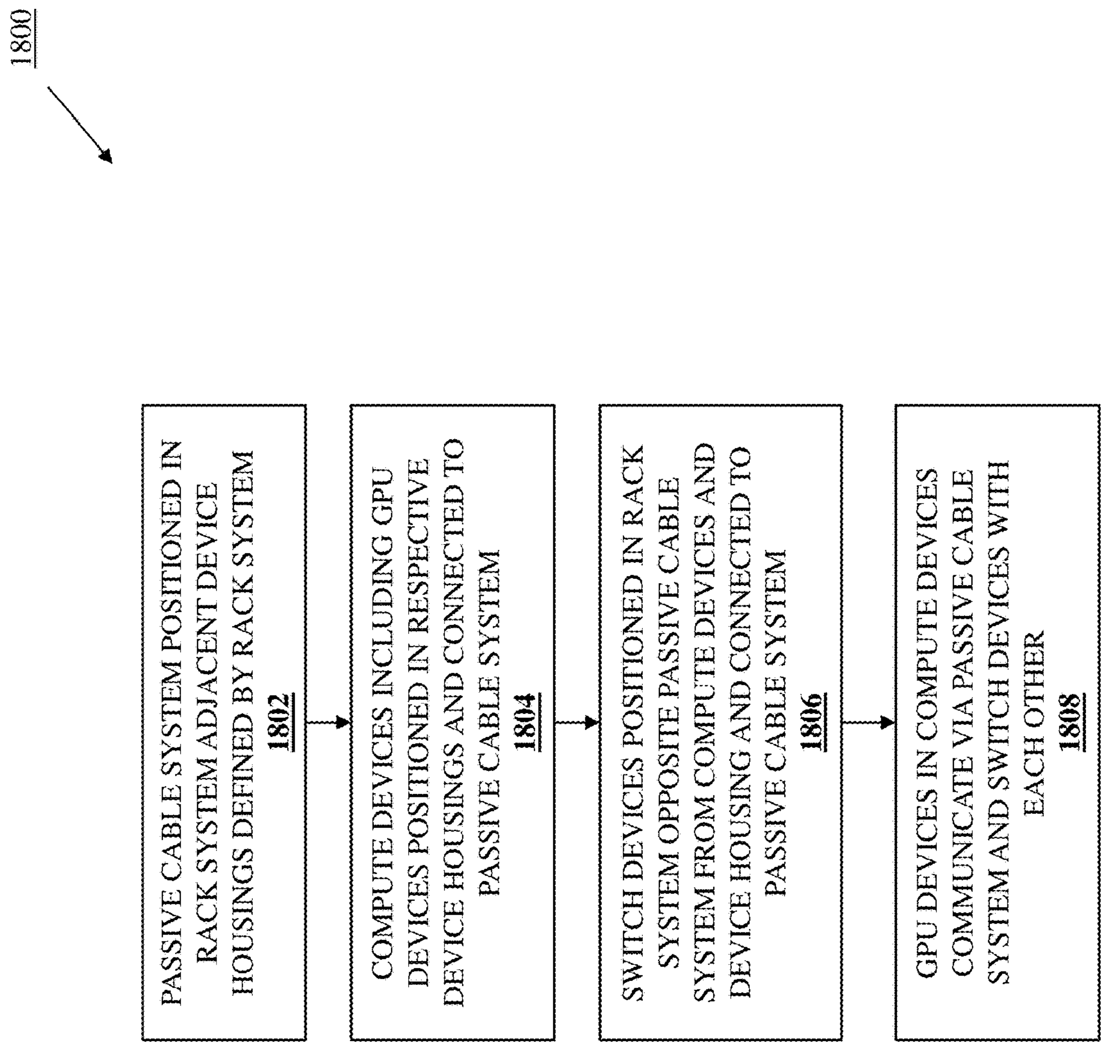
FIG. 18 is a flow chart illustrating an embodiment of a method for providing a racked GPU system.

Referring now to FIG. 18, an embodiment of a method 1800 for providing a racked Graphics Processing Unit (GPU) system is illustrated. As discussed below, the systems and methods of the present disclosure provide a racked GPU system configuration in which all compute device housings defined by a rack system may be used to house compute devices including GPU devices, and networking processing devices are coupled to those GPU devices via a passive cable system that is positioned between the compute devices/device housings and switch devices that include the networking processing devices. For example, the racked GPU system of the present disclosure may include a rack system defining a plurality of device housings. A passive cable system is housed in the rack system adjacent the plurality of device housings. Each of a plurality of compute devices that each include a plurality of Graphics Processing Units (GPU) devices are housed in a respective one of the plurality of the device housings and connected to the passive cable system. Each of a plurality of switch devices that each include a plurality of networking processing devices are housed in the rack system opposite the passive cable system from the plurality of compute devices and the plurality of device housings, and connected to the passive cable system to communicatively couple each of the plurality of networking processing devices in that switch system to each of the plurality of GPU devices in each of the plurality of compute device. As such, GPU density is increased relative to conventional racked GPU systems.

The method 1800 begins at block 1802 where a passive cable system is positioned in a rack system adjacent device housings defined by the rack system. In a first example, with reference to FIGS. 2, 15A-15C, and 19A-19C, at block 1802 the passive cable system 1900 illustrated in FIGS. 19B and 19C may be provided using four of the passive cable subsystems 1500 that may be positioned in the rack system 200 adjacent the device housings 204 (with only half of the device housings 204 identified by element numbers in FIG. 19A for clarity) and connected, mounted, and/or otherwise coupled to the rack system 200 using any of a variety of techniques that would be apparent to one of skill in the art in possession of the present disclosure. In some embodiments, each of the passive cable systems 1500 may include features that enable them to connect together to provide the passive cable system 1900 and structurally support each other (in addition to the structural support provided by connecting one or more of them to the rack system 200).

Figure 19A:
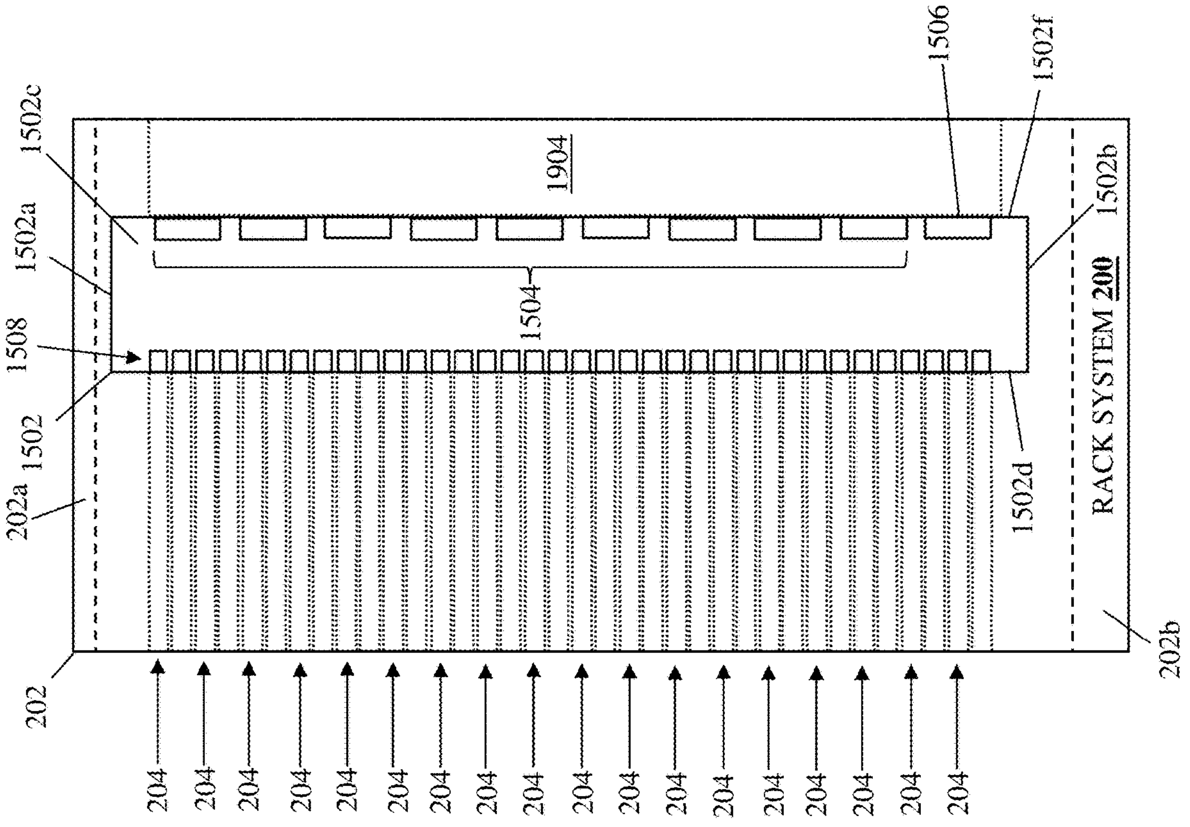
FIG. 19A is a cross-sectional view illustrating an embodiment of a passive cable system provided by four of the passive cable subsystem of FIGS. 15A-15D provided in the rack system of FIG. 2.
Figure 19B:
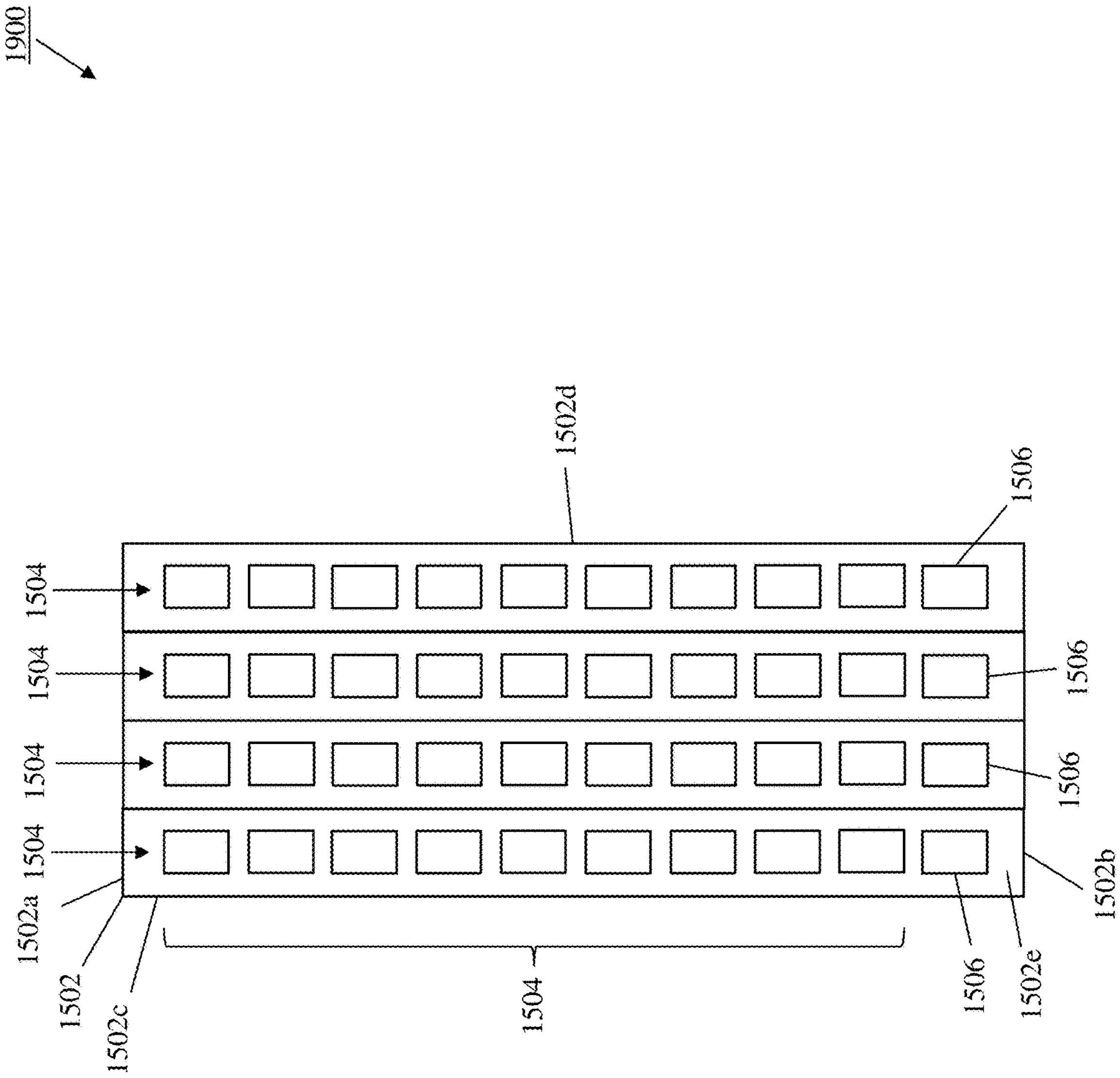
FIG. 19B is a front view illustrating an embodiment of the passive cable system of FIG. 19A.
Figure 19C:
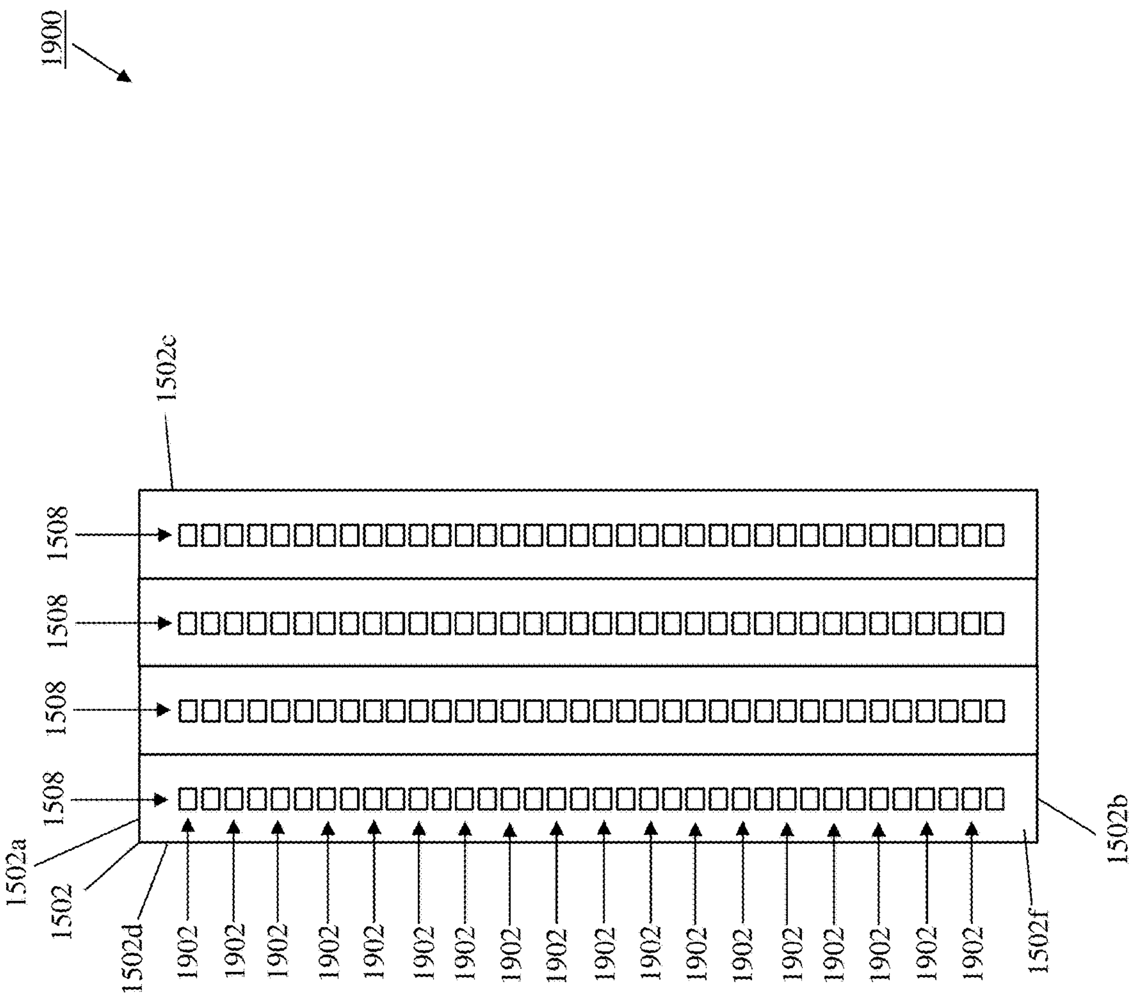
FIG. 19C is a rear view illustrating an embodiment of the passive cable system of FIG. 19A.

As illustrated in FIG. 19C, the passive cable system 1900 provides thirty-six compute device connector groups 1902 (with every other compute device connector group 1902 provided with an element number in FIG. 19C for clarity), with each compute device connector group 1902 including four compute device connectors provided in a horizontally aligned orientation. As will be appreciated by one of skill in the art in possession of the present disclosure, the compute device connector groups 1902 are provided on the passive cable system 1900 such that each of the compute device connectors in those compute device connector groups are vertically aligned with corresponding compute device connectors in the other compute device connector groups (i.e., the "first" compute device connector in each of the compute device connector groups 1902 are vertically aligned, the "second" compute device connector in each of the compute device connector groups 1902 are vertically aligned, the "third" compute device connector in each of the compute device connector groups 1902 are vertically aligned, and the "fourth" compute device connector in each of the compute device connector groups 1902 are vertically aligned).

As can be seen in FIG. 19A, the positioning of the passive cable system 1900 in the rack system 200 adjacent the device housings 204 defines a switch device housing 1904 opposite the passive cable system 1900 from the device housings 204, with each of the computing device connectors groups 1902 located adjacent a respective computing device housing 204, and the switch device connector groups 1504 located adjacent the switch device housing 1904.

As will be appreciated by one of skill in the art in possession of the present disclosure, while the conventional rack system 200 discussed above with reference to FIG. 2 is described as being utilized with the racked GPU system of the present disclosure, modified rack systems may be provided that include the rack system features used in the racked GPU system described herein. In many examples, the conventional rack system 200 will include sufficient space to provide the switch device housing 1904 that houses the switch devices 900 as described below. However, in other examples, the conventional rack system 200 may be modified with an increased depth to allow the rack system 200 to provide the switch device housing 1904 that houses the switch devices 900 as described below when the passive cable system 1900 is provided therein. As such, one of skill in the art in possession of the present disclosure will appreciate how a variety of rack systems may be utilized with the racked GPU system of the present disclosure while remaining within its scope.

Figure 20:
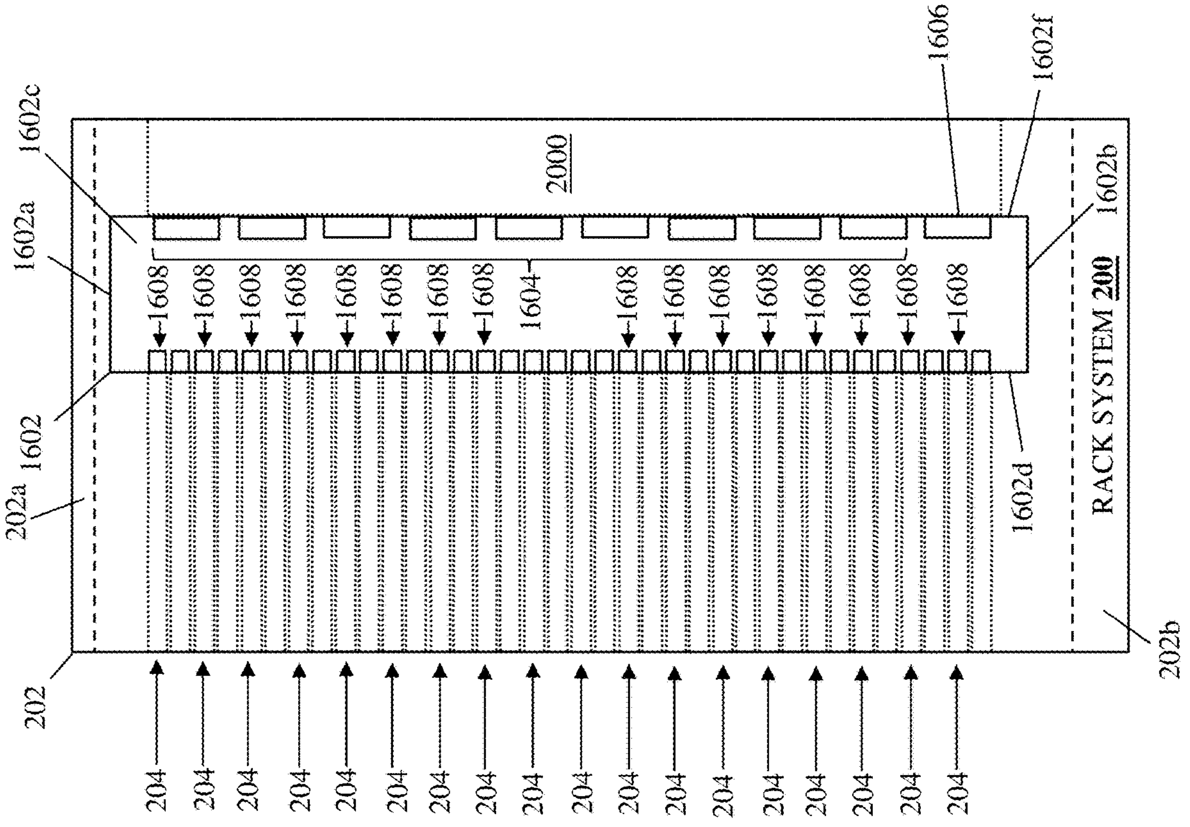
FIG. 20 is a cross-sectional view illustrating an embodiment of a passive cable system of FIGS. 16A-16C provided in the rack system of FIG. 2.

In a second example, with reference to FIGS. 2, 16A-16C, and 20, at block 1802 the passive cable system 2000 illustrated in FIGS. 16A and 16B may be positioned in the rack system 200 adjacent the device housings 204 (with only half of the device housings 204 identified by element numbers in FIG. 20 for clarity) and connected, mounted, and/or otherwise coupled to the rack system 200 using any of a variety of techniques that would be apparent to one of skill in the art in possession of the present disclosure. As can be seen in FIG. 20, the positioning of the passive cable system 1600 in the rack system 200 adjacent the device housings 204 defines a switch device housing 2000 opposite the passive cable system 1600 from the device housings 204, with each of the computing device connectors groups 1608 located adjacent a respective computing device housing 204, and the switch device connector groups 1604 located adjacent the switch system housing 2000.

Similarly as described above, while the conventional rack system 200 discussed above with reference to FIG. 2 is described as being utilized with the racked GPU system of the present disclosure, modified rack systems may be provided that include the rack system features used in the racked GPU system described herein. In many examples, the conventional rack system 200 will include sufficient space to provide the switch system housing 2000 that houses the switch devices in the switch device groups 1000 as described below. However, in other examples, the conventional rack system 200 may be modified with an increased depth to allow the rack system 200 to provide the switch device housing 2000 that houses the switch device groups 1000 as described below when the passive cable system 1600 is provided therein. As such, one of skill in the art in possession of the present disclosure will appreciate how a variety of rack systems may be utilized with the racked GPU system of the present disclosure while remaining within its scope.

Figure 21A:
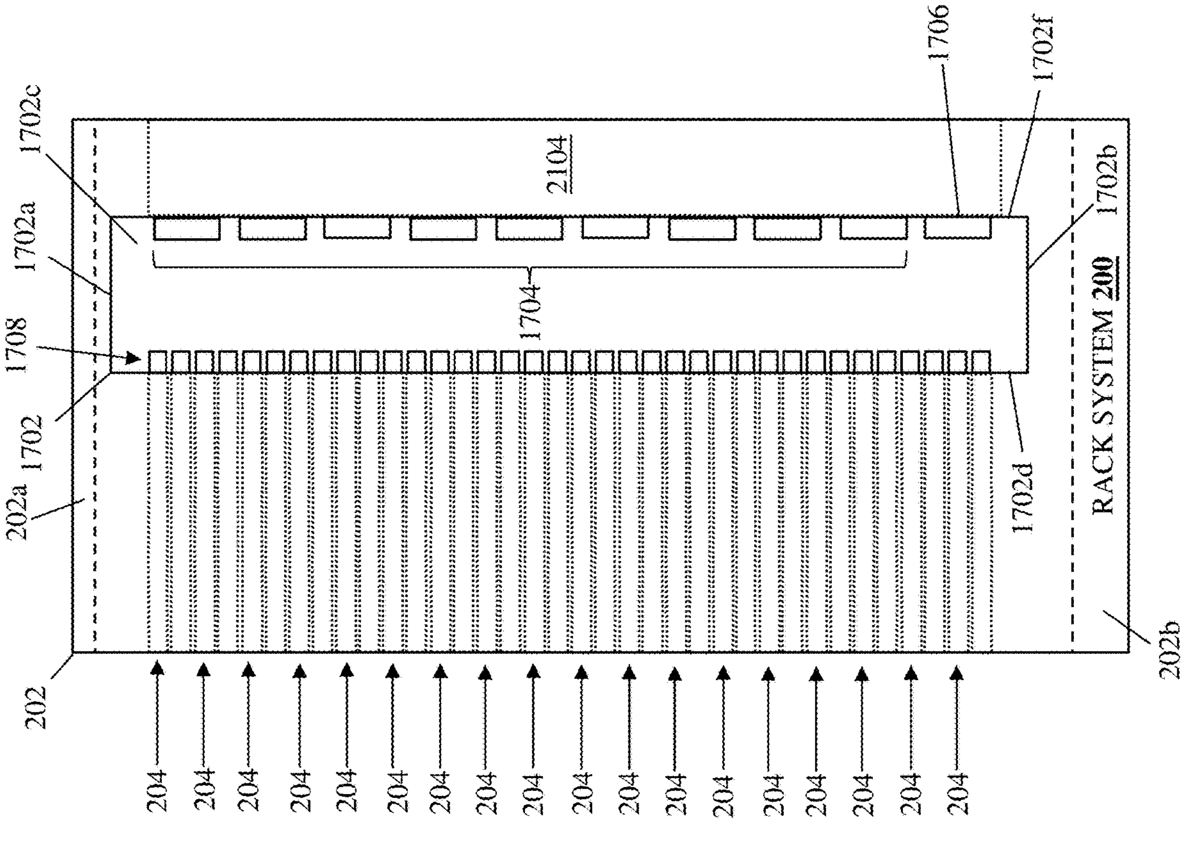
FIG. 21A is a cross-sectional view illustrating an embodiment of a passive cable system provided by four of the passive cable subsystem of FIGS. 17A-17D provided in the rack system of FIG. 2.
Figure 21B:
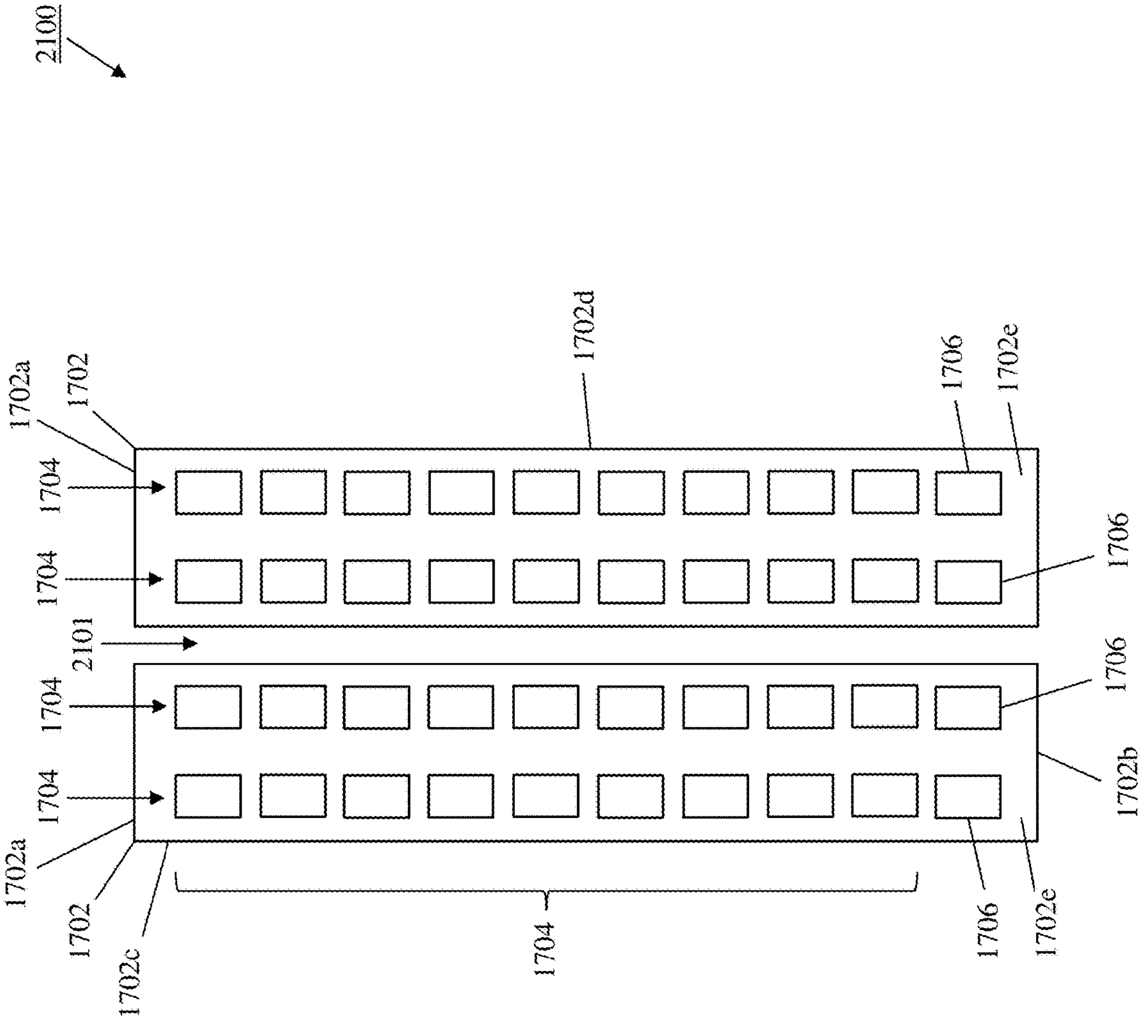
FIG. 21B is a front view illustrating an embodiment of the passive cable system of FIG. 21A.
Figure 21C:
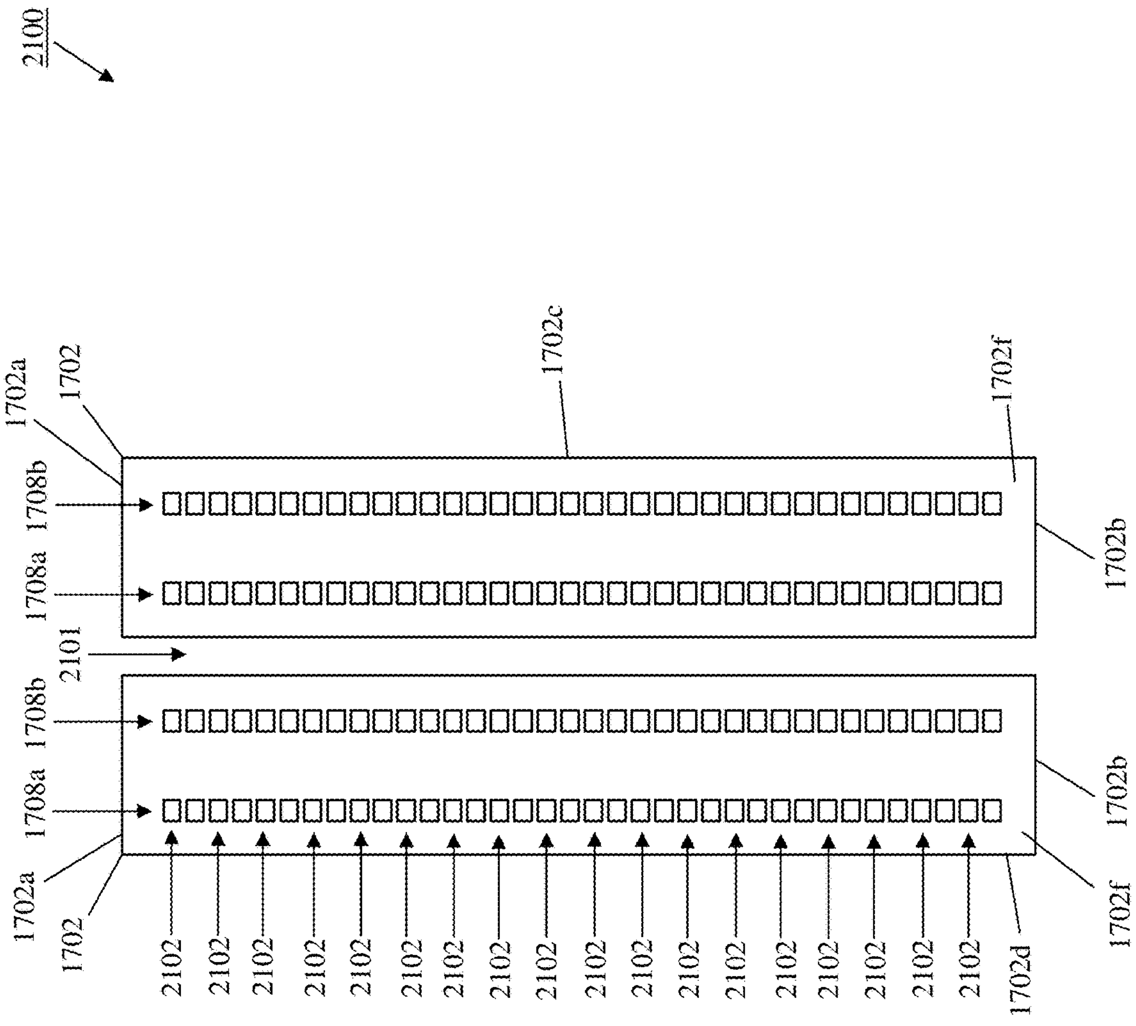
FIG. 21C is a rear view illustrating an embodiment of the passive cable system of FIG. 21A.
Figure 22A:
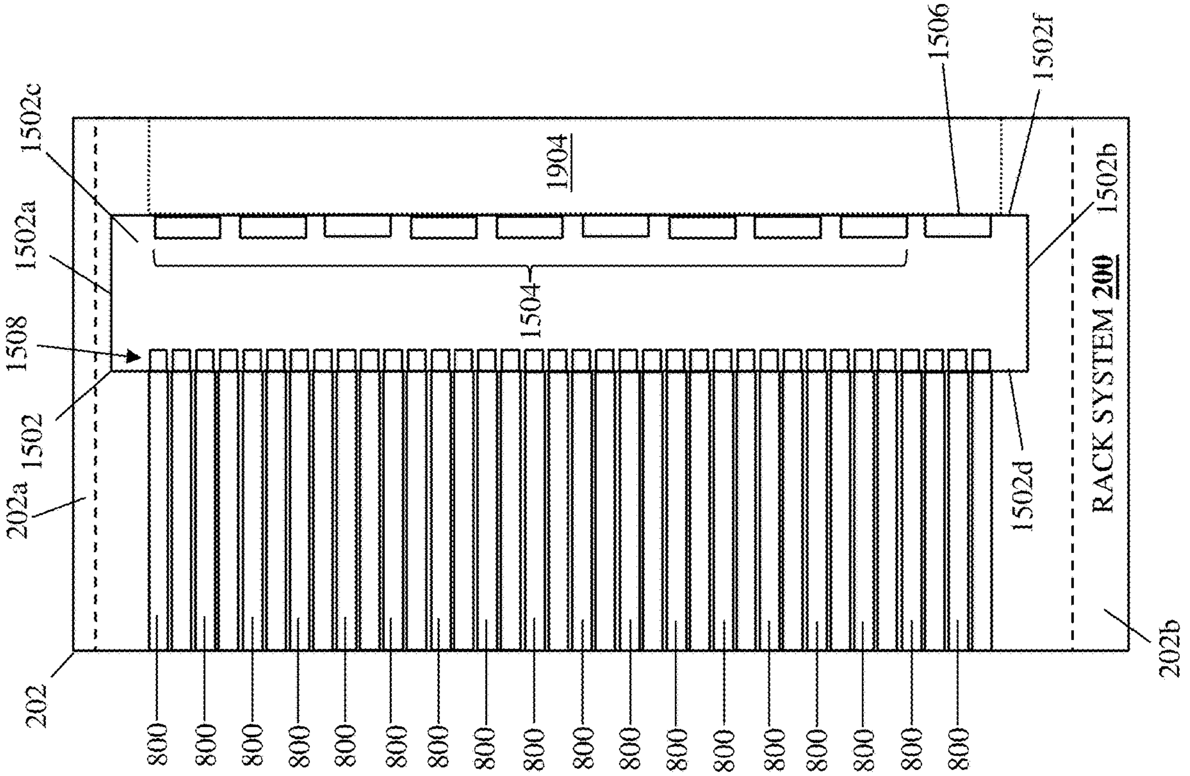
FIG. 22A is a cross-sectional view illustrating an embodiment of a plurality of the compute devices of FIG. 8 connected to the passive cable system of FIGS. 19A-19C.
Figure 22B:
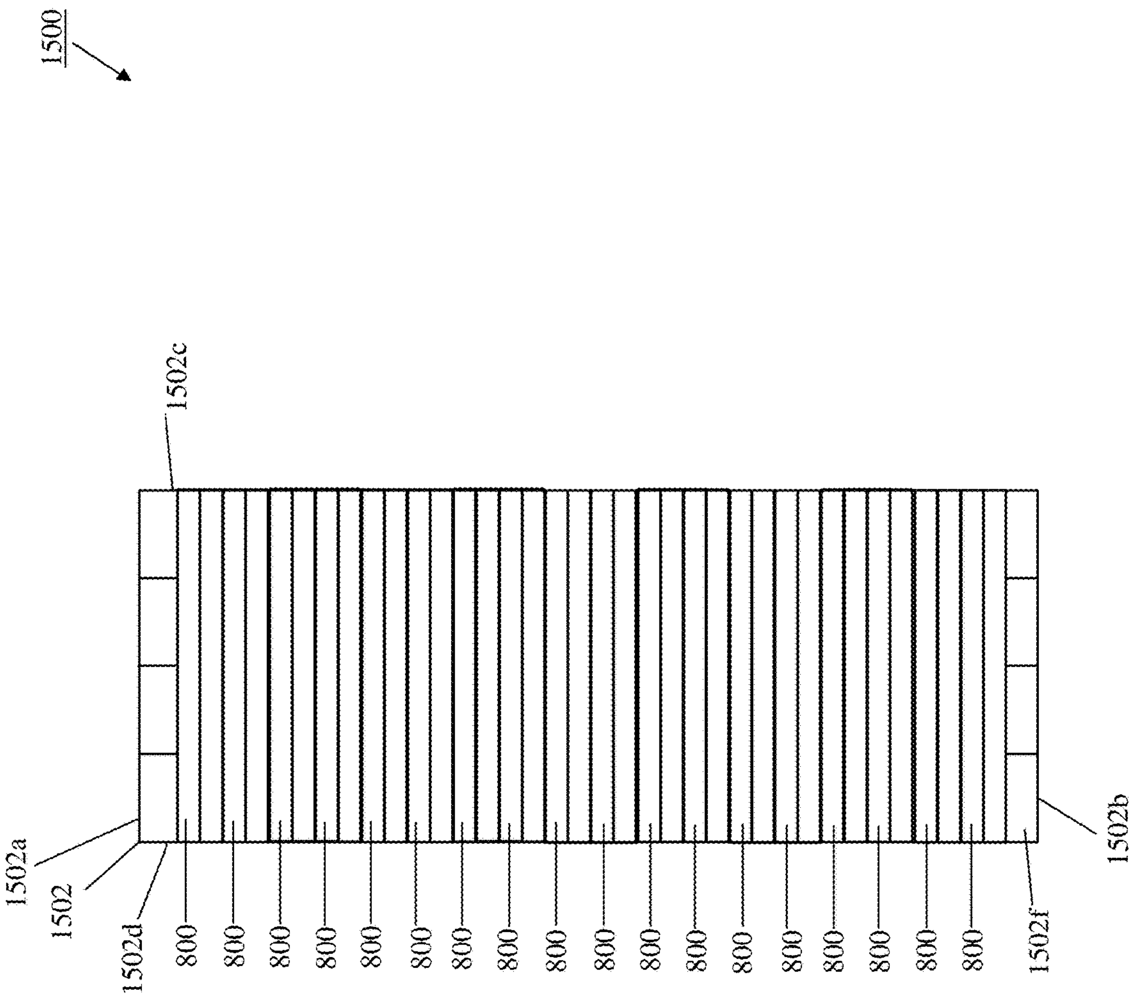
FIG. 22B is a front view illustrating an embodiment of the plurality of compute devices connected to the passive cable system of FIG. 22A.
Figure 23A:
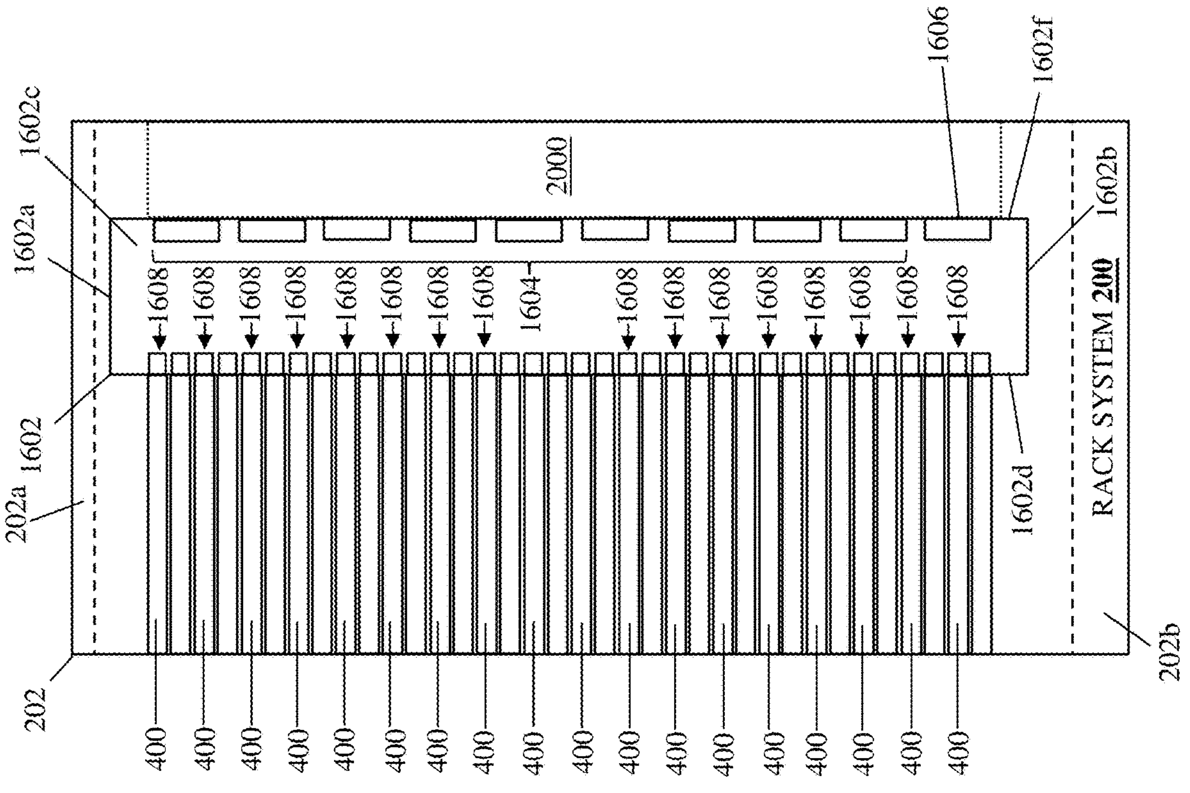
FIG. 23A is a cross-sectional view illustrating an embodiment of a plurality of the compute devices of FIG. 8 connected to the passive cable system of FIG. 16A-16C.
Figure 23B:
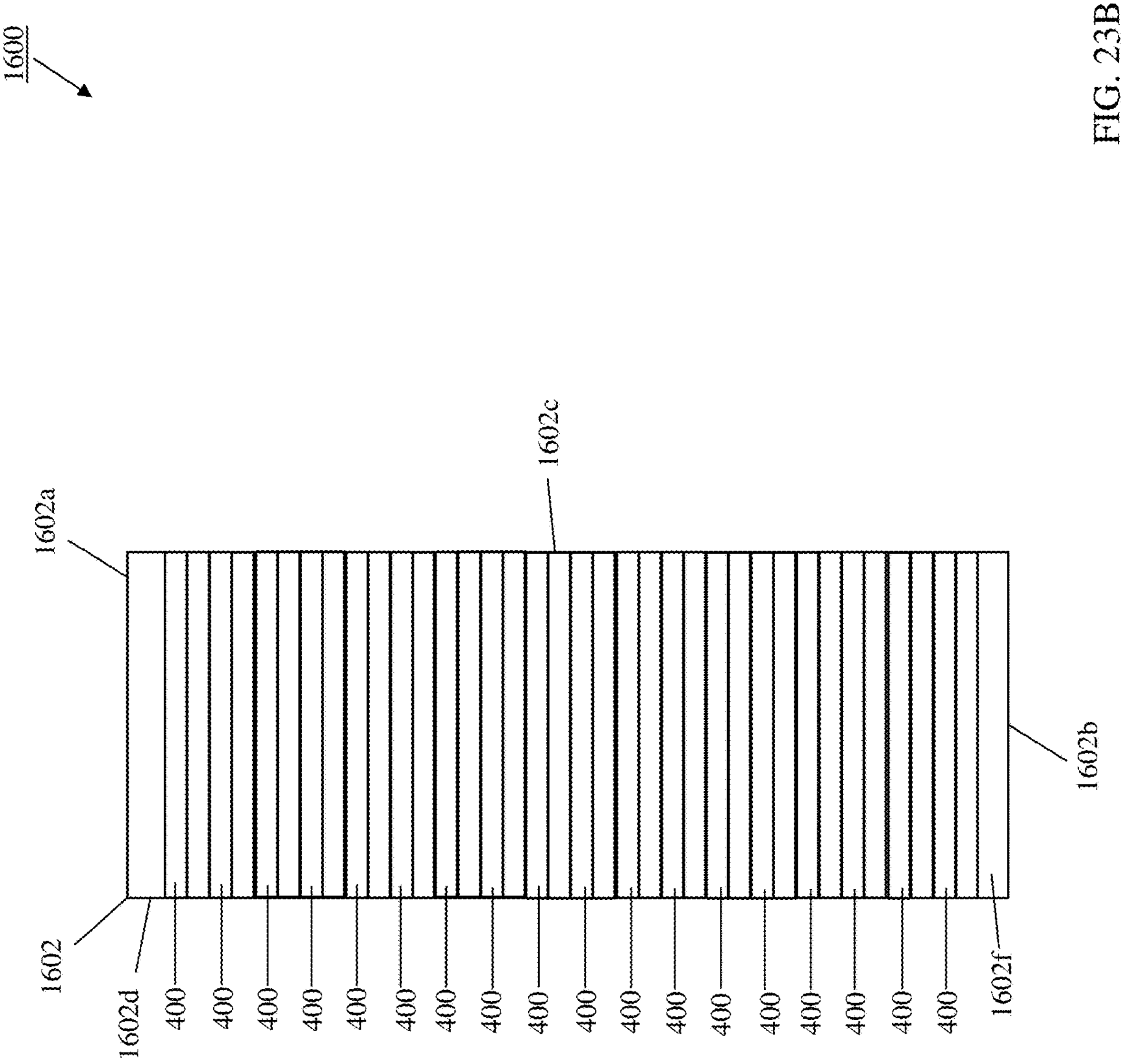
FIG. 23B is a front view illustrating an embodiment of the plurality of compute devices connected to the passive cable system of FIG. 23A.
Figure 24A:
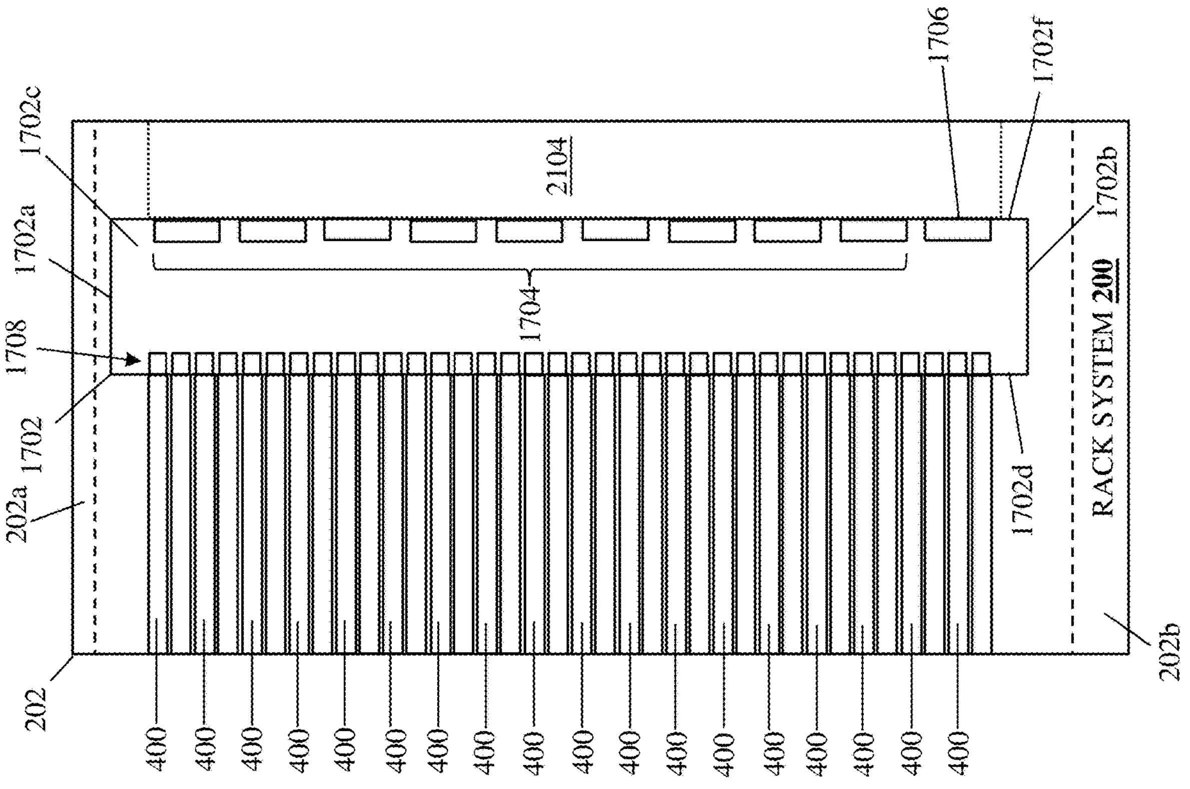
FIG. 24A is a cross-sectional view illustrating an embodiment of a plurality of the compute devices of FIG. 8 connected to the passive cable system of FIGS. 21A-21C.
Figure 24B:
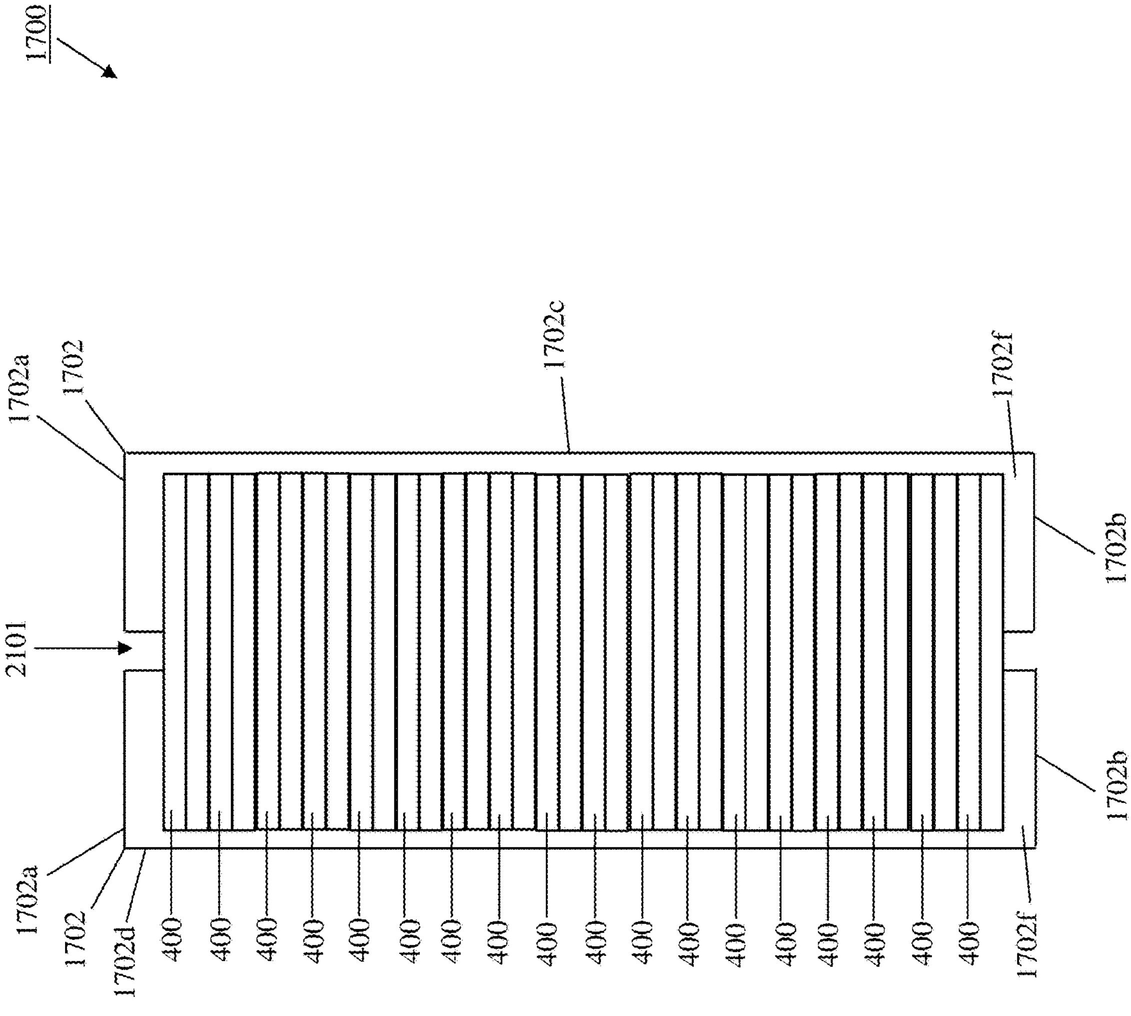
FIG. 24B is a front view illustrating an embodiment of the plurality of compute devices connected to the passive cable system of FIG. 24A.

In a third example, with reference to FIGS. 2, 17A-17C, and 21A-21C, at block 1802 the passive cable system 2100 illustrated in FIGS. 21B and 21C may be provided using two of the passive cable subsystems 1700 that may be positioned in the rack system 200 adjacent the device housings 204 (with only half of the device housings 204 identified by element numbers in FIG. 21A for clarity) and connected, mounted, and/or otherwise coupled to the rack system 200 using any of a variety of techniques that would be apparent to one of skill in the art in possession of the present disclosure. In some embodiments, each of the passive cable systems 1700 may include features that enable them to connect together to provide the passive cable system 2100 and structurally support each other (in addition to the structural support provided by connecting one or more of them to the rack system 200). As can be seen in FIGS. 21B and 21C, the passive cable system 2100 defines a spacing 2101 between the passive cable subsystems 1700 that one of skill in the art in possession of the present disclosure will appreciate is configured to house rack power systems like the rack power system 602 discussed above with reference to FIG. 6A.

As illustrated in FIG. 21C, the passive cable system 2100 provides thirty-six compute device connector groups 2102 (with every other compute device connector group 2102 provided with an element number in FIG. 21C for clarity), with each compute device connector group 2102 including four compute device connectors provided in a horizontally aligned orientation. As will be appreciated by one of skill in the art in possession of the present disclosure, the compute device connector groups 2102 are provided on the passive cable system 2100 such that each of the compute device connectors in those compute device connector groups are vertically aligned with corresponding compute device connectors in the other compute device connector groups (i.e., the "first" compute device connector in each of the compute device connector groups 2102 are vertically aligned, the "second" compute device connector in each of the compute device connector groups 2102 are vertically aligned, the "third" compute device connector in each of the compute device connector groups 2102 are vertically aligned, and the "fourth" compute device connector in each of the compute device connector groups 2102 are vertically aligned).

As can be seen in FIG. 21A, the positioning of the passive cable system 2100 in the rack system 200 adjacent the device housings 204 defines a switch device housing 2104 opposite the passive cable system 2100 from the device housings 204, with each of the computing device connectors groups 2102 located adjacent a respective computing device housing 204, and the switch device connector groups 2104 located adjacent the switch device housing 1904.

Similarly as discussed above, while the conventional rack system 200 discussed above with reference to FIG. 2 is described as being utilized with the racked GPU system of the present disclosure, modified rack systems may be provided that include the rack system features used in the racked GPU system described herein. In many examples, the conventional rack system 200 will include sufficient space to provide the switch device housing 2104 that houses the switch devices 1100 as described below. However, in other examples, the conventional rack system 200 may be modified with an increased depth to allow the rack system 200 to provide the switch device housing 2104 that houses the switch devices 1100 as described below when the passive cable system 2100 is provided therein. As such, one of skill in the art in possession of the present disclosure will appreciate how a variety of rack systems may be utilized with the racked GPU system of the present disclosure while remaining within its scope.

The method 1800 then proceeds to block 1804 where compute devices including GPU devices are positioned in respective device housings and are connected to the passive cable system. In a first example, with reference to FIGS. 8, 19B, 19C, 22A, and 22B, at block 1804 a computing device 800 may be positioned in any of the compute device housings 204 such that its connectors 812-818 connect to the compute device connectors included in the compute device connector group 1902 that is provided by the passive cable system 1900 and that is located adjacent that compute device housing 204. While not illustrated or described in detail, as described above the compute devices 800 positioned in the rack system 200 and connected to the passive cable system 1900 may engage compute device coupling features on the rack system 200 to mechanically support those compute devices 800 (i.e., in addition to the mechanical support provided by the passive cable system 1900).

In a second example, with reference to FIGS. 8, 16A, 16B, 23A, and 23B, at block 1804 a computing device 400 may be positioned in any of the compute device housings 204 such that its connectors 412-418 connect to the compute device connectors included in the compute device connector group 1608 that is provided by the passive cable system 1600 and that is located adjacent that compute device housing 204. While not illustrated or described in detail, as described above the compute devices 400 positioned in the rack system 200 and connected to the passive cable system 1600 may engage compute device coupling features on the rack system 200 to mechanically support those compute devices 400 (i.e., in addition to the mechanical support provided by the passive cable system 1600).

In a third example, with reference to FIGS. 8, 21A, 21B, 24A, and 24B, at block 1804 a computing device 400 may be positioned in any of the compute device housings 204 such that its connectors 412-418 connect to the compute device connectors included in the compute device connector group 2102 that is provided by the passive cable system 2100 and that is located adjacent that compute device housing 204. While not illustrated or described in detail, as described above the compute devices 400 positioned in the rack system 200 and connected to the passive cable system 2100 may engage compute device coupling features on the rack system 200 to mechanically support those compute devices 400 (i.e., in addition to the mechanical support provided by the passive cable system 2100).

The method 1800 then proceeds to block 1806 where switch devices are positioned in the rack system opposite the passive cable system from the compute devices and device housings and are connected to the passive cable system. In a first example, with reference to FIGS. 9A, 9B, 19B, 19C, 25A, and 25B, at block 1806 a plurality of the switch devices 900 (illustrated without their cooling devices 908 in FIG. 25A) may be positioned in the switch device housing 1904 such that each of the switch device connectors in the switch device connector groups 1504 provided on the passive cable system 1900 is connected to a respective switch device 900 via its passive cable system connector 906. Furthermore, a plurality of the management devices 1200 may be positioned in the switch device housing 1904 such that each of the management device connectors 1506 provided on the passive cable system 1900 is connected to a respective management device 1200 via its passive cable system connector 1206.

Figure 25A:
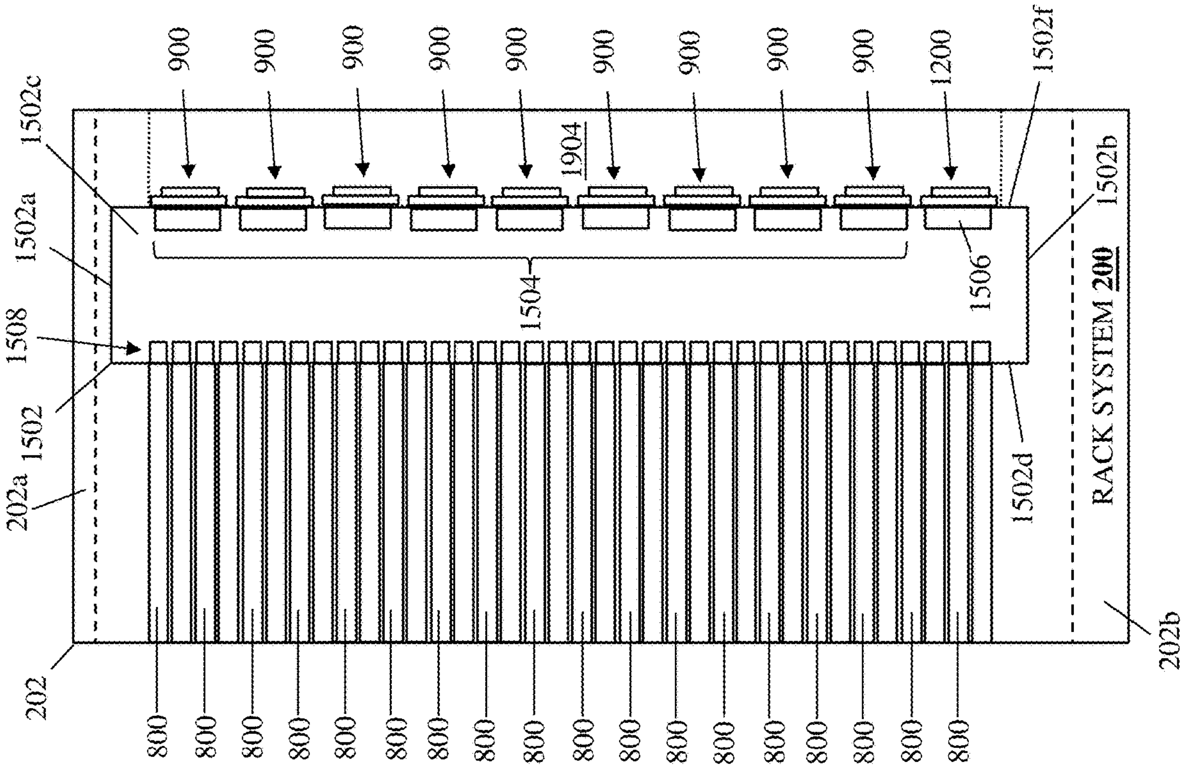
FIG. 25A is a cross-sectional view illustrating a plurality of the switch devices of FIGS. 9A and 9B and a plurality of the management devices of FIGS. 12A and 12B connected to the passive cable system of FIG. 22A to provide a racked GPU system.
Figure 25B:
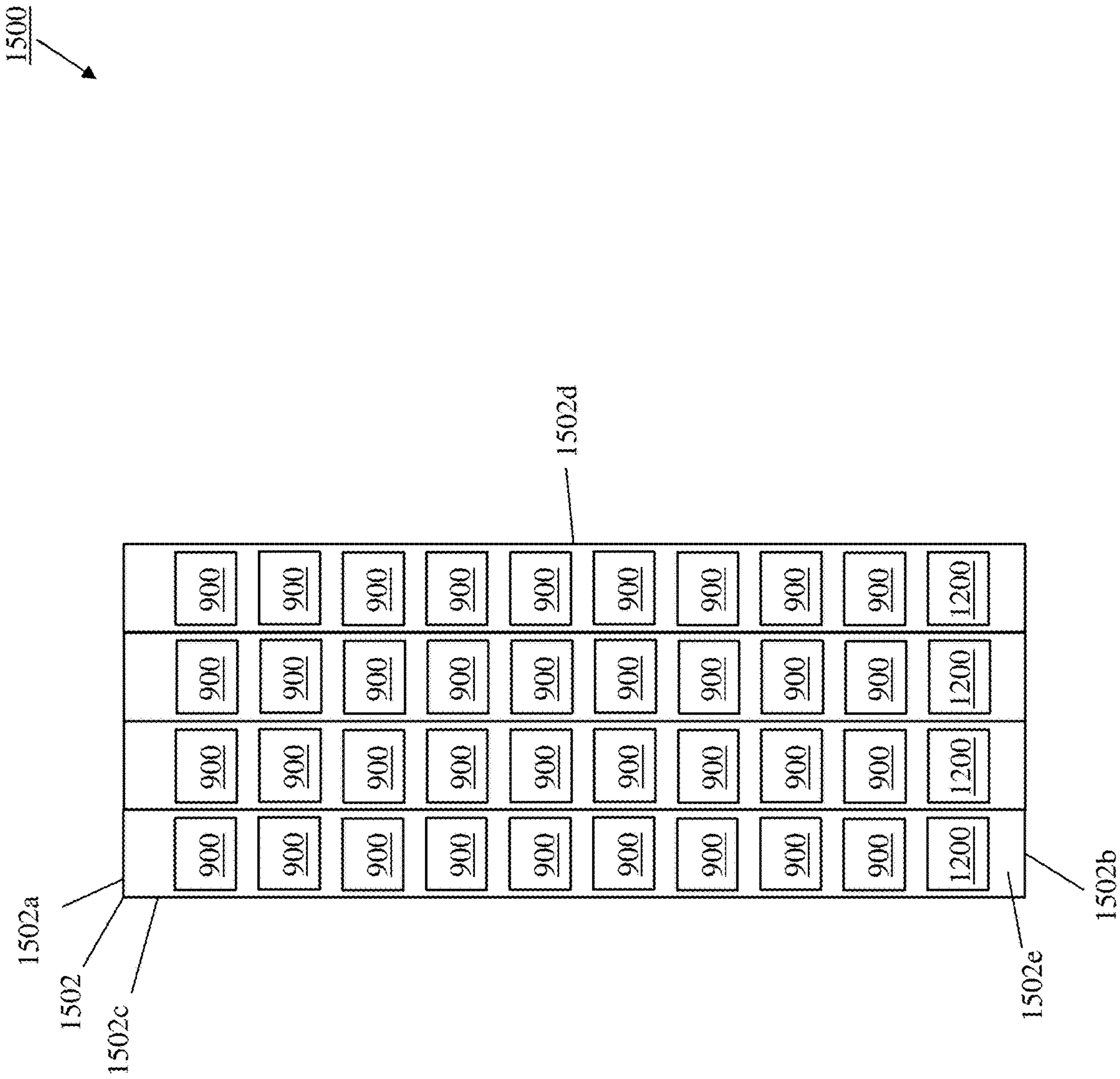
FIG. 25B is a front view illustrating the plurality of switch devices and the plurality of management devices connected to the passive cable system in the racked GPU system of FIG. 25A.

As illustrated in FIG. 25A and as will be appreciated by one of skill in the art in possession of the present disclosure, the provisioning of the passive cable system connector 906 opposite the chassis 902 from the networking processing device 904 on the switch devices 900, and the provisioning of the passive cable system connector 1206 opposite the chassis 1202 from the management processing device 1204 on the management devices 1200, allows the switch devices 900 and the management devices 1200 to be connected to the passive cable system 1900 without utilizing a substantial amount of depth in the rack housing (i.e., the depth required to house the switch devices 900 is approximately equal to the combined height of the chassis 902, the networking processing device 904, any portion of the passive cable system connector 906 that is not seated in the switch device connector on the switch device connector group 1504, and the cooling device 908; while the depth required to house the management devices 1200 is approximately equal to the combined height of the chassis 1202, the management processing device 1204, and any portion of the passive cable system connector 1206 that is not seated in the management device connector 1506).

In a second example, with reference to FIGS. 10A, 10B, 16A, 20, 26A, and 26B, at block 1806 a plurality of the switch device groups 1000 (illustrated without their cooling devices 1008 in FIG. 26A) may be positioned in the switch device housing 2000 such that each of the switch device connectors in the switch device connector groups 1604 provided on the passive cable system 1600 is connected to a respective switch device via its passive cable system connector 1006. As will be appreciated by one of skill in the art in possession of the present disclosure, at block 1806 each of the four passive cable system connectors 1006 on each switch device group 1000 may connect to a respective one of the four switch device connectors that share a horizontal plane on the passive cable system 1600 to connect to the four networking processing devices in that switch device group in order to provide the "horizontal" cross connections discussed above.

Furthermore, a plurality of the management device groups 1300 may be positioned in the switch device housing 2000 such that each of the management device connectors 1604 provided on the passive cable system 1600 is connected to a respective management device via its passive cable system connector 1306. As will be appreciated by one of skill in the art in possession of the present disclosure, at block 1806 each of the four passive cable system connectors 1306 on each management device group 1300 may connect to a respective one of the four management device connectors 1606 that share a horizontal plane on the passive cable system 1600 to connect to the management processing devices included on that management device. However, while a specific configuration for the connection of the management device group 1300 has been described, one of skill in the art in possession of the present disclosure will appreciate how the management device group may be connected to the passive cable system 1600 in a variety of manners that will fall within the scope of the present disclosure as well.

Figure 26A:
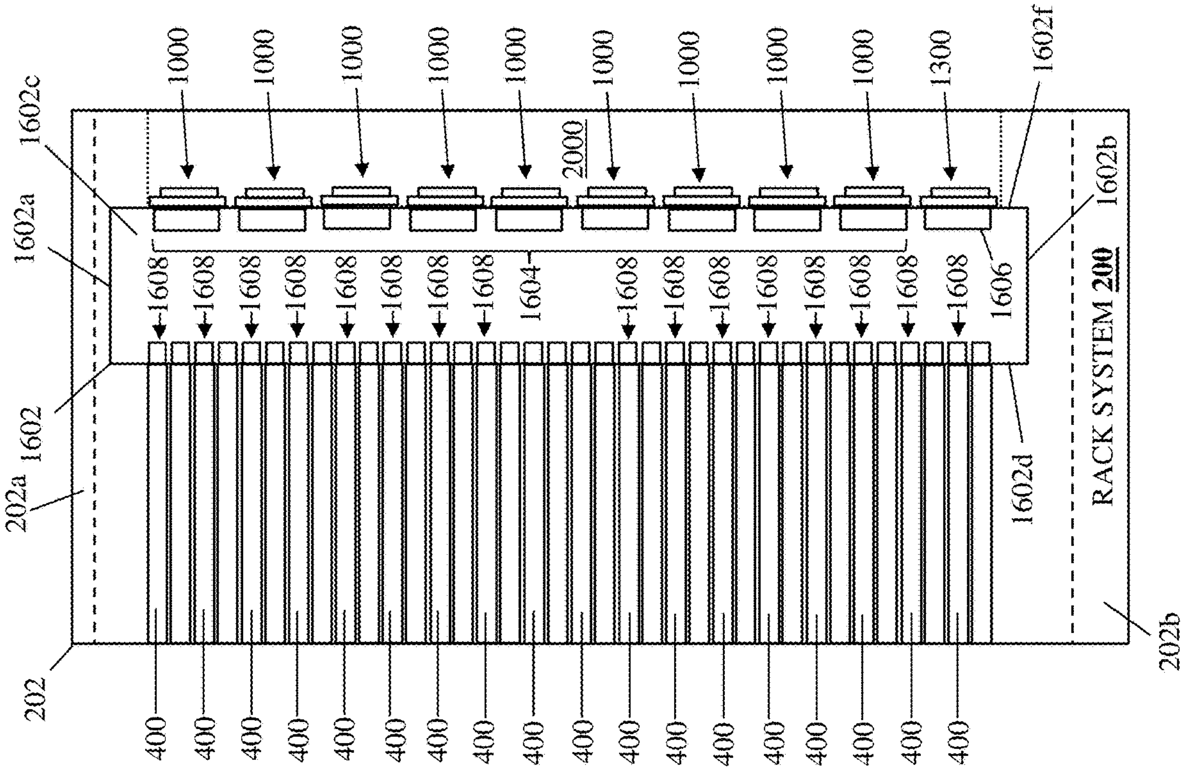
FIG. 26A is a cross-sectional view illustrating a plurality of the switch devices of FIGS. 10A and 10B and a plurality of the management devices of FIGS. 13A and 13B connected to the passive cable system of FIG. 23A to provide a racked GPU system.
Figure 26B:
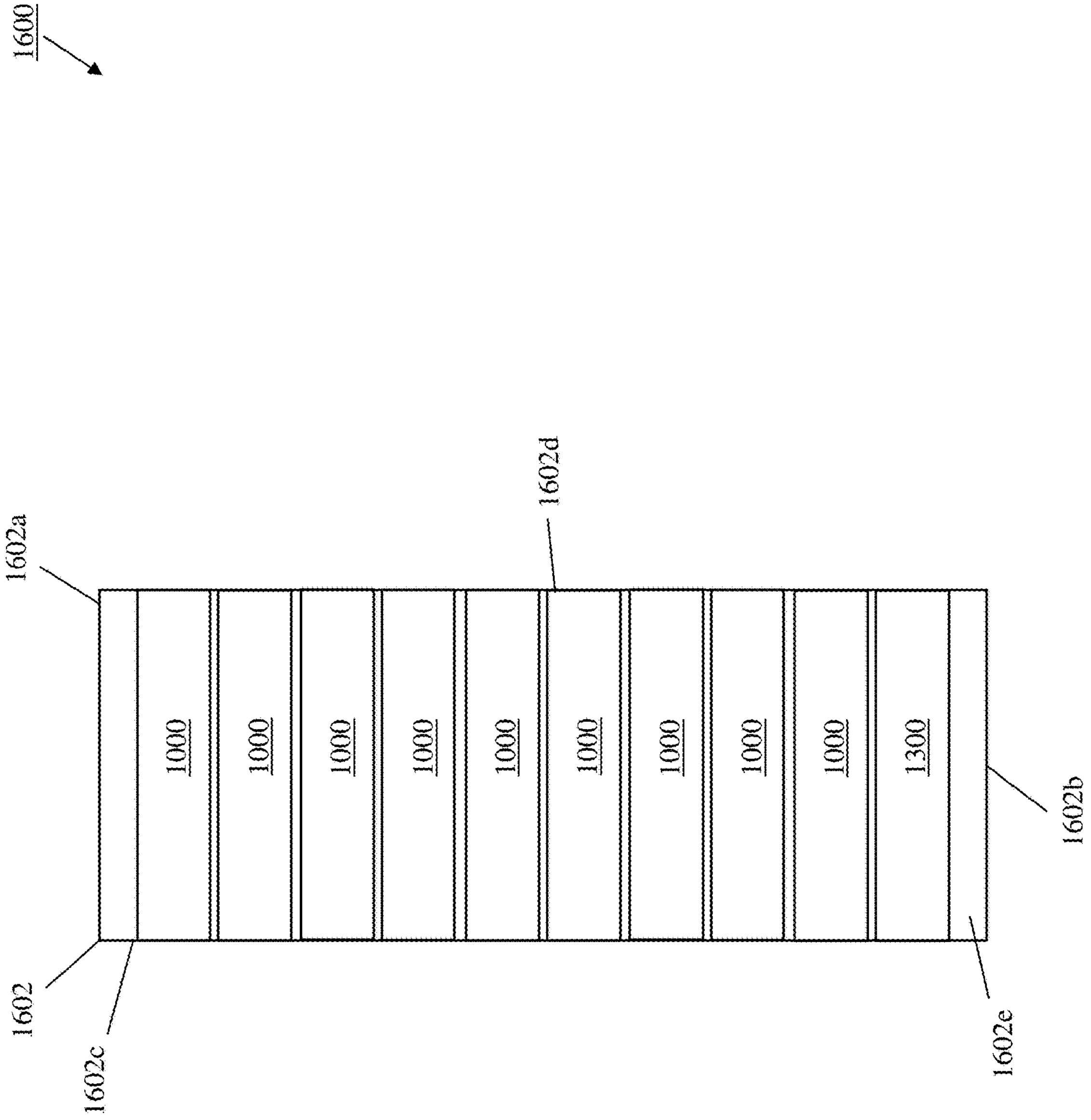
FIG. 26B is a front view illustrating the plurality of switch devices and the plurality of management devices connected to the passive cable system in the racked GPU system of FIG. 26A.

As illustrated in FIG. 26A and as will be appreciated by one of skill in the art in possession of the present disclosure, the provisioning of the passive cable system connectors 1006 opposite the chassis 1002 from the networking processing devices 1004 on the switch device groups 1000, and the provisioning of the passive cable system connector 1306 opposite the chassis 1302 from the management processing device 1304 on the management device groups 1300, allows the switch device groups 1000 and the management device groups 1300 to be connected to the passive cable system 1600 without utilizing a substantial amount of depth in the rack housing (i.e., the depth required to house the switch device groups 1000 is approximately equal to the combined height of the chassis 1002, one of the networking processing devices 1004, any portion of one of the passive cable system connectors 1006 that is not seated in the switch device connector on the switch device connector group 1604, and the cooling device 1008; while the depth required to house the management device groups 1300 is approximately equal to the combined height of the chassis 1302, one of the management processing devices 1304, and any portion of one of the passive cable system connectors 1306 that is not seated in the management device connector 1606).

In a third example, with reference to FIGS. 11A, 11B, 21A, 21B, 27A, and 27B, at block 1806 a plurality of the switch device groups 1100 (illustrated without their cooling devices 1108 in FIG. 27A) may be positioned in the switch device housing 2104 such that each of the switch device connectors in the switch device connector groups 1704 provided on the passive cable system 1700 is connected to a respective switch device via its passive cable system connector 1106. As will be appreciated by one of skill in the art in possession of the present disclosure, at block 1806 each of the four passive cable system connectors 1106 on each switch device group 1100 may connect to a respective one of the four switch device connectors that share a horizontal plane on the passive cable system 1700.

Furthermore, a plurality of the management device groups 1400 may be positioned in the switch device housing 2104 such that each of the management device connectors 1704 provided on the passive cable system 1700 is connected to a respective management device via its passive cable system connector 1406. As will be appreciated by one of skill in the art in possession of the present disclosure, at block 1806 each of the four passive cable system connectors 1406 on each management device group 1400 may connect to a respective one of the four management device connectors 1406 that share a horizontal plane on the passive cable system 1700 to connect to the management processing device 1404 included on that management device However, while a specific configuration for the connection of the management device group 1400 has been described, one of skill in the art in possession of the present disclosure will appreciate how the management device group may be connected to the passive cable system 1700 in a variety of manners that will fall within the scope of the present disclosure as well.

Figure 27A:
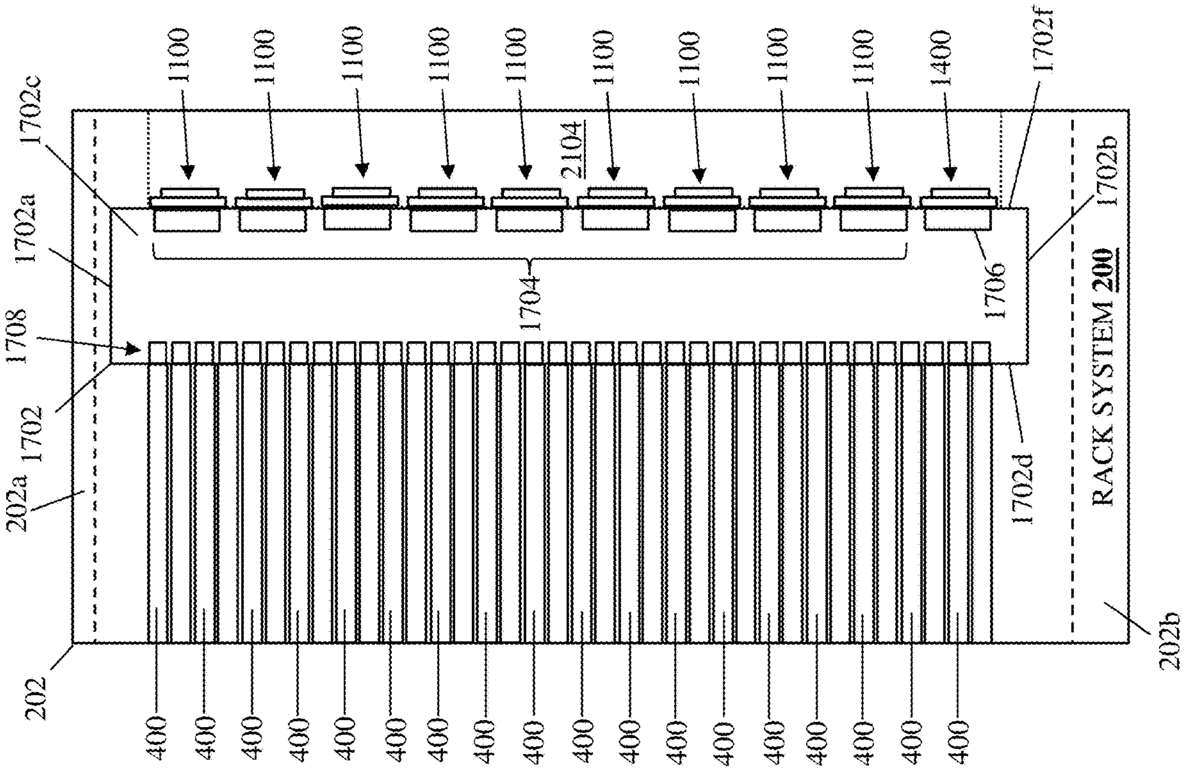
FIG. 27A is a cross-sectional view illustrating a plurality of the switch devices of FIGS. 11A and 11B and a plurality of the management devices of FIGS. 14A and 14B connected to the passive cable system of FIG. 24A to provide a racked GPU system.
Figure 27B:
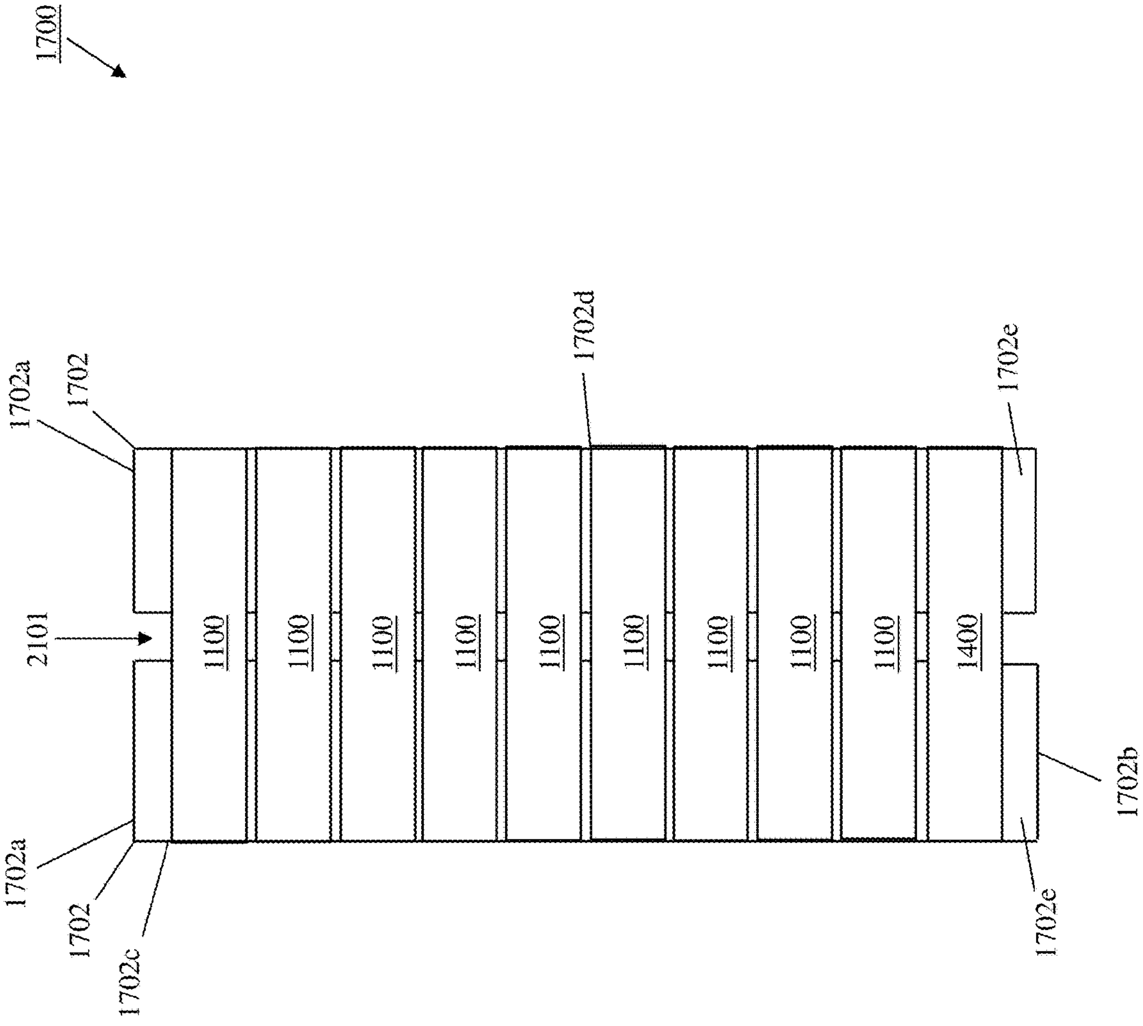
FIG. 27B is a front view illustrating the plurality of switch devices and the plurality of management devices connected to the passive cable system in the racked GPU system of FIG. 27A.

As illustrated in FIG. 27A and as will be appreciated by one of skill in the art in possession of the present disclosure, the provisioning of the passive cable system connectors 1106 opposite the chassis 1102 from the networking processing devices 1104 on the switch device groups 100, and the provisioning of the passive cable system connector 1406 opposite the chassis 1402 from the management processing device 1404 on the management device groups 1400, allows the switch device groups 1100 and the management device groups 1400 to be connected to the passive cable system 1700 without utilizing a substantial amount of depth in the rack housing (i.e., the depth required to house the switch device groups 1100 is approximately equal to the combined height of the chassis 1102, one of the networking processing devices 1104, any portion of one of the passive cable system connectors 1106 that is not seated in the switch device connector on the switch device connector group 1704, and the cooling device 1108; while the depth required to house the management device groups 1400 is approximately equal to the combined height of the chassis 1402, one of the management processing devices 1404, and any portion of one of the passive cable system connectors 1406 that is not seated in the management device connector 1706).

The method 1800 proceeds to block 1808 where the GPU devices in the compute devices communicate via the passive cable system and the switch devices with each other. In the example provided below, block 1808 is described with reference to the racked GPU system provided as described above in FIGS. 25A and 25B and that utilizes the passive cable system 1900 provided using four of the passive cable subsystems 1500, the switch devices 900, and the management devices 1200. However, one of skill in the art in possession of the present disclosure will appreciate how the connectivity and GPU device communications described below may be substantially similar in the racked GPU system provided as described above in FIGS. 26A and 26B and that utilizes the passive cable system 1600, the switch devices 1000, and the management devices 1300, as well as in the racked GPU system provided as described above in FIGS. 27A and 27B and that utilizes the passive cable system 2100 providing using two of the passive cable subsystem 1700, the switch devices 1100, and the management devices 1400.

Figure 28A:
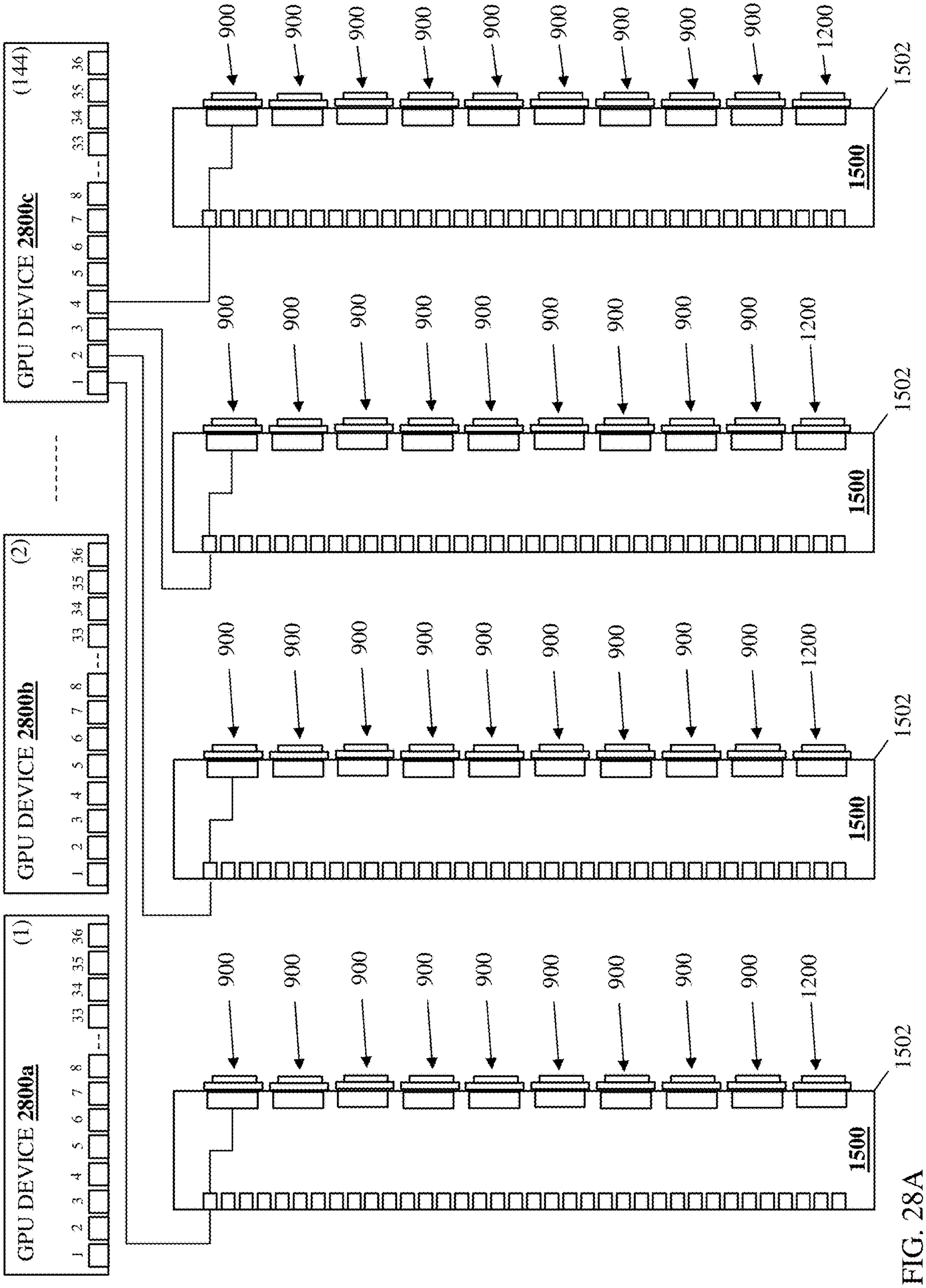
FIG. 28A is a schematic view illustrating some of the connections provided by the passive cable system between one of the GPU devices in the compute devices and some of the switch devices in the racked GPU system of FIGS. 25A and 25B.
Figure 28B:
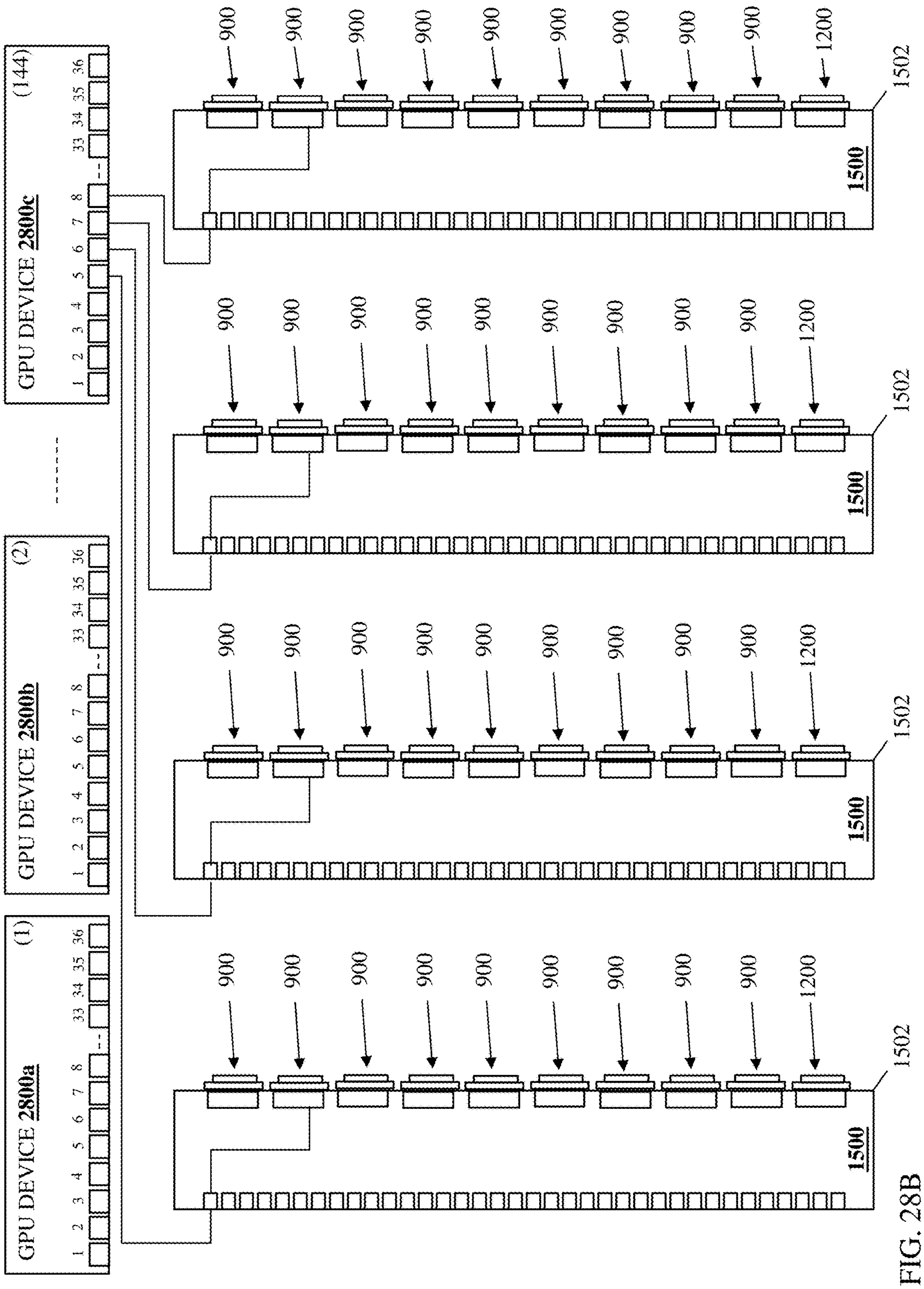
FIG. 28B is a schematic view illustrating some of the connections provided by the passive cable system between one of the GPU devices in the compute devices and some of the switch devices in the racked GPU system of FIGS. 25A and 25B.
Figure 28C:
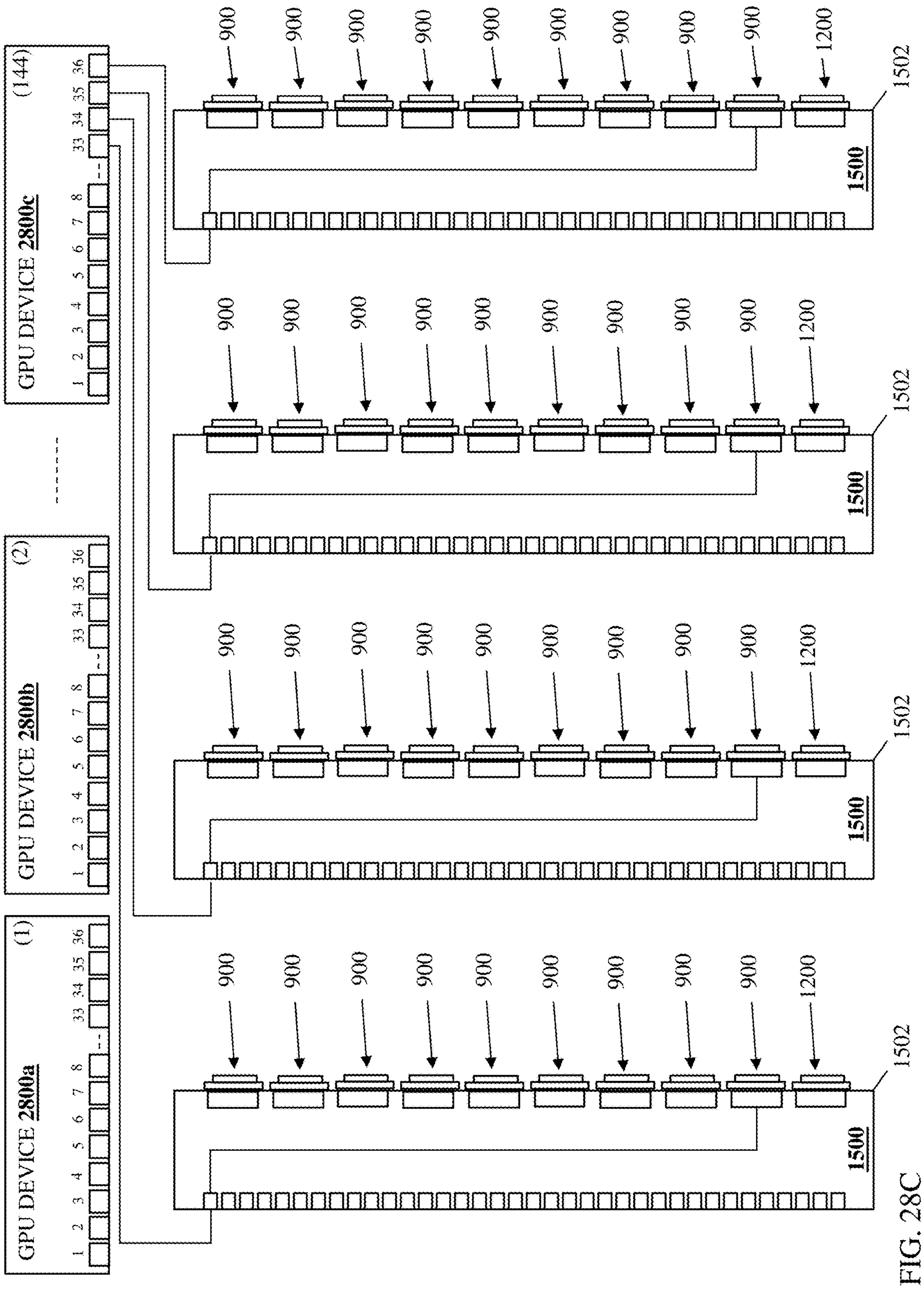
FIG. 28C is a schematic view illustrating some of the connections provided by the passive cable system between one of the GPU devices in the compute devices and some of the switch devices in the racked GPU system of FIGS. 25A and 25B.

With reference to FIGS. 19C, 25A, 28A, 28B, and 28C, an embodiment of the connections between one of the GPU devices and some of the networking processing devices provided in the racked GPU system of the present disclosure is illustrated. In FIGS. 28A-28C, the GPU devices provided in the compute devices 800 in the racked GPU system of the present disclosure are renumbered to GPU devices 2800*a*, 2800*b*, and up to 2800*c*, and in the examples discussed above, the 36 compute devices 800 provide 4 GPU devices each to provide (36*4=) 144 GPU devices that are coupled to the 36 networking processing devices provided in the 36 switch devices 900.

FIG. 28A illustrates how each of the "1-4" GPU interfaces on the "one hundred and forty fourth" GPU device 2800*c* are connected via the "first" switch device connector on a respective one of the four passive cable subsystems 1500 (i.e., the switch device connector located immediately adjacent the "top" of that passive cable subsystems 1500 in FIG.

28A) to the networking processing device in the "first" switch device 900 connected to the "first" switch device connector on that passive cable subsystems 1500 (i.e., the switch device connector located immediately adjacent the "top" of that passive cable subsystems 1500 in FIG. 28A). FIG. 28B illustrates how each of the "5-8" GPU interfaces on the "one hundred and forty fourth" GPU device 2800*c* are connected via the "first" switch device connector on a respective one of the four passive cable subsystems 1500 (i.e., the switch device connector located immediately adjacent the "top" of that passive cable subsystems 1500 in FIG. 28A) to the networking processing device in the "second" switch device 900 connected to the "second" switch device connector on that passive cable subsystems 1500 (i.e., the switch device connector located second from the "top" of that passive cable subsystems 1500 in FIG. 28A). FIG. 28C illustrates how each of the "33-36" GPU interfaces on the "one hundred and forty fourth" GPU device 2800*c* are connected via the "first" switch device connector on a respective one of the four passive cable subsystems 1500 (i.e., the switch device connector located immediately adjacent the "top" of that passive cable subsystems 1500 in FIG. 28A) to the networking processing device in the "last" switch device 900 connected to the "last" switch device connector on that passive cable subsystems 1500 (i.e., the switch device connector located adjacent the "bottom" of that passive cable subsystems 1500 in FIG. 28A).

However, while only a few of the connections between the GPU device 2800*c* and the networking processing devices in the switch devices 900 are illustrated and described, one of skill in the art in possession of the present disclosure will appreciate how the GPU device 2800*c* is connected to all of the networking processing devices provided by the switch devices 900 similarly as illustrated in FIGS. 28A-28C. Furthermore, one of skill in the art in possession of the present disclosure will appreciate how each of the GPU devices provided in the rack GPU system of the present disclosure is connected to all of the networking processing devices provided by the switch devices 900 similarly as illustrated for the GPU device 2800*c* in FIGS. 28A-28C as well.

As such, one of skill in the art in possession of the present disclosure will appreciate how, at block 1808, any of the GPU devices 2800*a*-2800*c* may communicate with any of the other GPU devices in the racked GPU system via the passive cable system 1900 and the switch devices 900 using the communicative couplings provided between those GPU devices 2800*a*-2800*c* via the connection of the compute devices 800 and the switch devices 900 to the passive cable system 1900. Finally, one of skill in the art in possession of the present disclosure will appreciate how the management devices 1200 may perform management operations for the switch devices 900, the compute devices 800, and/or any other devices in the rack system 200. To provide a specific example, two of the management devices 1200 may be provided as redundant management devices that are each configured to provide a respective operating system (e.g. a Software for Open Networking in the Cloud (SONIC) operating system) for each of the switch devices 900 (i.e., 36 independent operating systems in the example above), one of the management devices 1200 may be configured to provide a Smart Fabric Manager (SFM) that manages a scale-up fabric for the racked GPU system, and one of the management devices 1200 may be configured to provide other rack management functions that would be apparent to one of skill in the art in possession of the present disclosure.

Thus, systems and methods have been described that provide a racked GPU system configuration in which all compute device housings defined by a rack system may be used to house compute devices including GPU devices, and networking processing devices are coupled to those GPU devices via a passive cable system that is positioned between the compute devices/device housings and switch devices that include the networking processing devices. For example, the racked GPU system of the present disclosure may include a rack system defining a plurality of device housings. A passive cable system is housed in the rack system adjacent the plurality of device housings. Each of a plurality of compute devices that each include a plurality of Graphics Processing Units (GPU) devices are housed in a respective one of the plurality of the device housings and connected to the passive cable system. Each of a plurality of switch devices that each include a plurality of networking processing devices are housed in the rack system opposite the passive cable system from the plurality of compute devices and the plurality of device housings, and connected to the passive cable system to communicatively couple each of the plurality of networking processing devices in that switch system to each of the plurality of GPU devices in each of the plurality of compute device. As such, GPU density is increased relative to conventional racked GPU systems.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A racked Graphics Processing Unit (GPU) system, comprising:

a rack system defining a plurality of device housings;

a passive cable system that is configured to be housed in the rack system adjacent the plurality of device housings to define a switch device housing in the rack system that is located opposite the passive cable system from the plurality of device housings such that no portion of the switch device housing is located between any pair of the plurality of device housings;

a plurality of compute devices that each include a plurality of Graphics Processing Units (GPU) devices, wherein each of the plurality of compute devices is configured to be housed in a respective one of the plurality of the device housings and connected to the passive cable system; and a plurality of switch devices that each include a plurality of networking processing devices, wherein each of the plurality of switch devices is configured to be housed in the switch device housing defined in rack system opposite the passive cable system from the plurality of compute devices and the plurality of device housings, and connected to the passive cable system to communicatively couple each of the plurality of networking processing devices in that switch device to each of the plurality of GPU devices in each of the plurality of compute devices.

2. The system of claim 1, wherein the passive cable system includes:

a plurality of compute device connectors that are located on a first surface of the passive cable system, wherein each of the plurality of compute devices is configured to connect to a subset of the plurality of compute device connectors; and a plurality of switch device connectors that are located on a second surface of the passive cable system that is opposite the passive cable system from the first surface, wherein each of the plurality of switch devices is configured to connect to a subset of the plurality of switch device connectors.

3. The system of claim 2, wherein the passive cable system includes a plurality of passive cable subsystems that each include a respective subset of the plurality of compute device connectors and a respective subset of the plurality of switch device connectors.

4. The system of claim 3, wherein each of the respective subset of the plurality of compute device connectors on each cabling subsystem is cabled to each of the respective subset of the plurality of switch device connectors on that cabling subsystem.

5. The system of claim 1, wherein each of the plurality of switch devices is provided on a separate switch device chassis.

6. The system of claim 1, wherein each of a plurality of switch device groups, which each include two or more of the plurality of switch devices, is provided on the same switch device chassis.

7. An Information Handling System (IHS), comprising:

a rack system defining a plurality of device housings;

a passive cable system housed in the rack system adjacent the plurality of device housings;

a switch device housing defined in the rack system opposite the passive cable system from the plurality of device housings such that no portion of the switch device housing is located between any pair of the plurality of device housings a plurality of compute devices that each include a plurality of Graphics Processing Units (GPU) devices, wherein each of the plurality of compute devices is housed in a respective one of the plurality of the device housings and connected to the passive cable system; and a plurality of switch devices that each include a plurality of networking processing devices, wherein each of the plurality of switch devices is housed in the switch device housing defined in rack system opposite the passive cable system from the plurality of compute devices and the plurality of device housings, and connected to the passive cable system, wherein each of the plurality of GPU devices in the plurality of compute devices communicates via the passive cable system and at least one of the plurality of switch devices with at least one of the others of the plurality of GPU devices in the plurality of compute devices.

8. The IHS of claim 7, wherein the passive cable system includes:

a plurality of compute device connectors that are located on a first surface of the passive cable system, wherein each of the plurality of compute devices is connected to a subset of the plurality of compute device connectors; and a plurality of switch device connectors that are located on a second surface of the passive cable system that is opposite the passive cable system from the first surface, wherein each of the plurality of switch devices is connected to a subset of the plurality of switch device connectors.

9. The IHS of claim 8, wherein the passive cable system includes a plurality of passive cable subsystems that each include a respective subset of the plurality of compute device connectors and a respective subset of the plurality of switch device connectors.

10. The IHS of claim 9, wherein each of the respective subset of the plurality of compute device connectors on each cabling subsystem is cabled to each of the respective subset of the plurality of switch device connectors on that cabling subsystem.

11. The IHS of claim 7, wherein each of the plurality of switch devices is provided on a separate switch device chassis.

12. The IHS of claim 7, wherein each of a plurality of switch device groups, which each include two or more of the plurality of switch devices, is provided on the same switch device chassis.

13. The IHS of claim 7, wherein each of the plurality of GPU devices included in the plurality of compute devices is connected to a respective one of the plurality of networking processing devices in the plurality of switch devices via a single bidirectional serial link.

14. A method for providing a racked Graphics Processing Unit (GPU) system, comprising:

positioning, by a passive cable system, in a rack system defining a plurality of device housings such that the passive cable system is located adjacent the plurality of device housings and a switch device housing is defined in the rack system that is located opposite the passive cable system from the plurality of device housings such that no portion of the switch device housing is located between any pair of the plurality of device housings;

positioning, by each a plurality of compute devices that each include a plurality of Graphics Processing Units (GPU) devices, in a respective one of the plurality of the device housings;

connecting, by each of the plurality of compute devices in response to being positioned in the respective one of the plurality of the device housings, to the inter passive cable system;

positioning, by each of a plurality of switch devices that each include a plurality of networking processing devices, in the switch device housing defined in rack system opposite the passive cable system from the plurality of compute devices and the plurality of device housings;

connecting, by each of the plurality of switch devices in response to being positioned in the rack system, to the passive cable system to communicatively couple each of the plurality of networking processing devices in that switch device to each of the plurality of GPU devices in each of the plurality of compute devices.

15. The method of claim 14, further comprising:

connecting, by each of the plurality of compute devices, to subset of a plurality of compute device connectors that are located on a first surface of the passive cable system; and connecting, by each of the plurality of switch devices, to a subset of a plurality of switch device connectors that are located on a second surface of the passive cable system that is opposite the passive cable system from the first surface.

16. The method of claim 15, wherein the passive cable system includes a plurality of passive cable subsystems that each include a respective subset of the plurality of compute device connectors and a respective subset of the plurality of switch device connectors.

17. The method of claim 16, wherein each of the respective subset of the plurality of compute device connectors on each cabling subsystem is cabled to each of the respective subset of the plurality of switch device connectors on that cabling subsystem.

18. The method of claim 14, wherein each of the plurality of switch devices is provided on a separate switch device chassis.

19. The method of claim 14, wherein each of a plurality of switch device groups, which each include two or more of the plurality of switch devices, is provided on the same switch device chassis.

20. The method of claim 14, further comprising:

connecting, by each of the plurality of GPU devices included in the plurality of compute devices, to a respective one of the plurality of networking processing devices in the plurality of switch devices via a single bidirectional serial link.

* * * * *